United States Patent
Gill

(10) Patent No.: US 9,731,999 B2
(45) Date of Patent: Aug. 15, 2017

(54) CHEMICAL ADMIXTURES FOR HYDRAULIC CEMENTS

(71) Applicant: Iqbal Gill, Santa Clara, CA (US)

(72) Inventor: Iqbal Gill, Santa Clara, CA (US)

(*) Notice: Subject to any disclaimer, the term of this patent is extended or adjusted under 35 U.S.C. 154(b) by 0 days.

(21) Appl. No.: 14/035,819

(22) Filed: Sep. 24, 2013

(65) Prior Publication Data

US 2014/0041552 A1 Feb. 13, 2014

Related U.S. Application Data

(63) Continuation-in-part of application No. 13/624,920, filed on Sep. 22, 2012, now Pat. No. 8,562,736.

(60) Provisional application No. 61/538,396, filed on Sep. 23, 2011.

(51) Int. Cl.
| | |
|---|---|
| *C04B 24/04* | (2006.01) |
| *C04B 16/00* | (2006.01) |
| *C04B 28/02* | (2006.01) |
| *C04B 40/00* | (2006.01) |
| C04B 103/00 | (2006.01) |

(52) U.S. Cl.
CPC ............. *C04B 16/00* (2013.01); *C04B 28/02* (2013.01); *C04B 40/0039* (2013.01); *C04B 2103/0086* (2013.01); *Y02W 30/92* (2015.05)

(58) Field of Classification Search
CPC .................................................. C04B 24/04
USPC ................................. 106/728, 724, 819, 823
See application file for complete search history.

(56) References Cited

U.S. PATENT DOCUMENTS

| | | | |
|---|---|---|---|
| 1,964,696 A | 6/1934 | Traube et al. | |
| 2,498,514 A | 2/1950 | Mater | |
| 2,644,828 A | 7/1953 | Kruse et al. | |
| 3,090,728 A | 5/1963 | Berger | |
| 3,139,447 A * | 6/1964 | Nagy | 556/148 |
| 3,200,136 A | 8/1965 | Grossmith | |
| 3,433,657 A | 3/1969 | Pickering | |
| 3,506,761 A | 4/1970 | Rubino | |
| 3,563,313 A * | 2/1971 | Spangle | C09K 8/42 166/292 |
| 3,591,616 A | 7/1971 | Baldt | |
| 3,656,985 A | 4/1972 | Bonnel et al. | |
| 3,712,948 A | 1/1973 | Halpern et al. | |
| 3,734,940 A | 5/1973 | Rubino | |
| 3,843,524 A | 10/1974 | Perricone et al. | |
| 3,870,749 A * | 3/1975 | Danesh | 560/180 |
| 3,991,176 A | 11/1976 | Rubino | |
| 4,021,536 A | 5/1977 | Rubino | |
| 4,129,183 A | 12/1978 | Kalfoglou | |
| 4,240,952 A | 12/1980 | Hulbert, Jr. et al. | |
| 4,256,504 A | 3/1981 | Dunstan, Jr. | |
| 4,265,675 A | 5/1981 | Tsao et al. | |
| 4,319,927 A | 3/1982 | Segal | |
| 4,470,850 A | 9/1984 | Bloss | |
| 4,524,062 A * | 6/1985 | Laba et al. | 424/65 |
| 4,524,828 A | 6/1985 | Sabins et al. | |
| 4,579,176 A * | 4/1986 | Davies | C09K 8/572 166/272.1 |
| 4,601,340 A | 7/1986 | Fodor et al. | |
| 4,640,715 A | 2/1987 | Heitzmann et al. | |
| 4,642,137 A | 2/1987 | Heitzmann et al. | |
| 4,705,876 A | 11/1987 | Ivanov et al. | |
| 4,842,649 A | 6/1989 | Heitzmann et al. | |
| 4,997,484 A | 3/1991 | Gravitt et al. | |
| 5,008,256 A | 4/1991 | Clitherow | |
| 5,162,378 A * | 11/1992 | Guthauser | 514/785 |
| 5,165,914 A | 11/1992 | Vlock | |
| 5,206,265 A | 4/1993 | Vidic et al. | |
| 5,274,152 A * | 12/1993 | Carmody | 556/183 |
| 5,374,308 A | 12/1994 | Kirkpatrick et al. | |
| 5,439,518 A | 8/1995 | Francis et al. | |
| 5,532,211 A | 7/1996 | Burrafato et al. | |
| 5,536,310 A | 7/1996 | Brook et al. | |
| 5,559,263 A | 9/1996 | Smith | |
| 5,578,122 A | 11/1996 | Carrasquillo | |
| 5,969,038 A * | 10/1999 | Fecht et al. | 524/837 |
| 6,251,412 B1 * | 6/2001 | Bazin et al. | 424/401 |

(Continued)

FOREIGN PATENT DOCUMENTS

| | | |
|---|---|---|
| GB | 843865 | 8/1960 |
| GB | 949405 | 2/1964 |

(Continued)

OTHER PUBLICATIONS

"Hydroacid complexes: a new class of draw solutes to promote forward osmosis (FO) processes", Ge et al., Chemical Communications, (2013), 49(76), p. 8471-8473.*
"Hydroacid complexes: a new class of draw solutes to promote forward osmosis (FO) processes", Ge et al., Chemical Communications (Cambridge, United Kingdom), (2013), 49(76), p. 8471-8473. Abstract.*
Liu et al., US 20030143176 A1 (Jul. 31, 2003), Abstract.*
Ahmaruzzaman, A review on the utilization of fly ash, 2010 Prog. Energy Combust. Sci. 36: 327-363).
Aouf et al., Low Catalyst loadings for the production of carboxylic acids from polysaccharides and hydrogen peroxide, 2010 Chem. Sus. Chem. 3: 1200-1203).
Aristidou et al., Metabolic engineering applications to renewable resource utilization, 2000 Curr. Opin. Biotechnol. 11: 187-199).

(Continued)

*Primary Examiner* — Paul Marcantoni
(74) *Attorney, Agent, or Firm* — Karen Canaan; CanaanLaw, P.C.

(57) ABSTRACT

The present invention relates to a new class of chemical admixtures for hydraulic cement compositions and methods of preparing same. The admixtures, which include complexes of metals with one or more hydroxycarboxylic acids and/or derivatives of hydroxycarboxylic acids, improve at least the following properties of cement compositions: hardness, compressive strength, shrinkage, and freeze-thaw resistance. Hydraulic cement compositions that may be improved with the chemical admixtures include pastes, mortars, grouts and concretes, all of which may be made from ordinary Portland cement, blended cements, or non-Portland cements made with Supplementary Cementitious Materials.

12 Claims, No Drawings

(56) References Cited

U.S. PATENT DOCUMENTS

| | | | |
|---|---|---|---|
| 6,537,367 B2* | 3/2003 | Sommer et al. | 106/724 |
| 6,585,964 B1* | 7/2003 | Levin et al. | 424/65 |
| 6,632,421 B2 | 10/2003 | Ascione et al. | |
| 6,827,776 B1 | 12/2004 | Boggs et al. | |
| 6,903,235 B2 | 6/2005 | Hsiao et al. | |
| 7,005,531 B2 | 2/2006 | Justus et al. | |
| 7,288,148 B2 | 10/2007 | Hicks et al. | |
| 7,767,851 B2 | 8/2010 | Kwok et al. | |
| 7,850,776 B2 | 12/2010 | Gartner et al. | |
| 7,854,803 B1 | 12/2010 | Kirkpatrick et al. | |
| 7,947,334 B2* | 5/2011 | Angelskaar | 427/421.1 |
| 2003/0143176 A1* | 7/2003 | Liu et al. | 424/70.12 |
| 2008/0178770 A1 | 7/2008 | Schumacher et al. | |
| 2011/0048285 A1 | 3/2011 | Barbour | |

FOREIGN PATENT DOCUMENTS

| | | |
|---|---|---|
| GB | 1033844 | 6/1966 |
| GB | 2429204 A | 2/2007 |
| WO | 9112214 A1 | 8/1991 |
| WO | 2010068656 A1 | 6/2010 |

OTHER PUBLICATIONS

Asato et al., Synthesis, structure, and spectroscopic properties of bismuth citrate compounds and the bismuth-containing ulcer-healing agent colloidal bismuth subcitrate (CBS), 1995, Inorg. Chem. 34: 2447-2454).

Bandoli et al., Mononuclear six-coordinated Ga(III) complexes, 2009 Coord. Chem. Rev. 253: 56-77.

Berovic et al., Citric Acid Production, 2007 Annu. Rev. Biotechnol. 13: 303-343.

Biagioli et al., Molecular structure, characterization and reactivity of dioxo complexes formed by vanadium(V) with a-hydroxycarboxylate ligands, 2000 Inorg. Chim. Acta 310: 1-9).

Brnicevic et al., Coordination complexes of niobium and tantalum. XI. Crystalline malato complexes of niobium(V), 1971 J. Less Common Metal. 23: 61-66.

Chatterjee, "Special Cements," Structure and Performance of Cements, 2nd Edition, Bensted and Barnes (Eds), Spon Press, 2002.

Collinson et al., The catalytic oxidation of biomass to new materials focusing on starch, cellulose and lignin, 2010 Coord. Chem. Rev. 254: 1854-1870.

Dakanali et al., A novel dinuclear species in the aqueous distribution of aluminum in the presence of citrate, 2003 Inorg. Chem. 42: 252-254.

Damtoft et al., Sustainable development and climate change initiatives, 2008 Cement Concrete Res. 38: 115-127.

Deng et al., pH-Dependent isolations and spectroscopic, structural, and thermal studies of titanium citrate complexes, 2004: Inorg. Chem. 43: 6266-6273.

Drabik et al., "Prospects of Novel Macro-Defect-Free Cements for the New Millennium," CERAMICS 46(2):68-73 (2002).

Duxson et al., The role of inorganic polymer technology in the development of 'green concrete', 2007 Cement Concrete Res. 37: 1590-1597.

Duxson et al., Geopolymer technology: the current state of the art, 2007 J. Mater. Sci. 42: 2917-2933.

Feng et al., Aluminum citrate: Isolation and structural characterization of a stable trinuclear complex, 1990: Inorg. Chem. 29: 408-411.

Flower et al., Green house gas emissions due to concrete manufacture, 2007 Int. J. LCA 12: 282-288.

Hall et al., Fly ash quality, past, present and future, and the effect of ash on the development of novel products, 2002 J. Chem. Technol. Biotechnol. 77: 234-239.

Happel et al., Separation and characterization of aluminium malate species by ion chromatography, 2008: Anal. Bioanal. Chem. 392: 1373-1381.

Herfort, et al., The Chemistry of Portland Cement Clinker, 2010 Adv. Cem. Res. 22: 187-194.

Hofvendahl et al., Factors affecting the fermentative lactic acid production from renewable resources, 2007 Enzyme Microb. Technol. 26: 87-107.

Huntzinger et al., A life-cycle assessment of Portland cement manufacturing, 2009 J. Cleaner Prod. 17: 668-675.

Jackson, Portland Cement: Classification and Manufacture, in Lea's Chemistry of Cement and Concrete, pp. 25-94 (2003 Elsevier, 4th ed.).

John et al., Fermentative production of lactic acid from biomass: An overview on process developments and future perspectives, 2007: Appl. Microbiol. Biotechnol. 74: 524-534.

Kelly et al., Coal Combustion Products Statistics, pp. 1-2 (2010 U.S. Geological Survey).

Kosmatks et al., Portland, Blended, and Other Hydraulic Cements, in Design and Control of Concrete Mixtures, pp. 21-56 (2006 Portland Cement Association, 14th ed.).

Kosmatks et al., Fly Ash, Slag, Silica Fume, and Natural Pozzolans, in Design and Control of Concrete Mixtures, pp. 57-72 (2006 Portland Cement Association, 14th ed.).

Lajunen et al., Stability constants for alpha-hydroxycarboxylic acid complexes with protons and metal ions and the accompanying enthalpy changes—Part I: Aromatic ortho-hydroxycarboxylic acids, 1997 Pure Appl. Chem, 69: 329-381.

Lea and Desch, Lea's Chemistry of Cement and Concrete, Ch. 13 and Ch. 14 (Excerpts), 4th Edition, Peter C. Hewlett (Ed.), Reed Elsevier, 1998.

Lingane, Polarographic investigation of oxalate, citrate and tartrate complexes of ferric and ferrous iron, J. Am. Chem. Soc. 68: 2448-2454.

Lohtia, et al., Mineral Admixtures, in Concrete Admixtures Handbook, pp. 657-739 (2006 Noyes, 2nd ed.).

Loreti, Greenhouse Gas Emission Reductions from Blended Cement Production, pp. 1-35 (2008 The Loreti Group).

Marceau et al., Life Cycle Inventory of Portland Cement Manufacture, pp. 1-68 (2006 Portland Cement Association).

Massazza, Pozzolana and pozzolanic cements, in Lea's Chemistry of Cement and Concrete, pp. 471-631 (2003 Elsevier, 4th ed.).

Matzapetakis et al., Synthesis, structural characterization, and solution behavior of the first mononuclear, aqueous aluminum citrate complex, 1999 Inorg. Chem. 38: 618-619.

Mehta et al., "Properties of Alite Cements," Cement and Concrete Research 9:439-450 (1979).

Meites, Polarographic studies of metal complexes. V. The cadmium(II), zinc(II) and iron(III) citrates, 1951 J. Am. Chem. Soc. 73: 3727-3732.

Motekaitis et al., Complexes of aluminum(III) with hydroxy carboxylic acids, 1984 Inorg. Chem. 23: 18-23.

Nugteren, Fly ash: From waste to industrial product, 2007 Part. Part. Sys. Charact. 24: 49-55.

Odler, "Special Portland Cements," Special Inorganic Cements, E & FN Spon (Pub.), 2000.

Pachecho-Torgal et al., Alkali-activated binders: A review Part 1. Historical background, terminology, reaction mechanisms and hydration products, 2008 Constr. Build. Mater. 22: 1305-1314.

Pachecho-Torgal et al., Alkali-activated binders: A review. Part 2. About materials and binders manufacture, 2008 Constr. Build. Mater. 22: 1315-1322.

Phair, Green chemistry for sustainable cement production and use, 2006 Green Chem. 8: 763-780.

Placet et al., Toward a Sustainable Cement Industry, pp. 1-92 (2002 Battelle, Substudy 7).

Portanova et al., Critical evaluation of stability constants for alpha-hydroxycarboxylic acid complexes with protons and metal ions and the accompanying enthalpy changes—Part II: Aliphatic 2-hydroxycarboxylic acids, 2003 Pure Appl. Chem. 75: 495-540.

Rayzman et al., Technology for chemical-metallurgical coal ash utilization, 1997 Energy Fuels 11: 761-773.

Rehan et al., Carbon dioxide emissions and climate change: policy implications for the cement industry, 2005 Environ. Sci. Policy 8: 105-114.

Ruzdic et al., Coordination properties of a-hydroxy carboxylic acids. Part I. Binuclear niobium(V) complex acids and some salts, 1984 Inorg. Chim. Acta, 88: 99-103.

(56) References Cited

OTHER PUBLICATIONS

Sadler et al., Coordination chemistry of metals in medicine: Target sites for bismuth, 1999 Coord. Chem. Rev. 185-186: 689-709.

Schneider et al., Sustainable cement production—present and future, 2011 Cement Concrete Res. 41: 642-650.

Scrivener et al., "High-Performance Concretes from Calcium Aluminate Cements," Cement and Concrete Research 29:1215-1223 (1999).

Sharp et al., Novel cement systems, 2010 Adv. Cem. Res. 22: 195-202.

Sheikh-Osman et al., Aluminum carboxylates in aqueous solutions, 1993 J. Chem. Soc. Dalton Trans. 3229-3223.

Szczepaniak et al., Use of bismuth ion-selective electrode for investigation of bismuth complexes of citric and malic acids, 1986 Talanta, 33: 371-373.

Tennis et al., Coal Combustion Product Production & Use Survey Results, pp. 1-2 (2009 American Coal Ash Association).

Todorovskya et al., On the chemical nature of lanthanum-titanium citric complexes, precursors of La2Ti2O7, 2004 Mater. Lett. 58: 3559-3563.

Tomita et al., A water-soluble titanium complex for the selective synthesis of nanocrystalline brookite, rutile, and anatase by a hydrothermal method, 2006 Angew. Chem. Int. Ed. 45: 2378-2381.

Van Oss and Padovani, Cement manufacture and the environment, Part 1: Chemistry and technology. 2002 J. Ind. Ecol. 6: 89-105.

Van Oss and Padovani, Cement manufacture and the environment, Part 2: Environmental challenges and opportunities, 2003 J. Ind. Ecol. 7: 93-126.

Worrell, Cement and Energy, in Encyclopedia of Energy, pp. 307-316 (2004 Elsevier, vol. 1).

Worrell et al., Carbon dioxide emissions from the global cement industry, 2001 Ann. Rev. Energy Env. 26: 303-3029.

Yang and Sun, Biocoordination chemistry of bismuth: Recent advances, 2007 Coord. Chem. Rev. 251: 2354-2366.

Zhang et al., pH- and mol-ratio dependent tungsten(VI)-citrate speciation from aqueous solutions: syntheses, spectroscopic properties and crystal structures, 2003 Inorg. Chim. Acta 351: 311-318.

Zhang et al., Syntheses, spectroscopies and structures of zinc complexes with malate, 2009 Inorg. Chim. Acta 362: 2643-2649.

Zhou et al., Tungsten-malate interaction. Synthesis, spectroscopic and structural studies of homochiral S-malato tungstate(VI), L-Na3[WO2H(S-mal)2], 2001 Inorg. Chim. Acta 314: 184-188.

Zhou et al., Synthesis and characterization of homochiral polymeric S-malatomolybdate(VI), 2002 J. Inorg. Biochem. 90:137-143.

Zhou et al., Syntheses, crystal structures and biological relevance of glycolato and S-lactato molybdates, 2004 J. Inorg. Biochem. 98: 1037-1044).

Coal Combustion Product Production & Use Survey, pp. 1-2 (2009 American Coal Ash Association).

"Special Cements and Their Uses," Concrete Cement, Publication C73003:1-5, The Aberdeen Group, 1973.

Waste and Materials—Flow Benchmark Sector Report: Beneficial Use of Secondary Materials—Coal Combustion Products, pp. 1-95 (2008 U.S. Environmental Protection Agency).

Petition to Make Special and Examination Support Document from parent case, U.S. Appl. No. 13/624,920 (now U.S. Pat. No. 8,562,736), filed Sep. 22, 2012.

Request for Reconsideration of Decision Dismissing the Petition to Make Special of Sep. 22, 2012 from the parent case, U.S. Appl. No. 13/624,920 (now U.S. Pat. No. 8,562,736), filed Dec. 3, 2012.

Examiner's Search Results from parent case, U.S. Appl. No. 13/624,920 (now U.S. Pat. No. 8,562,736), conducted on Jan. 13, 2013.

Examiner's Search Results from parent case, U.S. Appl. No. 13/624,920 (now U.S. Pat. No. 8,562,736), conducted on Feb. 25, 2013.

Examiner's Search Results from parent case, U.S. Appl. No. 13/624,920 (now U.S. Pat. No. 8,562,736), conducted on Mar. 4, 2013.

* cited by examiner

CHEMICAL ADMIXTURES FOR HYDRAULIC CEMENTS

This application claims the benefit of and priority to U.S. patent application Ser. No. 13/624,920, filed on Sep. 22, 2012, and Provisional Patent Application No. 61/538,396, filed on Sep. 23, 2011, both of which are incorporated in their entireties herein.

FIELD OF THE INVENTION

This invention generally relates to a new class of chemical admixtures for hydraulic cement compositions such as pastes, mortars, grouts and concretes. The cement compositions are comprised of Ordinary Portland Cement, or blended cements or non-Portland cements made with Supplementary Cementitious Materials (SCMs). The admixtures improve the properties of cement compositions, including setting, hardness, compressive strength, shrinkage, and freeze-thaw resistance.

BACKGROUND OF THE INVENTION

Ordinary Portland Cement (OPC, also known as Portland Cement) underpins modern construction technology and constitutes the second most manufactured product in the world. According to Struble et al., *Introduction to Portland Cement*, in *Portland Cement: Composition, Production and Properties*, pp. 1-47 (2011 ICE Publishing, 3rd ed.); Herfort et al., *The Chemistry of Portland Cement Clinker*, 2010 Adv. Cem. Res. 22: 187-194; and Jackson, *Portland Cement: Classification and Manufacture*, in *Lea's Chemistry of Cement and Concrete*, pp. 25-94 (2003 Elsevier, 4th ed.), U.S. and world production of OPC currently stands at 72 million metric tons (t) and 2.8 billion t respectively.

OPC manufacturing has the disadvantage of having a large ecological footprint; it requires large amounts of mineral, fuel and water resources, and is accompanied by the release of various pollutants. See, Huntzinger et al., *A life-cycle assessment of Portland cement manufacturing*, 2009 J. Cleaner Prod. 17: 668-675; Flower et al., *Greenhouse gas emissions due to concrete manufacture*, 2007 Int. J. LCA 12: 282-288; Marceau et al., *Life Cycle Inventory of Portland Cement Manufacture*, pp. 1-68 (2006 Portland Cement Association); Rehan et al., *Carbon dioxide emissions and climate change: policy implications for the cement industry*, 2005 Environ. Sci. Policy 8: 105-114; Worrell, *Cement and Energy*, in *Encyclopedia of Energy*, pp. 307-316 (2004 Elsevier, Volume 1); van Oss, and Padovani, *Cement manufacture and the environment*, Part 2: Environmental challenges and opportunities, 2003 J. Ind. Ecol. 7: 93-126; van Oss and Padovani, *Cement manufacture and the environment*, Part 1: Chemistry and technology. 2002 J. Ind. Ecol. 6: 89-105; and Worrell, et al., *Carbon dioxide emissions from the global cement industry*, 2001 Ann. Rev. Energy Env. 26: 303-3029.

Indeed, every 1.0 t of OPC uses 1.50-1.75 t of minerals, 0.89-1.21 t of fuel, and 0.52-1.03 t of water for its production, and results in the emission of 0.70-0.92 t of carbon dioxide as well as various other toxic substances, including carbon monoxide, nitrogen oxides, sulfur oxides, hydrogen chloride, dioxins, lead, mercury and selenium. Since 72 million t of OPC are produced in the U.S. every year, this equates to the use of 108-126 million t of minerals, 64-87 million t of fuel, and 37-74 million t of water, and the emission of 50-66 million t of carbon dioxide.

In view of the poor environmental metrics of OPC, efforts have been made to produce "Green" and sustainable cements by partially or completely replacing OPC with alternative binders with lower ecological footprints, as described in the publications, Schneider et al., *Sustainable cement production—present and future*. 2011 Cement Concrete Res. 41: 642-650; Sharp, et al., *Novel cement systems*, 2010 Adv. Cem. Res. 22: 195-202; Damtoft et al., *Sustainable development and climate change initiatives*, 2008 Cement Concrete Res. 38: 115-127; Phair, *Green chemistry for sustainable cement production and use*. 2006 Green Chem. 8: 763-780; and Placet et al., *Toward a Sustainable Cement Industry*, pp 1-92 (2002 Battelle, Substudy 7).

With suitable formulation and additives, OPC can be partially or completely replaced by a variety of minerals and industrial byproducts, collectively referred to as Supplementary Cementitious Materials (SCMs, also known as Mineral Admixtures), the resultant products being referred to as blended cements and non-Portland cements respectively. Blended cements are described in the publications: Massazza, *Pozzolana and pozzolanic cements*, in *Lea's Chemistry, of Cement and Concrete*, pp. 471-631 (2003 Elsevier, 4th ed.); and *Mineral Admixtures in Cement and Concrete*, pp. 1-248 (2011 CRC Press); and Kosmatks et al., *Portland, Blended, and Other Hydraulic Cements*, in *Design and Control of Concrete Mixtures*, pp. 21-56 (2006 Portland Cement Association, 14th ed.).

SCMs are characterized as cementitious, pozzolanic (having cementitious activity in the presence of lime), or both cementitious and pozzolanic. ASTM C-989, C-618 and C-1240 describe three major classes of SCMS: (i) Iron blast furnace slags (cementitious); (ii) Fly ash Class C (cementitious and pozzolanic), fly ash Class F (pozzolanic), and natural (raw or calcined) pozzolans such as diatomaceous earths, opaline cherts and shales, tuffs, volcanic ashes, and calcined clays and shales; and (iii) Silica fume (pozzolanic). The major SCMs are low-value industrial byproducts, most notably fly ash and blast furnace slag, which are waste products of coal-fired power plants and iron ore smelters respectively. SCMs are described in *Mineral Admixtures in Cement and Concrete*, pp. 1-248 (2011 CRC Press); *Supplementary Cementing Materials*, pp. 1-283 (2011 Springer); Lohtia, et al., *Mineral Admixtures*, in *Concrete Admixtures Handbook*, pp. 657-739 (2006 Noyes, 2nd ed.); *Waste Materials and Byproducts in Concrete*, pp. 1-407 (2008 Springer), Kosmatks et al., *Fly Ash, Slag, Silica Fume, and Natural Pozzolans*, in *Design and Control of Concrete Mixtures*, pp. 57-72 (2006 Portland Cement Association, 14th ed.); Massazza, *Pozzolana and pozzolanic cements*, in *Lea's Chemistry of Cement and Concrete*, pp. 471-631 (2003 Elsevier, 4th ed.); and *Waste Materials Used in Concrete Manufacturing*, pp. 1-637 (1997 Noyes).

Since SCMs are industrial byproducts or lightly processed minerals, they have lower ecological footprints than OPC, as described by Schneider et al., *Sustainable cement production—present and future*, 2011 Cement Concrete Res. 41: 642-650; Sharp et al., *Novel cement systems*, 2010 Adv. Cem. res. 22: 195-202; Damtoft et al., *Sustainable development and climate change initiatives*, 2008 Cement Concrete Res. 38: 115-127; Phair, *Green chemistry for sustainable cement production and use*, 2006 Green Chem. 8: 763-780; and Placet et al., *Toward a Sustainable Cement Industry*, pp 1-92 (2002 Battelle, Substudy 7). For example, the $CO_2$ footprints of fly ash, blast furnace slag, steel slag, limestone fines and calcined natural pozzolans are 0.02-0.04, 0.13-0.16, 0.10-0.14, 0.16-0.19 and 0.18-0.22 t-$CO_2$ per t-SCM respectively, compared to OPC's $CO_2$ footprint of 0.70-0.92 t-$CO_2$ per t-cement. Substituting SCMs for OPC proportionally improves environmental metrics, with blended cements and non-Portland cements showing $CO_2$ footprints of only 0.28-0.67 and 0.26-0.50 t-$CO_2$ per t-cement respectively.

Blended cements, especially those employing fly ash and/or blast furnace slag as SCMs, are used worldwide in place of OPC for certain applications. In the U.S., blended cements are specified under ASTM C-595-06 as Portland-Pozzolan cement, Type IP(X), which allows 0-40% w/w replacement of OPC with a pozzolan (typically fly ash), and as Portland-blast furnace slag cement, Type IS(X), which allows 0-95% w/w replacement of OPC with blast furnace slag.

Blast furnace slag is a cementitious material that can replace up to 95% w/w of OPC in blended cements, and is typically used at 50% replacement level. But, its availability is limited, with U.S. and world production standing at 9 million and 250 million t respectively, or only 13 and 9% of OPC consumption respectively. Fly ash is available in much larger quantities, with U.S. and world production standing at 70 million and 700 million t, or on par with U.S. OPC consumption and some 25% of world OPC usage respectively. Its use in blended cements at low to moderate levels (0-50% replacement of OPC) can improve durability metrics such as ultimate compressive strength, permeability, salt resistance, rebar corrosion resistance, and freeze-thaw resistance. Fly ash is available at a low cost—in the range of $5-60 per t in the U.S., and in quantities large enough to satisfy the total demand for cement in the U.S. and some 25% of world cement demand.

Despite its availability and use potential, fly ash is highly underutilized with less than 15% of U.S. ash output going into blended cements, and with some 65% of ash sent for storage or disposal. This has resulted in the accumulation of over 500 million t of ash, a situation that seems certain to worsen as U.S. ash output is projected to increase to 100 million t by 2030. Unused ash carries significant public health and environmental burdens due to the presence of potentially toxic elements, and approaches for its safe and beneficial utilization in added value products such as cement are essential for the sustainable management of ash. Fly ash is reviewed on the publications, Ahmaruzzaman, *A review on the utilization of fly ash*, 2010 Prog. Energy Combust. Sci. 36: 327-363); Kelly et al., *Coal Combustion Products Statistics*, pp. 1-2 (2010 U.S. Geological Survey); *Coal Combustion Product Production & Use Survey Results*, pp. 1-2 (2009 American Coal Ash Association); *Beneficial Use of Secondary Materials—Coal Combustion Products*, pp. 1-95 (2008 U.S. Environmental Protection Agency); Nugteren, *Fly ash: From waste to industrial product*, 2007 Part. Part. Sys. Charact. 24: 49-55; Hall et al., *Fly ash quality, past, present and future, and the effect of ash on the development of novel products*, 2002 J. Chem. Technol. Biotechnol. 77: 234-239; and Rayzman, et al., *Technology for chemical-metallurgical coal ash utilization*, 1997 Energy Fuels 11: 761-773.

While fly ash is an attractive SCM, performance considerations limit the fly ash content in blended cements to less than 50% replacement of OPC, with U.S. states allowing a maximum substitution level in the range of just 15-25%. Despite the use of performance-enhancing chemical additives, the replacement of more than 25% of OPC with fly ash retards setting and the rate of hardness and compressive strength development, increases the demand for air-entraining agents, can adversely affect durability metrics such as salt resistance, and may require the use of increased cement content in cement compositions. For example, blended cements with 25% and 50% w/w replacement of OPC with fly ash typically show only 50-75% and 30-50% of the hardness and compressive strength development of OPC-based compositions, and can require 1-3 months to reach performance parity, as described in the publications, *Mineral Admixtures in Cement and Concrete*, pp. 1-248 (2011 CRC Press); *Supplementary Cementing Materials*, pp. 1-283 (2011 Springer); Lohtia et al., *Mineral Admixtures*, in *Concrete Admixtures Handbook*, pp. 657-739 (2006 Noyes, 2nd ed.); *Waste Materials and Byproducts in Concrete*, pp. 1-407 (2008 Springer), Kosmatks, et al., *Fly Ash, Slag, Silica Fume, and Natural Pozzolans*, in *Design and Control of Concrete Mixtures*, pp. 57-72 (2006 Portland Cement Association, 14th ed.); Massazza, *Pozzolana and pozzolanic cements*, in *Lea's Chemistry of Cement and Concrete*, pp. 471-631 (2003 Elsevier, 4th ed.); and *Waste Materials Used in Concrete Manufacturing*, pp. 1-637 (1997 Noyes).

Attempts to develop blended cements containing other SCMs such as limestone, steel slag and non-ferrous slags, have been hampered by similar albeit worse problems to OPC-fly ash cements. Thus, ASTM C-150 allows the addition of only 5% of limestone to OPC, due to concerns about setting retardation, poor strength development and excessive shrinkage at higher limestone contents. Blended cements made with steel slag and non-ferrous slags face a variety of problems including poor setting, slow hardness and strength development, delayed expansion, cracking, and poor freeze-thaw resistance.

Performance issues and the lack of industry-standard specifications for high-SCM content blended cements necessitate extensive pretesting to ensure durable cement compositions that meet building codes, and invariably lead to higher costs. As such, the availability and use of blended cements in the U.S. has been highly restricted, with the average replacement level of SCMs for OPC being less than 15%, and less than 3% of cement in the U.S. being blended cement. See e.g. Loreti, *Greenhouse Gas Emission Reductions from Blended Cement Production*, pp. 1-35 (2008 The Loreti Group); and *Characteristics of Portland and Blended Cements: Results of a Survey of Manufacturers*, pp. 83-101 (2006 IEEE Conference Proceedings).

Non-Portland cements, such as those based upon fly ash and/or blast furnace slag suffer from similar albeit worse problems to blended cements. For example, cements made from fly ash, or blends of fly ash with other SCMs, can display flash or delayed setting, poor hardness and compressive strength development, excessive shrinkage, aggregate-induced expansion, and poor long-term durability. Indeed, there is no industry-standard specification for non-Portland cements in the U.S., and no significant commercial production of such cements.

Various approaches have been used to elevate the performance of blended cements and non-Portland cements to that of OPC, the most successful being the use of chemical admixtures to improve such properties as setting, and the rate of hardness and compressive strength development. As generally described in the publications, *Chemical Admixtures for Concrete*, pp. 1-1 to 6-10 (1999 Taylor and Francis, 3rd ed.) and *Concrete Admixtures Handbook*, pp. 137-1024 (1996 Noyes, 2nd ed.), chemical admixtures are inorganic or organic compounds that are used to modify the physicochemical properties of cement compositions. These properties include viscosity, slump, water requirement, setting, hardness, compressive strength, shrinkage, porosity, air content, water resistance, freeze-thaw resistance, salt resistance and rebar corrosion resistance. Chemical admixtures such as sodium hydroxide, sodium silicate, sodium aluminate, sodium citrate, calcium chloride, calcium sulfate, calcium nitrate, calcium nitrite, calcium formate, citric acid, carboxylic acid-containing polymers and copolymers, and alkanolamines have long been used to regulate setting and hardness and compressive strength development in OPC, and have found similar albeit less utility in blended cements and non-Portland cements.

The prior art describes the application of calcium salts, citric acid, and citrate salts as accelerators for high-SCM content blended cements and SCM-based non-OPC cements. However, these approaches are often not placement/use equivalent to OPC, and give variable results in terms of setting, hardness and strength development, shrinkage, cracking, aggregate reactivity and/or long-term durability. Because of these issues, none of these approaches have found significant commercial applications, other than very specialized uses such as rapid-setting cements. The use of citric acid and citrate salts as accelerator(s) for blended cements and fly ash-based non-Portland cements is described U.S. Pat. Nos. 4,842,649, 4,997,484, 5,374,308, 5,536,310, 4,640,715, 4,642,137, 7,854,803, 7,288,148, U.S. Patent Application 2008178770A1 and U.S. Pat. No. 6,827,776. The use of calcium sulfate as accelerator for fly ash-based non-Portland cements is described in the publications, U.S. Pat. Nos. 5,439,518, 5,578,122, 4,240,952, 4,470,850 and 4,256,504. The use of calcium nitrate as an accelerator for blended cements is described in the publication, U.S. Patent Application 20110048285 A1.

The prior art also describes the use of highly alkaline chemical admixtures (also known as alkali activators) such as sodium hydroxide, potassium hydroxide, sodium silicate and sodium aluminate for forming so-called "geopolymers" with blended cements and SCM-based non-Portland cements. While the properties of geopolymer cements can match or exceed those of OPC or conventional blended cements, they have severe drawbacks—most notably that the admixtures are highly corrosive and required in large amounts (typically 5-25% of the cement content), that the cements are not use/placement equivalent to OPC and require special formulation, handling and curing, and that they lack long-term stability and durability. Indeed, there is currently no geopolymeric cement of commercial significance in the U.S. Alkali activators and geopolymer cements are described in the publications, *Alkali Activated Cements and Concretes*, pp. 1-334 (2006 Taylor and Francis); Duxson et al., *The role of inorganic polymer technology in the development of 'green concrete'*, 2007 Cement Concrete Res. 37: 1590-1597; Pachecho-Torgal et al., *Alkali-activated binders: A review Part 1. Historical background, terminology, reaction mechanisms and hydration products*, 2008 Constr. Build. Mater. 22: 1305-1314; Pachecho-Torgal et al., *Alkali-activated binders: A review. Part 2. About materials and binders manufacture*, 2008 Constr. Build. Mater. 22: 1315-1322; and Duxson et al., *Geopolymer technology: the current state of the art*, 2007 J. Mater. Sci. 42: 2917-2933.

While currently available chemical admixtures are useful for improving the properties of blended cements containing low to moderate levels of SCMs (up to 25% of fly ash, up to 50% of blast furnace slag, and up to 15% of limestone), their performance is not as satisfactory with higher levels of SCMs, and even less so with SCM-based non-Portland cements. To date there is no commercial general-use high-SCM content blended cement or non-Portland cement available in the U.S., despite the demand for such Green and sustainable cements as alternatives to OPC.

SUMMARY OF THE INVENTION

Thus, there is a need in the art for chemical admixtures that can improve the properties of blended cements containing high levels of SCMs and SCM-based non-Portland cements, and that can make them use/performance equivalent to OPC. In particular, there is a need for admixtures capable of improving setting, the rate of hardness and compressive strength development, shrinkage, permeability, and long-term durability indicators such as salt resistance and freeze-thaw resistance. Such admixtures would improve economics by enabling the partial or complete substitution of OPC, which costs $80-100 per t, with SCMs, which cost just $5-60 per t. Also, environmental and public health metrics would be greatly improved by reducing the natural resource use and pollution footprint deriving from OPC, and by increasing the beneficial use of SCMs and diverting them from storage and disposal.

It is an object of an embodiment this invention to provide a new class of chemical admixtures that improves the properties of cement compositions, particularly with regard to blended cements and non-Portland cements made with SCMs.

Accordingly, an embodiment of the present invention is directed to a new class of chemical admixtures for hydraulic cement compositions such as pastes, mortars, grouts and concretes. The cement compositions are comprised of Portland cement, or blended cements or non-Portland cements made with Supplementary Cementitious Materials (SCMs). The admixtures improve the properties of cement compositions, including setting, hardness, compressive strength, shrinkage and freeze-thaw resistance, thereby substantially obviating one or more of the problems due to limitations and disadvantages of the related art.

An object of the present invention is to provide an economical admixture that can be used to prepare hydraulic cement compositions that are cheaper, more environmentally friendly, and have a lower carbon footprint than traditional cement composition. Another object of the present invention is to enable Portland cement to be partially or completely replaced by SCMs in hydraulic cement compositions, while maintaining substantial use and performance equivalence.

The present invention provides the processes and methods for preparing the admixtures, and further provides methods in which they can be used in the manufacture of hydraulic cement compositions such as pastes, mortars, grouts and concretes. Additional features and advantages of the invention will be set forth in the descriptions that follow and in part will be apparent from the description, or may be learned by practice of the invention. The objectives and other advantages of the invention will be realized and attained by the structures and compositions particularly pointed out in the written description and claims thereof.

To achieve these and other advantages and in accordance with the purpose of the present invention, as embodied and broadly described, an embodiment of the present invention provides admixtures for hydraulic cement compositions, which contain complexes of metals and/or semi-metals with hydroxycarboxylic acid-derived ligands, and may be described by the following general empirical chemical formula:

$$A^1_a \ldots A^n_x B^1_{a'} \ldots B^n_{x'} [M^1_{a''} \ldots M^n_{x'} C^1_{a'''} \ldots C^n_{x''} L^1_{a''''} \ldots L^n_{x'''}]$$

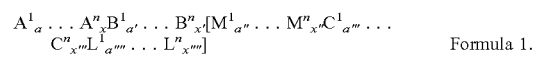

wherein, $A^1 \ldots A^n$ are cations; $B^1_{a'} \ldots B^n_{x'}$ are anions; $M^1 \ldots M^n$ are chelated metal and/or semi-metal cations; $C^1 \ldots C^n$ are coordinating ligands; and $L^1 \ldots L^n$ are chelating hydroxycarboxylic acid-derived ligands. The subscripts a and x; a' and x'; a" and x"; a''' and x'''; and a"" and x"" refer to the cation, anion, chelated metal, coordinating ligand, and chelating hydroxycarboxylic acid-derived ligand stoichiometries respectively. The admixtures described by the above general formula contain at least one chelated metal or semi-metal cation ($M^n_{x''}$), and at least one chelating hydroxycarboxylic acid-derived ligand ($L^n_{x'''}$). Furthermore, the admixtures may contain one or more cations ($A^n_x$), and/or one or more anions ($B^n_{x'}$) and/or one or more coordinating ligands ($C^n_{x'''}$).

Additional aspects and embodiments of the invention will be provided, without limitation, in the detailed description of the invention that is set forth below.

DETAILED DESCRIPTION OF THE INVENTION

Set forth below is a description of what are currently believed to be preferred embodiments of the claimed invention. Any alternates or modifications in function, purpose, or structure are intended to be covered by the claims of this application. As used in this specification and the appended claims, the singular forms "a," "an," and "the" include plural referents unless the context clearly dictates otherwise. The terms "comprises" and/or "comprising," as used in this specification and the appended claims, specify the presence of stated features, integers, steps, operations, elements, and/or components, but do not preclude the presence or addition of one or more other features, integers, steps, operations, elements, components, and/or groups thereof.

The term "cement composition" as used herein refers to pastes, mortars and concretes. The cement compositions are comprised of Portland cement, or blended or non-Portland cements made with Supplementary Cementitious Materials (SCMs).

The admixtures contain complexes of metals and/or semimetals with hydroxycarboxylic acid-derived ligands, and may be described by the following general empirical chemical formula:

$$A^1_a \ldots A^n_x B^1_{a'} \ldots B^n_{x'} [M^1_{a''} \ldots M^n_{x''} C^1_{a'''} \ldots C^n_{x'''} L^1_{a''''} \ldots L^n_{x''''}]$$ Formula 1.

In the above general formula, $A^1 \ldots A^n$ are cations; $B^1_{a'} \ldots B^n_{x'}$ are anions; $M^1 \ldots M^n$ are chelated metal and/or semi-metal cations; $C^1 \ldots C^n$ are coordinating ligands; and $L^1 \ldots L^n$ are chelating hydroxycarboxylic acid-derived ligands. The subscripts a and x; a' and x'; a" and x"; a''' and x'''; and a"" and x"" refer to the cation, anion, chelated metal, coordinating ligand, and chelating hydroxycarboxylic acid-derived ligand stoichiometries respectively. The admixtures, described by the above general formula, contain at least one chelated metal or semi-metal cation ($M^n_{x''}$), and at least one chelating hydroxycarboxylic acid-derived ligand ($L^n_{x'''}$). Furthermore, the admixtures may contain one or more cations ($A^n_x$), and/or one or more anions ($B^n_{x'}$) and/or one or more coordinating ligands ($C^n_{x'''}$).

The cations ($A^1_a \ldots A^n_x$) in Formula 1 are in particular selected from, but not limited to the examples detailed below and depicted in Table 1 (structures in Table 1 that correspond to the listed examples are identified parenthetically):

(i) The ammonium ion ($NH_4^+$), and alkyl-, cycloalkyl-, aryl-, arylalkyl and/or heteroaryl-substituted ammonium ions (1-4), as exemplified by but not limited to the tetramethylammonium, ethyltrimethylammonium, butyltrimethylammonium, cyclohexylammonium, dicyclohexylammonium, and benzyltrimethylammoniun ions.

(ii) Cations of alkyl-, cycloalkyl-, aryl-, and/or arylalkyl- and/or heteroaryl-substituted aminoalcohols, as exemplified but not limited to the 2-hydroxyethylammonium, bis(2-hydroxyethyl)ammonium, and tris(2-hydroxyethyl)ammonium ions (5-7).

(iii) The proton ($H^+$), and metal cations, as exemplified by but not limited to ions of the lithium family (Group IA, 8), and beryllium family (Group IIA, 9).

TABLE 1

Examples of Cations ($A^n_x$)

  1

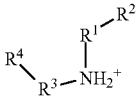  2

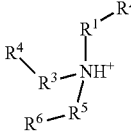  3

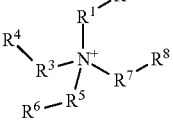  4

$R^{1,3,5,7}$ = alkylene/heteroalkylene ($C_{0-18}N_{0-6}O_{0-6}$), cycloalkylene/cycloheteroalkylene ($C_{3-8}N_{0-3}O_{0-3}$), arylene/heteroalkylene ($C_{3-14}N_{0-3}$); $R^{2,4,6,8}$ = H, alkyl/heteroalkyl ($C_{0-18}N_{1-6}O_{0-6}$), cycloalkyl/cycloheteroalkyl ($C_{3-8}N_{1-3}O_{0-3}$), aryl/heteroaryl ($C_{3-14}N_{1-3}$).

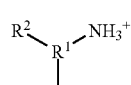  5

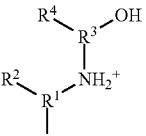  6

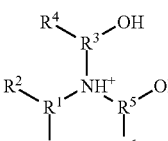  7

$R^{1,3,5}$ = alkylene/heteroalkylene ($C_{0-18}N_{0-6}O_{0-6}$), cycloalkylene/cycloheteroalkylene ($C_{3-8}N_{0-3}O_{0-3}$), arylene/heteroalkylene ($C_{3-14}N_{0-3}$); $R^{2,4,6}$ = H, alkyl/heteroalkyl ($C_{0-18}N_{1-6}O_{0-6}$), cycloalkyl/cycloheteroalkyl ($C_{3-8}N_{1-3}O_{0-3}$), aryl/heteroaryl ($C_{3-14}N_{1-3}$).

$H^+$ $Li^+$ $Na^+$ $K^+$ $Rb^+$ $Cs^+$  8
$Be^{2+}$ $Mg^{2+}$ $Ca^{2+}$ $Sr^{2+}$ $Ba^{2+}$  9

The anions ($B^1_a \ldots B^n_x$) in Formula 1 are in particular selected from, but not limited to the examples detailed below and depicted in Table 2 (structures in Table 2 that correspond to the listed examples are identified parenthetically):

(i) Metal, non-metal, and semi-metal anions, as exemplified by but not limited to ions of the boron family (Group IIIA, 10), carbon family (Group IVA, 11), nitrogen family (Group VA, 12), oxygen family (Group VIA, 13) and fluorine family (Group VIIA, 14), and derivatives thereof (15).

(ii) The anions of aliphatic, cycloaliphatic, aromatic arylaliphatic and heteroaromatic sulfonic acids (16), as exemplified by, but not limited to methanesulfonic acid, ethanesulfonic acid, propane-1-sulfonic acid, butane-1-sulfonic acid, cyclohexanesulfonic acid, benzenesulfonic acid, 4-methylbenzenesulfonic acid (tosic acid), and pyridine-3-sulfonic acid.

(iii) The anions of aliphatic, cycloaliphatic, aromatic arylaliphatic and heteroaromatic sulfate monoesters (17), as exemplified by, but not limited to prop-1-yl sulfate, but-1-yl sulfate, hex-1-yl sulfate, dec-1-yl sulfate, dodec-1-yl sulfate (lauryl sulfate), tetradec-1-yl sulfate (myristyl sulfate), hexadec-1-yl sulfate (palmityl sulfate), octadec-1-yl sulfate (stearyl sulfate), and phenylmethyl sulfate (benzyl sulfate).

(iv) The anions of aliphatic, heteroaliphatic, cycloaliphatic, cycloheteroaliphatic, aromatic, arylaliphatic and heteroaromatic monocarboxylic acids (18), as exemplified by, but not limited to ethanoic acid (acetic acid), propanoic acid (propionic acid), butanoic acid (butyric acid), pentanoic acid (valeric acid), hexanoic acid (caproic acid), heptanoic acid (ananthic acid), heptanoic acid (caprylic acid), octanoic acid (pelargonic acid), decanoic acid (capric acid), dodecanoic acid (lauric acid), tetradecanoic acid (myristic acid), hexadecanoic acid (palmitic acid), octadecanoic acid (stearic acid), 2-methylpropanoic acid (isobutyric acid), 2-ethylhaxanoic acid (octoic acid), 2-methyloctadecanoic acid (2-methylstearic acid), ethoxyethanoic acid (ethoxyacetic acid), (2'-ethoxyethoxy)ethanoic acid, cyclopentane carboxylic acid, cyclohexane carboxylic acid, benzoic acid, 4-methylbenzenecarboxylic acid (p-toluic acid), napthalene1-carboxylic acid (1-napthoic acid), phenylacetic acid, 3-phenylpronanoic acid, and pyridine-2-carboxylic acid (2-picolinic acid).

TABLE 2

| Examples of Anions ($B^n_{x'}$) | |
|---|---|
| $BO_2^-$ $BO_3^{3-}$ $B_2O_5^{4-}$ $B_3O_7^{5-}$ $B_4O_7^{2-}$ $B_4O_9^{6-}$ | 10 |
| $CO_3^{2-}$ $HCO_3^-$ $SiO_3^{2-}$ $SiO_2(OH)_2^{2-}$ $SiO_4^{4-}$ | 11 |

TABLE 2-continued

| Examples of Anions ($B^n_{x'}$) | |
|---|---|
| $NO_2^-$ $NO_3^-$ $HPO_3^{2-}$ $PO_3^{3-}$ $HPO_4^{2-}$ $PO_4^{3-}$ $P_6O_{18}^{6-}$ | 12 |
| $OH^-$ $S^{2-}$ $SO_3^{2-}$ $SO_4^{2-}$ $S_2O_3^{2-}$ $S_4O_6^{2-}$ | 13 |
| $F^-$ $Cl^-$ $Br^-$ $I^-$ $ClO_3^-$ | 14 |
| $TiF_6^{2-}$ $BF_4^-$ $AlF_6^{3-}$ $SiF_6^{2-}$ $PFO_3^{2-}$ $PF_2O_2^-$ $PF_6^-$ $SFO_3^-$ | 15 |
| 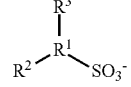 | 16 |
| 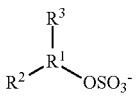 | 17 |
| 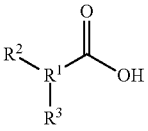 | 18 |

$R^1$ = alkylene/heteroalkylene ($C_{0-18}N_{0-6}O_{0-6}$), cycloalkylene/cycloheteroalkylene ($C_{3-8}N_{0-3}O_{0-3}$), arylene/heteroalkylene ($C_{3-14}N_{0-3}$); $R^{2,3}$ = H, alkyl/heteroalkyl ($C_{0-18}N_{1-6}O_{0-6}$), cycloalkyl/cycloheteroalkyl ($C_{3-8}N_{1-3}O_{0-3}$), aryl/heteroaryl ($C_{3-14}N_{1-3}$).

The chelated metal/semi-metal cations ($M^1_{a''} \ldots M^n_{x''}$) in Formula 1 are in particular selected from, but not limited to the examples detailed below and depicted in Table 3 (structures in Table 3 that correspond to the listed examples are identified parenthetically):

(i) Metal and/or semi-metal cations, as exemplified by but not limited to ions of the beryllium family (Group IIA, 19), scandium family (Group IIIB, 20), titanium family (Group IVB, 21), vanadium family (Group VB, 22), chromium family (Group VIB, 23), manganese, iron, cobalt, nickel, copper and zinc families (Groups IB, IIB, VIIB and VIIIB, 24), boron family (Group IIIA, 25), carbon family (Group IVA, 26), and nitrogen family (Group VA, 27).

(ii) Oxocations, as exemplified by but not limited to oxocations and peroxocations of the titanium family (Group IVB, 28), vanadium family (Group VB, 29), chromium family (Group VIB, 30), and nitrogen family (Group VA, 31).

TABLE 3

Examples of Metal Cations ($M^n_{x''}$) Chelating Hydroxycarboxylic Acid-Derived Ligands

| | | | |
|---|---|---|---|
| $Be^{2+}$ $Mg^{2+}$ $Ca^{2+}$ $Sr^{2+}$ $Ba^{2+}$ | $Sc^{3+}$ $Y^{3+}$ $La^{3+}$ $Ce^{3+}$ $Ce^{4+}$ $Eu^{3+}$ | | $Ti^{4+}$ $Zr^{4+}$ $Hf^{4+}$ |
| 19 | 20 | | 21 |
| $V^{3+}$ $V^{4+}$ $V^{5+}$ $Nb^{3+}$ $Nb^{4+}$ $Nb^{5+}$ $Ta^{3+}$ $Ta^{4+}$ $Ta^{5+}$ | $Cr^{3+}$ $Mo^{4+}$ $Mo^{6+}$ $W^{6+}$ | | $Mn^{2+}$ $Fe^{2+}$ $Fe^{3+}$ $Co^{2+}$ $Ni^{2+}$ $Cu^{2+}$ $Zn^{2+}$ |
| 22 | 23 | | 24 |
| $B^{3+}$ $Al^{3+}$ $Ga^{3+}$ $In^{3+}$ | $Ge^{4+}$ $Sn^{2+}$ $Sn^{4+}$ $Sb^{3+}$ $Sb^{5+}$ $Bi^{3+}$ | | $TiO^{2+}$ $[Ti_2(O_2)_2]^{4+}$ $[Ti_4(O_2)_4]^{8+}$ $ZrO^{2+}$ $HfO^{2+}$ |
| 25 | 26 | 27 | 28 |
| $VO^{3+}$ $VO_2^+$ $NbO^{3+}$ $TaO^{3+}$ $TaO_2^+$ | $MoO^{4+}$ $MoO^{3+}$ $MoO_2^+$ $WO^{4+}$ $WO_2^{2+}$ $WO^{3+}$ $WO_2^+$ | | $SbO^+$ $BiO^+$ |
| 29 | 30 | | 31 |

The coordinating ligands ($C^1_{a'''} \ldots C^n_{x'''}$) in Formula 1 are in particular selected from, but not limited to the examples detailed below and depicted in Table 4 (structures in Table 4 that correspond to the listed examples are identified parenthetically):

(i) Water ($H_2O$).

(ii) The anions of aliphatic, heteroaliphatic, cycloaliphatic, cycloheteroaliphatic, aromatic, arylaliphatic and heteroaromatic monocarboxylic acids (32), as exemplified by, but not limited to ethanoic acid (acetic acid), propanoic acid (propionic acid), butanoic acid (butyric acid), pentanoic acid (valeric acid), hexanoic acid (caproic acid), heptanoic acid (ananthic acid), heptanoic acid (caprylic acid), octanoic acid (pelargonic acid), decanoic acid (capric acid), dodecanoic acid (lauric acid), tetradecanoic acid (myristic acid), hexadecanoic acid (palmitic acid), octadecanoic acid (stearic acid), 2-methylpropanoic acid (isobutyric acid), 2-ethylhaxanoic acid (octoic acid), 2-methyloctadecanoic acid (2-methylstearic acid), ethoxyethanoic acid (ethoxyacetic acid), (2'-ethoxyethoxy)ethanoic acid, cyclopentane carboxylic acid, cyclohexane carboxylic acid, furan-2-carboxylic acid (2-furoic acid), benzoic acid, 4-methylbenzenecarboxylic acid (p-toluic acid), napthalene 1-carboxylic acid (1-napthoic acid), phenylacetic acid, 3-phenylpronanoic acid, and pyridine-2-carboxylic acid (2-picolinic acid).

(iii) The anions of aliphatic, heteroaliphatic, cycloaliphatic, cycloheteroaliphatic, aromatic, arylaliphatic and heteroaromatic dicarboxylic acids (33), as exemplified by but not limited to ethanedioic acid (oxalic acid), propane-1,3-dioic acid (malonic acid), butane-1,4-dioic acid (succinic acid), pentane-1,5-dioic acid (glutaric acid), hexane-1,6-dioic acid (adipic acid), heptane-1,7-dioic acid (pimelic acid), octane-1,8-dioic acid (suberic acid), nonane-1,9-dioic acid (azealic acid), decane-1,10-dioic acid (sebacic acid), dodecane-1,12-dioic acid, tetradecane-1,14-dioic acid, hexadecane-1,16-dioic acid, octadecane-1,18-dioic acid, cyclohexane-1,2-dicarboxylic acid, furan-2,5-dicarboxylic acid, benzene-1,2-dicarboxylic acid (phthalic acid), benzene-1,3-dicarboxylic acid (isophthalic acid), and benzene-1,4-dicarboxylic acid (terephthalic acid).

(iv) The anions of aliphatic, heteroaliphatic, cycloaliphatic, cycloheteroaliphatic, aromatic, arylaliphatic and heteroaromatic tricarboxylic acids (34), as exemplified by but not limited to 3-carboxypentane-1,5-dioic acid (carballylic acid), benzene-1,2,4-tricarboxylic acid (trimellitic acid), and benzene-1,3,5-tricarboxylic acid (trimesic acid).

(v) The anions of alkyl, heteroalkyl, cycloalkyl, cycloheteroalkyl, aryl, arylalkyl and heteroaryl-substituted unsaturated aliphatic monocarboxylic acids (35), as exemplified by but not limited to (E)-but-2-enoic acid (crotonic acid), (E)-2-methylbut-2-enoic acid (tiglic acid), and (E)-3-phenylprop-2-enoic acid (cinnamic acid).

(vi) The anions of alkyl, heteroalkyl, cycloalkyl, cycloheteroalkyl, aryl, arylalkyl and heteroaryl-substituted unsaturated aliphatic dicarboxylic acids (36), as exemplified by but not limited to (Z)-but-2-ene-1,4-dioic acid (maleic acid), and (E)-but-2-ene-1,4-dioic acid (fumaric acid).

(vii) The anions of aliphatic, aromatic or mixed aliphatic-aromatic polycarboxylic acids, polycarboxylic acid copolymers and their derivatives, as exemplified by but not limited to poly(acrylic acid), poly(methacrylic acid), poly(itaconic acid), poly(maleic acid), poly(acrylic acid-co-maleic acid), poly(ethylene-co-acrylic acid), poly(ethylene-co-methacrylic acid), poly(ethylene-co-maleic acid), poly(styrene-co-maleic acid), poly(methyl vinyl ether-alt-maleic acid), poly(acrylic acid)-poly(ethylene glycol) methyl ether esters, and poly(methacrylic acid)-poly(propylene glycol) methyl ether esters.

(viii) Aliphatic, heteroaliphatic, cycloaliphatic, cycloheteroaliphatic, aromatic, arylaliphatic and heteroaromatic diols (37), triols, and polyols, as exemplified by but not limited to ethane-1,2-diol (ethylene glycol), propane-1,2-diol, propane-1,3-diol, butane-1,2-diol, butane-1,3-diol, butane-2,3-diol, butane-1,4-diol, benzene-1,2-diol (catechol), benzene-1,3-diol (resorcinol), 4-methylbenzene-1,2-diol (4-methylcatechol), propane-1,2,3-triol (glycerol), butane-1,2,4-triol, hexane-1,2,6-triol, benzene-1,2,3-triol (pyrogallol), benzene-1,2,4-triol (hydroxyhydroquinone), benzene-1,3,5-triol (phloroglucinol), hexane-1,2,3,4,5,6-hexaol (sorbitol), 2-(2'-hydroxyethoxy)ethanol (diethylene glycol), and 2-[2'-(2''-hydroxyethoxy)ethoxy]ethanol (triethylene glycol).

(ix) Aliphatic, heteroaliphatic, cycloaliphatic, cycloheteroaliphatic, aromatic, arylaliphatic and heteroaromatic hydroxynitriles (38), as exemplified by but not limited to 3-hydroxypropanenitrile, 3-hydroxybutanenitrile, 4-hydroxybutanenitrile, and 5-hydroxypentanenitrile.

(x) Aliphatic, heteroaliphatic, cycloaliphatic, cycloheteroaliphatic, aromatic, arylaliphatic and heteroaromatic diamines (39), as exemplified by but not limited to ethane-1,2-diamine (ethylene diamine), propane-1,2-diamine, propane-1,3-diamine, butane-1,4-diamine, xexane-1,6-diamine, and cyclohexane-1,2-diamine.

(xi) Aliphatic, heteroaliphatic, cycloaliphatic, cycloheteroaliphatic, aromatic, arylaliphatic and heteroaromatic aminonitriles (40), as exemplified but not limited to 3-aminopropanenitrile, 3-aminopentanenitrile, 5-aminopentanenitrile, and 6-aminohexanenitrile.

(xii) Aliphatic, heteroaliphatic, cycloaliphatic, cycloheteroaliphatic, aromatic, arylaliphatic and heteroaromatic aminoalcohols (41-43), as exemplified by but not limited to 2-aminoethanol (ethanolamine), 2-aminopropan-1-ol, 2-aminobutan-1-ol, 4-aminobutan-1-ol, bis(2-hydroxyethyl)amine(diethanolamine), tris(2-hydroxyethyl)amine(triethanolamine), 2-(2'-aminoethoxy)ethanol (diethylene glycol amine), 2-aminophenol, and 3-aminophenol.

TABLE 4

Examples of Coordinating Ligands ($C^n_{x'''}$)

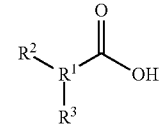

32

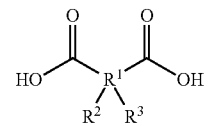

33

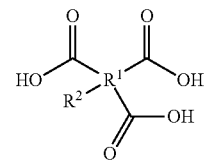

34

$R^{1,6}$ = alkylene/heteroalkylene ($C_{0-18}N_{0-6}O_{0-6}$),
cycloalkylene/cycloheteroalkylene ($C_{3-8}N_{0-3}O_{0-3}$),
arylene/heteroalkylene ($C_{3-14}N_{0-3}$); $R^{2,3,4,5}$ = H, alkyl/heteroalkyl

TABLE 4-continued

Examples of Coordinating Ligands ($C''_{x'''}$)

$(C_{0-18}N_{1-6}O_{0-6})$, cycloalkyl/cycloheteroalkyl $(C_{3-8}N_{1-3}O_{0-3})$, aryl/heteroaryl $(C_{3-14}N_{1-3})$.

35

[Structure 35: alkene with R³, R⁵, R⁴ on one carbon and R¹, R², COOH on the other]

36

[Structure 36: HOOC-CR⁶R⁵=CR³R⁴-CR¹R²-COOH type alkene diacid]

37

[Structure 37: central carbon bearing HO, OH, R¹, R², R³]

$R^{1,6}$ = alkylene/heteroalkylene $(C_{0-18}N_{0-6}O_{0-6})$, cycloalkylene/cycloheteroalkylene $(C_{3-8}N_{0-3}O_{0-3})$, arylene/heteroarylene $(C_{3-14}N_{0-3})$; $R^{2,3,4,5}$ = H, alkyl/heteroalkyl $(C_{0-18}N_{1-6}O_{0-6})$, cycloalkyl/cycloheteroalkyl $(C_{3-8}N_{1-3}O_{0-3})$, aryl/heteroaryl $(C_{3-14}N_{1-3})$.

38

[Structure 38: central carbon with HO, CN, R¹, R², R³]

39

[Structure 39: central carbon with H₂N, NH₂, R¹, R², R³]

40

[Structure 40: central carbon with H₂N, CN, R¹, R², R³]

$R^1$ = alkylene/heteroalkylene $(C_{0-18}N_{0-6}O_{0-6})$, cycloalkylene/cycloheteroalkylene $(C_{3-8}N_{0-3}O_{0-3})$, arylene/heteroarylene $(C_{3-14}N_{0-3})$; $R^{2,3}$ = H, alkyl/heteroalkyl $(C_{0-18}N_{1-6}O_{0-6})$, cycloalkyl/cycloheteroalkyl $(C_{3-8}N_{1-3}O_{0-3})$, aryl/heteroaryl $(C_{3-14}N_{1-3})$.

41

[Structure 41: R²-R¹(OH)-NH₂ amino alcohol]

42

[Structure 42: diethanolamine-type with R² R¹ OH, NH, R³ R⁴ OH]

43

[Structure 43: triethanolamine-type N with three R-OH arms and R⁶]

$R^{1,3,5}$ = alkylene/heteroalkylene $(C_{0-18}N_{0-6}O_{0-6})$, cycloalkylene/cycloheteroalkylene $(C_{3-8}N_{0-3}O_{0-3})$, arylene/heteroarylene $(C_{3-14}N_{0-3})$; $R^{2,4,6}$ = H, alkyl/heteroalkyl $(C_{0-18}N_{1-6}O_{0-6})$, cycloalkyl/cycloheteroalkyl $(C_{3-8}N_{1-3}O_{0-3})$, aryl/heteroaryl $(C_{3-14}N_{1-3})$.

The chelating hydroxycarboxylic acid-derived ligands $L^1_{a'''}L^2_{b'''} \ldots L^n_{x'''}$ are selected from, but not limited to the examples detailed below and depicted in Tables 5-7 (structures in Tables 5-7 that correspond to the listed examples are identified parenthetically):

(i) Anions of aliphatic hydroxycarboxylic acids with a single hydroxyl group and a single carboxyl group, as exemplified by but not restricted to hydroxyacetic acid (glycolic acid, 45), 3-hydroxypropanoic acid (46), 2-hydroxypropanoic acid (lactic acid, 47), 4-hydroxybutanoic acid (4-hydroxybutyric acid, 48), 3-hydroxybutanoic acid (3-hydroxybutyric acid, 49), 2-hydroxybutanoic acid (2-hydroxybutyric acid, 50), 3-hydroxy-2-methylpropanoic acid (3-hydroxyisobutyric acid, 51), 2-hydroxypentanoic acid (52), 3-hydroxypentanoic acid (53), and 3-hydroxy-3-methylbutanoic acid (54).

(ii) Anions of aliphatic hydroxycarboxylic acids with two or more hydroxyl and/or carboxyl groups, as exemplified by but not restricted to 2-hydroxypropane-1,3-dioic acid (tartronic acid, 55), 2-hydroxybutane-1,4-dioic acid (malic acid, 56), 2-hydroxypentane-1,5-dioic acid (57), 2-hydroxy-2-methylbutane-1,4-dioic acid (citramalic acid, 58), 3-carboxy-3-hydroxypentane-1,5-dioic acid (citric acid, 59), 3-carboxy-3-hydroxyhexane-1,6-dioic acid (homocitric acid, 60), 2,3-dihydroxypropanoic acid (glyceric acid, 61), 3,5-dihydroxy-3-methylpentanoic acid (mevalonic acid, 62), 2,3-dihydroxybutane-1,4-dioic acid (tartaric acid, 63), 2,3,4-trihydroxybutanoic acid (threonic acid, 64), 2,3,4,5,6-pentahydroxyhexanoic acid (gluconic acid, 65), and 2,3,4,5-tetrahydroxyhexane-1,6-dioic acid (mucic acid, 66).

(iii) Anions of cycloaliphatic hydroxycarboxylic acids, as exemplified by but not restricted to 1,3,4,5-tetrahydroxycyclohex-1-carboxylic acid (quinic acid, 67), and 3,4,5-trihydroxycyclohex-1-ene-1-carboxylic acid (shikimic acid, 68).

(iv) Anions of functionalized aliphatic or cycloaliphatic hydroxycarboxylic acids, as exemplified by but not restricted to 2-(2'-hydroxyethoxy)butane-1,4-dioic acid (hydroxyethylsuccinic acid, 69), 3-hydroxy-2-oxo-propanoic acid (hydroxypyruvic acid, 70), N,N-bis(2'-hydroxyethyl)-aminoethanoic acid (Bicine, 71), 2-amino-3-hydroxypropanoic acid (serine, 72), 2-amino-3-hydroxybutanoic acid (threonine, 73), 3-amino-4-hydroxybutanoic acid (homoserine, 74), 2-amino-4-hydroxybutanoic acid (□-homoserine, 75), 4-hydroxypyrrolidine-2-carboxylic acid (4-hydroxyproline, 76), and 3-hydroxypyrrolidine-2-carboxylic acid (3-hydroxyproline, 77).

TABLE 5

Examples of Chelating Hydroxycarboxylic Acid Ligands

44

[Structure 44: complex ligand with Y, R², R⁵, R⁸, Y groups; R¹⁰—R¹—(R⁴)ₙ—R⁷—R¹¹ backbone with R³, R⁶, R⁹ and X, X, X substituents]

X = H or OH; Y = H or CO₂H; $R^{1,2,3,4,5,6,7,8,9}$ = alkylene/heteroalkylene $(C_{1-18}N_{0-6}O_{0-6})$, cycloalkylene/cycloheteroalkylene $(C_{3-8}N_{0-3}O_{0-3})$, arylene/heteroarylene $(C_{3-14}N_{0-3})$; $R^{10,11}$ = H, alkyl/heteroalkyl $(C_{0-18}N_{1-6}O_{0-6})$, cycloalkyl/cycloheteroalkyl $(C_{3-8}N_{1-3}O_{0-3})$, aryl/heteroaryl $(C_{3-14}N_{1-3})$.

45

[Structure 45: HO–CH₂–C(=O)–OH, glycolic acid]

TABLE 5-continued
Examples of Chelating Hydroxycarboxylic Acid Ligands
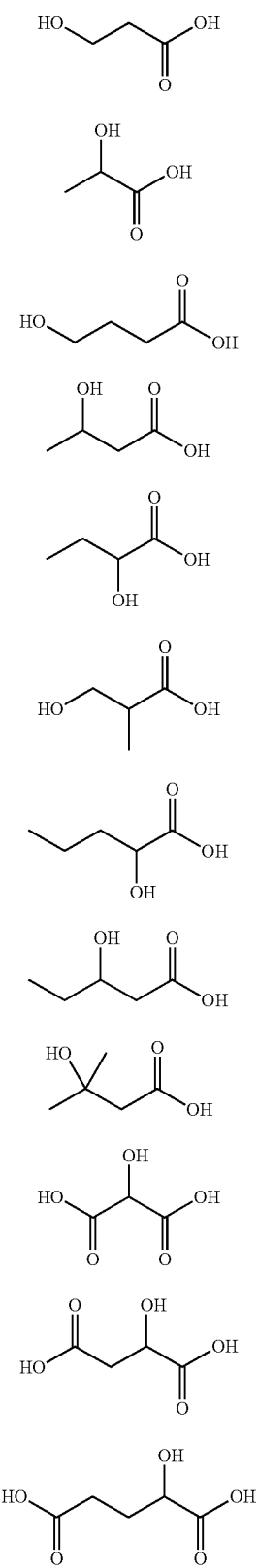
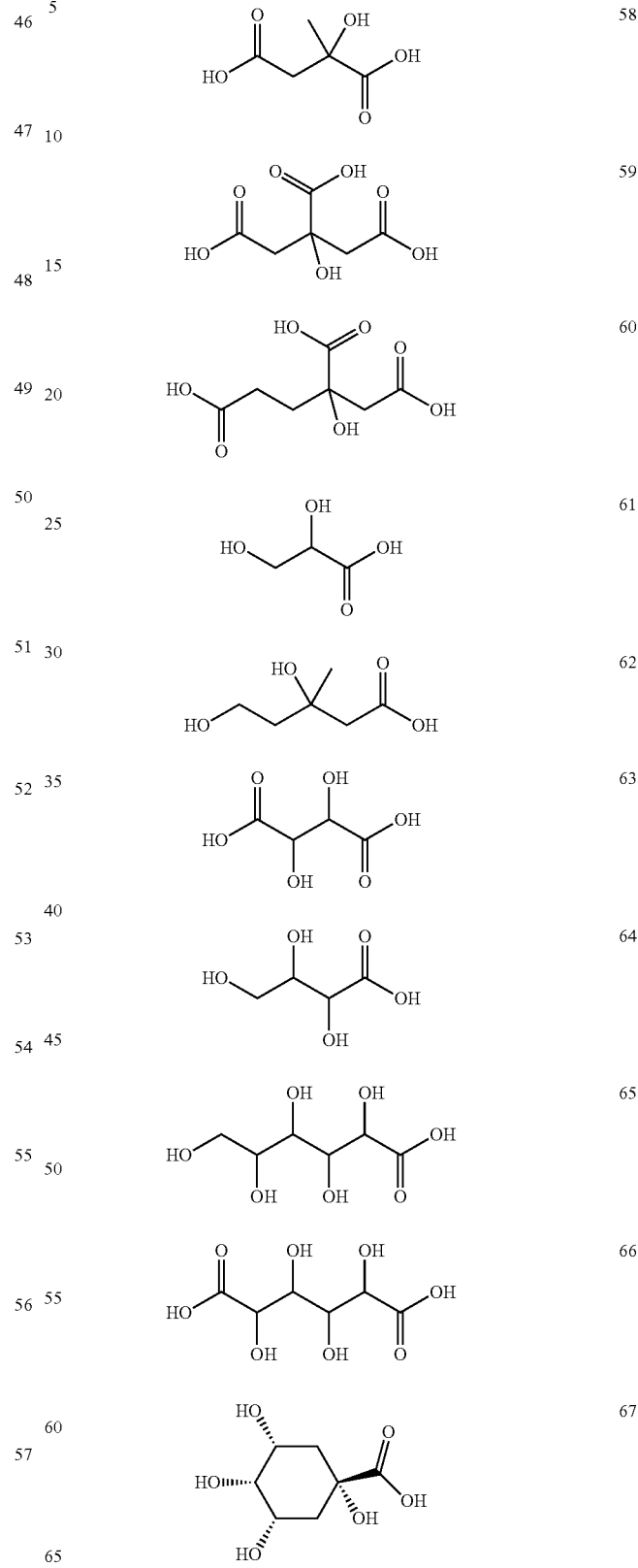

TABLE 5-continued

Examples of Chelating Hydroxycarboxylic Acid Ligands

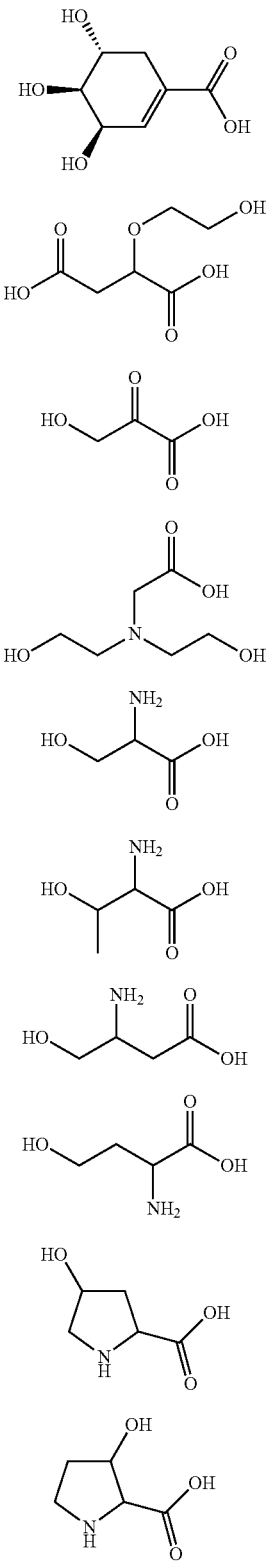

68
69
70
71
72
73
74
75
76
77

(v) Anions of aryalkylhydroxycarboxylic acids, as exemplified by but not restricted to 3-hydroxy-2-phenylpropanoic acid (tropic acid, 78), 2-hydroxy-2-phenylethanoic acid (mandelic acid, 79), and 2-hydroxy-2-(3',4'-dihydroxyphenyl)ethanoic acid (3,4-dihydroxymandelic acid, 80).

(vi) Anions of aromatic hydroxycarboxylic acids, exemplified by but not restricted to 2-hydroxybenzoic acid (salicylic acid, 81), 2,3-dihydroxybenzoic acid (3-hydroxysalicylic acid, 82), 2,4-dihydroxybenzoic acid (4-hydroxysalicylic acid, 83), 2,5-dihydroxybenzoic acid (5-hydroxysalicylic acid, 84), 2,6-dihydroxybenzoic acid (6-hydroxysalicylic acid, 85), 3,4,5-trihydroxybenzoic acid (gallic acid, 86), 4-hydroxy-3-methoxybenzoic acid (vanillic acid, 87), 3-hydroxybenzene-1,2-dicarboxylic acid (3-hydroxyphthalic acid, 88), and 4-hydroxybenzene-1,2-dicarboxylic acid (4-hydroxyphthalic acid, 89).

(vii) Anions of aryalkenylhydroxycarboxylic acids, as exemplified by but not restricted to 3-(2'-hydroxyphenyl)prop-2-enoic acid (o-coumaric acid, 90), 3-(3'-hydroxyphenyl)prop-2-enoic acid m-coumaric acid, 91), 3-(4'-hydroxyphenyl)prop-2-enoic acid (p-coumaric acid, 92), 3-(3',4'-dihydroxyphenyl)prop-2-enoic acid (caffeic acid, 93), and 3-(3'-methoxy-4'-hydroxyphenyl)prop-2-enoic acid (ferulic acid, 94).

(viii) Anions of functional arylhydroxycarboxylic acids, as exemplified by but not restricted to 2-amino-2-(4'-hydroxyphenyl)ethanoic acid (hydroxyphenylglycine, 95), and 2-amino-3-(3',4'-dihydroxyphenyl)propanoic acid (dihydroxyphenylalanine, DOPA, 96).

(ix) Anions of heterocyclic hydroxycarboxylic acids, as exemplified by but not restricted to 3-hydroxypyridine-2-carboxylic acid (3-hydroxypicolinic acid, 97), 4-hydroxypyridine-2-carboxylic acid (4-hydroxypicolinic acid, 98), 6-hydroxypyridine-2-carboxylic acid (6-hydroxypicolinic acid, 99), 2-hydroxypyridine-5-carboxylic acid (6-hydroxynicotinic acid, 100), 2-hydroxypyridine-3-carboxylic acid (2-hydroxynicotinic acid, 101), 3-hydroxypyridine-4-carboxylic acid (3-hydroxyisonicotinic acid, 102), and 2-hydroxyquinoline-4-carboxylic acid (103).

(x) Anions of conjugates of aliphatic and aromatic hydroxycarboxylic acids, as exemplified by but not restricted to chlorogenic acid (104).

TABLE 6

Further Examples of Chelating Hydroxycarboxylic Acid Ligands

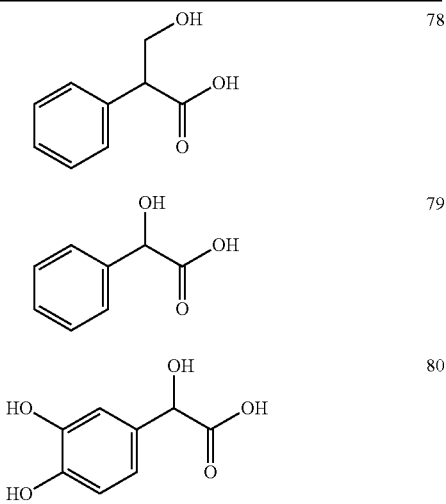

78
79
80

TABLE 6-continued

Further Examples of Chelating Hydroxycarboxylic Acid Ligands

| No. | Structure |
|---|---|
| 81 | 2-hydroxybenzoic acid (salicylic acid) |
| 82 | 2,3-dihydroxybenzoic acid |
| 83 | 2,4-dihydroxybenzoic acid |
| 84 | 2,5-dihydroxybenzoic acid |
| 85 | 2,6-dihydroxybenzoic acid |
| 86 | 3,4,5-trihydroxybenzoic acid (gallic acid) |
| 87 | 4-hydroxy-3-methoxybenzoic acid (vanillic acid) |
| 88 | 2,6-dihydroxy-benzene-1,2-dicarboxylic acid |
| 89 | 4-hydroxy-benzene-1,2-dicarboxylic acid |
| 90 | 2-hydroxycinnamic acid |
| 91 | 3-hydroxycinnamic acid |
| 92 | 4-hydroxycinnamic acid (p-coumaric acid) |
| 93 | 3,4-dihydroxycinnamic acid (caffeic acid) |
| 94 | 4-hydroxy-3-methoxycinnamic acid (ferulic acid) |
| 95 | 4-hydroxyphenylglycine |
| 96 | 3,4-dihydroxyphenylalanine (DOPA) |
| 97 | 3-hydroxypyridine-2-carboxylic acid |

TABLE 6-continued

Further Examples of Chelating Hydroxycarboxylic Acid Ligands

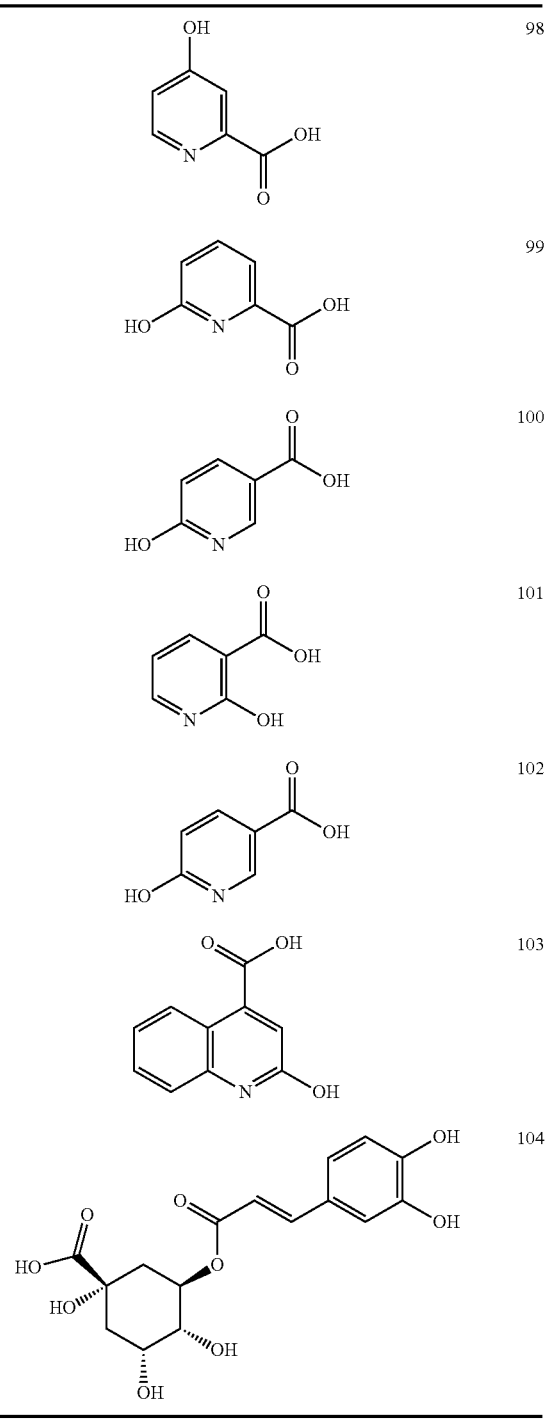

TABLE 7

Examples of Chelating Hydroxycarboxylic Acid Derivative Ligands ($C^n_{x'''}$)

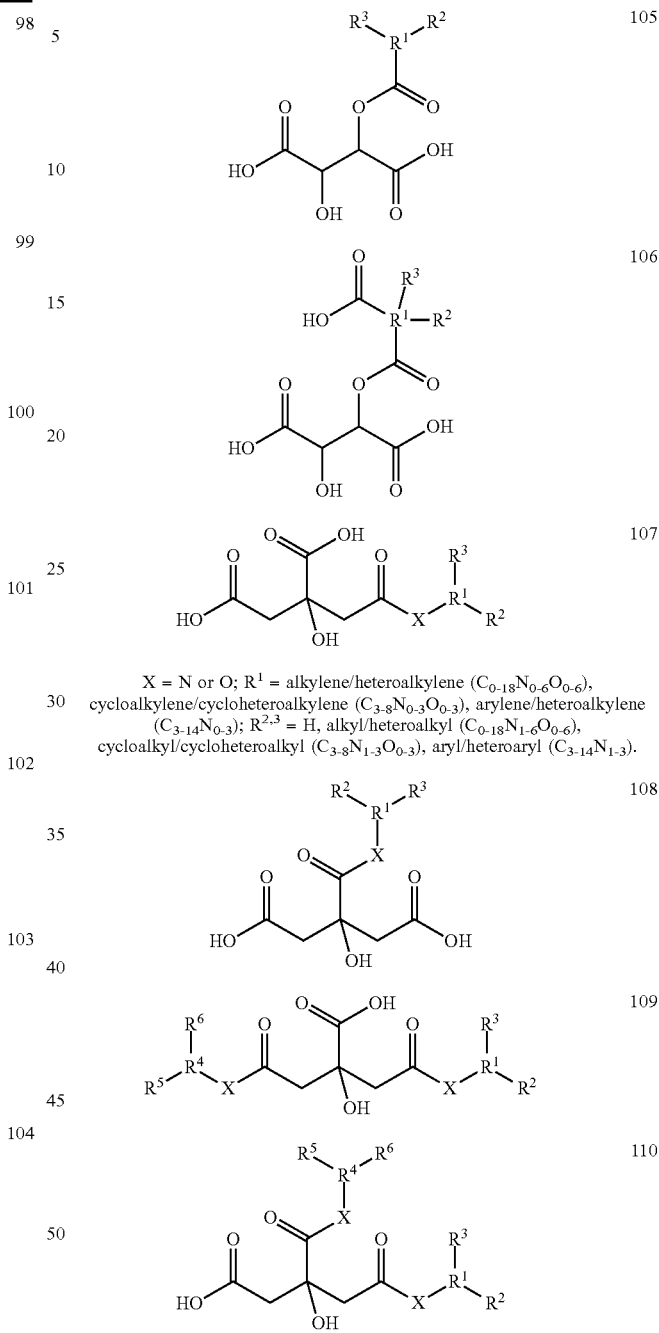

X = N or O; $R^1$ = alkylene/heteroalkylene ($C_{0-18}N_{0-6}O_{0-6}$), cycloalkylene/cycloheteroalkylene ($C_{3-8}N_{0-3}O_{0-3}$), arylene/heteroalkylene ($C_{3-14}N_{0-3}$); $R^{2,3}$ = H, alkyl/heteroalkyl ($C_{0-18}N_{1-6}O_{0-6}$), cycloalkyl/cycloheteroalkyl ($C_{3-8}N_{1-3}O_{0-3}$), aryl/heteroaryl ($C_{3-14}N_{1-3}$).

X = N or O; $R^{1,4}$ = alkylene/heteroalkylene ($C_{0-18}N_{0-6}O_{0-6}$), cycloalkylene/cycloheteroalkylene ($C_{3-8}N_{0-3}O_{0-3}$), arylene/heteroalkylene ($C_{3-14}N_{0-3}$); $R^{2,3,5,6}$ = H, alkyl/heteroalkyl ($C_{0-18}N_{1-6}O_{0-6}$), cycloalkyl/cycloheteroalkyl ($C_{3-8}N_{1-3}O_{0-3}$), aryl/heteroaryl ($C_{3-14}N_{1-3}$).

(xi) Anions of derivatives of the hydroxycarboxylic acids detailed above, including but not limited to esters, thioesters, amides, N-substituted amides, imides, acylhydrazines, and hydroxamic acids, as exemplified by but not limited to 2-O-esters (105 and 106) of 2,3-dihydroxybutane-1,4-dioc (63) acid with monocarboxylic acids and dicarboxylic acids, and monoesters, diesters, monoamides and diamides (107-110) of 3-carboxy-3-hydroxypentane-1,5-dioic acid (citric acid, 59).

As previously stated, the admixtures of this invention, as depicted by Formula 1, contain chelate complexes of metals with hydroxycarboxylic acid-derived ligands, as exemplified by but not limited to metal-hydroxycarboxylate complexes. While the scientific literature describes the characterization and uses of metal-hydroxycarboxylate complexes in biological systems and environmental settings, there is no prior art on the use of metal-hydroxycarboxylate as admixtures for cements. See, Lajunen et al., *Stability constants for alpha-hydroxycarboxylic acid complexes with protons and metal ions and the accompanying enthalpy changes—Part I: Aromatic ortho-hydroxycarboxylic acids*, 1997 Pure Appl. Chem, 69: 329-381: Portanova et al., *Critical evaluation of stability constants for alpha-hydroxycarboxylic acid complexes with protons and metal ions and the accompanying enthalpy changes—Part II: Aliphatic 2-hydroxycarboxylic acids*, 2003 Pure Appl. Chem. 75: 495-540; O. Happel et al., *Separation and characterization of aluminium malate species by ion chromatography*, 2008: Anal. Bioanal. Chem. 392: 1373-1381; Dakanali, et al., *A novel dinuclear species in the aqueous distribution of aluminum in the presence of citrate*, 2003 Inorg. Chem. 42: 252-254; Matzapetakis et al., *Synthesis, structural characterization, and solution behavior of the first mononuclear, aqueous aluminum citrate complex*, 1999 Inorg. Chem. 38: 618-619; Sheikh-Osman et al., *Aluminum carboxylates in aqueous solutions*, 1993 J. Chem. Soc. Dalton Trans. 3229-3223; Feng et al., *Aluminum citrate: Isolation and structural characterization of a stable trinuclear complex*, 1990: Inorg. Chem. 29: 408-411: Motekaitis et al., *Complexes of aluminum(III) with hydroxy carboxylic acids*, 1984 Inorg. Chem. 23: 18-23; G. Bandoli et al., *Mononuclear six-coordinated Ga(III) complexes*, 2009 Coord. Chem. Rev. 253: 56-77; N. Yang, H. Sun, *Biocoordination chemist, of bismuth: Recent advances*, 2007 Coord. Chem. Rev. 251: 2354-2366); Sadler et al., *Coordination chemistry of metals in medicine: Target sites for bismuth*, 1999 Coord. Chem. Rev. 185-186: 689-709; Asato et al., *Synthesis, structure, and spectroscopic properties of bismuth citrate compounds and the bismuth-containing ulcer-healing agent colloidal bismuth subcitrate (CBS)*, 1995 Inorg. Chem. 34: 2447-2454); Szczepaniak, et al., *Use of bismuth ion-selective electrode for investigation of bismuth complexes of citric and malic acids*, 1986 Talanta, 33: 371-373; Tomita et al. *A water-soluble titanium complex for the selective synthesis of nanocrystalline brookite, rutile, and anatase by a hydrothermal method*, 2006 Angew. Chem. Int. Ed. 45: 2378-2381; Deng, et al., *pH-Dependent isolations and spectroscopic, structural, and thermal studies of titanium citrate complexes*, 2004: Inorg. Chem. 43: 6266-6273; Todorovskya et al. *On the chemical nature of lanthanum—titanium citric complexes, precursors of $La_2Ti_2O_7$*, 2004 Mater. Lett. 58: 3559-3563; Ruzdic et al., *Coordination properties of α-hydroxy carboxylic acids. Part I. Binuclear niobium(V) complex acids and some salts*, 1984 Inorg. Chim. Acta, 88: 99-103; Brnicevic et al., *Coordination complexes of niobium and tantalum. XI. Crystalline malato complexes of niobium(V)*, 1971 J. Less Common Metal. 23: 61-66; J. J. Lingane, *Polarographic investigation of oxalate, citrate and tartrate complexes of ferric and ferrous iron*, J. Am. Chem. Soc. 68: 2448-2454; Zhang et al., *Syntheses, spectroscopies and structures of zinc complexes with malate*, 2009 Inorg. Chim. Acta 362: 2643-2649; L. Meites, *Polarographic studies of metal complexes. V. The cadmium(II), zinc(II) and iron(III) citrates*, 1951 J. Am. Chem. Soc. 73: 3727-3732; Biagioli et al., *Molecular structure, characterization and reactivity of dioxo complexes formed by vanadium(V) with α-hydroxycarboxylate ligands*, 2000 Inorg. Chim. Acta 310:1-9); Zhou et al., *Syntheses, crystal structures and biological relevance of glycolato and S-lactato molybdates*, 2004 J. Inorg. Biochem. 98: 1037-1044); -H. Zhou et al., *Synthesis and characterization of homochiral polymeric S-malatomolvbdate(VI)*, 2002 J. Inorg. Biochem. 90: 137-143; Zhang et al., *pH - and mol-ratio dependent tungsten(VI)-citrate speciation from aqueous solutions: syntheses, spectroscopic properties and crystal structures*, 2003 Inorg. Chim. Acta 351: 311-318; and Zhou et al. *Tungsten-malate interaction. Synthesis, spectroscopic and structural studies of homochiral S-malato tungstate(VI), Λ-$Na_3[WO_2H(S-mal)_2]$*, 2001 Inorg. Chim. Acta 314: 184-188.

Similarly, while the patent literature describes the use of metal-hydroxycarboxylate complexes as pharmaceutical agents, cosmetics agents, and as modifiers for textiles, polymers and minerals, there is no prior art relating to the use of metal-hydroxycarboxylate complexes as admixtures for cements. The use of hydroxycarboxylate complexes of aluminum, bismuth, chromium, iron, magnesium and zinc as medicinal agents is described in U.S. Pat. Nos. 3,200,136, 6,903,235, 2,644,828, 7,005,531, 5,008,256, 5,206,265, 7,767,851, 3,591,616, 6,903,235, 5,165,914, 1,964,696, 3,506,761. G.B. Patent 843865 and G.B. Patent 949405. The use of hydroxycarboxylate complexes of aluminum, magnesium, titanium and zirconium as astringent and antiperspirant agents is described in U.S. Pat. Nos. 3,090,728, 2,498,514, 4,021,536, 391,176, 3,712,948, 3,734,940, 6,632, 421 and G.B. Patent 843865. The use of hydroxycarboxylate complexes of iron as solvents for cellulose is described in U.S. Pat. Nos. 4,265,675 and 4,705,876. The use of hydroxycarboxylate complexes of aluminum as crosslinking agents for polymers is described in U.S. Pat. Nos. 4,601,340 and 5,559,263. The use of hydroxycarboxylate complexes of aluminum, chromium, iron and zirconium as drilling aids for petroleum recovery is described in U.S. Pat. Nos. 5,532,211, 4,129,183 and 3,843,524

Examples of known metal-hydroxycarboxylate complexes of metals from the scandium family (111), titanium family (112), vanadium family (113), chromium family (114), manganese, iron, cobalt, nickel, copper and zinc families (115), boron family (116), carbon family (117), and nitrogen family (118) are provided in Table 8.

TABLE 8

Examples of Metal-Hydroxycarboxylate Complexes $[La^{III}(CitH_{-3})]$ $NH_4[La^{III}(CitH_{-4})]$
111
$(NH_4)_2[Ti(GlyH_{-2})_3]$ $(NH_4)_2[Ti(LacH_{-2})_3]$ $Na_2[Ti(CitH_{-2})_3]$ $Na_3[Ti(CitH_{-3})(CitH_{-2})_2]$
$Na_4[Ti(CitH_{-3})_2(CitH_{-2})]$ $Na_6[Ti(CitH_{-4})(CitH_{-3})_2]$ $K_5[Ti(CitH_{-3})_3]$ $Na_8[Ti(CitH_{-4})_3]$
$(NH_4)_6[Ti_4(O_2)_4(\Box O)_2(GlyH_{-2})_4(GlyH_{-1})_2]$ $(NH_4)_4[Ti_2(O_2)_2(CitH_{-4})_2]$
$Ba_2(NH_4)_2[Ti_4(O_2)_4(CitH_{-4})_2(CitH_{-3})_2]$ $(NH_4)_8[Ti_4(O_2)_4(CitH_{-4})_4]$
$Na_4[Zr_2(LacH_{-2})_6]$ $Na_4[Zr_2(LacH_{-2})_6]$
112
$Rb_2[\{V^VO_2(GlyH_{-2})\}_2]$ $Cs_2[\{V^VO_2(LacH_{-2})\}_2]$ $Cs_2[\{V^VO_2(MalH_{-2})\}_2]$
$NH_4[Nb^V_2O_4(GlyH_{-1})(GlyH_{-2})]$ $NH_4[Nb^V_2O_4(LacH_{-1})(LacH_{-2})]$ $NH_4(Nb^V_2O_3(MalH_{-2})(MalH_{-3})]$
$K[Nb^V_2O_2(OH)(MalH_{-3})_2]$ $Li[Nb^V_2O(MalH_{-3})_3]$ $Ca[Nb_2O_2[TarH_{-4}]_2]$
113
$Py_2[Cr^{III}(CitH_{-3})(CitH_{-2})]$ TABLE 8-continued Examples of Metal-Hydroxycarboxylate Complexes $K_2[Mo^{VI}O_2(GlyH_{-2})_2]$ $K_2[Mo^{VI}O_2(LacH_{-2})_2]$ $Na_3[Mo^{VI}O_2(MalH_{-2})(MalH_{-3})]$
$(NH_4)_2[Mo^{VI}O_2(MalH_{-2})_2]$ $(NH_4)_4[Mo^{VI}O_2(MalH_{-3})_2]$ $(NH_4)_4[Mo^{VI}_4O_{11}(MalH_{-3})_2]$
$K_4[(Mo^{VI}O_2)_2O(CitH_{-3})_2]$ $K_2Na_4[(Mo^{VI}O_2)_2O(CitH_{-4})_2]$
$Na_2[W^{VI}O_2(CitH_{-2})_2]$ $Na_3[W^{VI}O_2(MalH_{-2})(MalH_{-3})]$ $NaK_3[W^{VI}_2O_5(CitH_{-3})_2]$ $K_4[W^{VI}O_3(CitH_{-4})]$
114
$[Fe^{III}_2(MalH_{-3})_2)]$ $Ca[Fe^{III}_2(MalH_{-4})_2]$ $K_3[Fe^{III}_3(MalH_{-3})_4]$ $K[Fe^{III}_2(MalH_{-4})\bullet(MalH_{-3})]$
$[Fe^{III}(MalH_{-2})\bullet(Mal_{-1})]$ $[Fe^{II}(CitH_{-2})]$ $[F^{III}(CitH_{-2})]NO_3$ $[Fe^{III}(CitH_{-3})]$ $[Fe^{III}_2(CitH_{-2})_3]$
$Na[Fe^{III}(CitH_{-4})]$ $K_3[Fe^{III}(CitH_{-3})_2]$ $[Fe^{III}(OH)(H_2PO_4)(CitH_{-1})]$
$Na_2[Fe^{III}(OH)(H_2PO_4)_2(CitH_{-2})]$ $Na_3[Fe^{III}(H_2PO_4)_2(CitH_{-2})_2]$
$[Zn(MalH_{-1})_2(H_2O)_2]$ $[Zn_2(MalH_{-2})_2(H_2O)_4]$ $(NH_4)[Zn(MalH_{-1})_3]$ $(NH_4)_2[Zn(MalH_{-2})_2]$
115
$Li[B(MalH_{-2})_2]$ $Zn[B(CitH_{-2})_2]_2$ $Rb[B(SalH_{-2})_2]$
$[Al(GlyH_{-2})]NO_3$ $Na[Al(GlyH_{-2})_2]$ $Na_3[Al(GlyH_{-2})_3]$ $[Al(LacH_{-2})]NO_3$ $Na[Al(LacH_{-2})_2]$
$Na_3[Al(LacH_{-2})_3]$ $[Al(MalH_{-2})(MalH_{-1})]$ $Na[Al_2(MalH_{-2})_2(MalH_{-3})]$ $Na_3[Al_3(MalH_{-3})_4]$
$Na[Al_2(MalH_{-4})(MalH_{-3})]$ $Na_2[Al_2(MalH_{-4})_2]$ $Na[Al(CitH_{-2})]$ $[Al(CitH_{-3})]$ $[Al_2(CitH_{-2})_3]$
$K_4[Al_2(CitH_{-3})_2(CitH_{-4})]$ $K_4[Al_3(CitH_{-3})_3(OH)]$ $K[Al(CitH_{-4})]$ $Na_5[Al(CitH_{-4})_2]$ $Na_4[Al(CitH_{-3})(CitH_{-4})]$
$Na_7[Al_3(CitH_{-4})_3(OH)_4]$ $K_3[Al(CitH_{-3})_2]$ $Na[Al(TarH_{-4})]$ $Na[Al(TarH_{-2})_2]$ $Na_4[Al(TarH_{-3})(TarH_{-4})]$
$Na_7[Al(TarH_{-4})(TarH_{-3})_2]$ $Na_8[Al(TarH_{-4})_2(TarH_{-3})]$ $Na_9[Al(TarH_{-4})_3]$ $[Al(MucH_{-3})]$ $K[Al(MucH_{-4})]$
116
$Na_2[Ge^{IV}(MalH_{-3})_2]$ $Na_2[Ge^{IV}(CitH_{-3})_2]$ $[Ge^{IV}(CitH_{-3})Cl(Bipy)]$
117
$[Bi(LacH_1)_3]$ $[Bi(MalH_{-3})]$ $(NH_4)_3[Bi(MalH_{-3})_2]$ $(NH_4)_8[Bi_2(CitH_{-4})_2(CitH_{-3})_2(H_2O)_4]$
$K_5[Bi_2(CitH_{-4})_2(CitH_{-3})]$ $K[Bi(CitH_{-4})_2]$ $KNH_4[Bi_2(CitH_{-4})_2]$ $K_6[Bi_6O_4(CitH_{-4})_4]$ $K_{12}[Bi_{12}O_8(CitH_{-4})_8]$
$[Bi(TarH_{-1})(TarH_{-2})]$ $NH_4[Bi(TarH_{-2})_2]$ $[Bi_2(SalH_{-1})_6(Bipy)_2]$ $[Bi_2(SalH_{-1})_2(SalH_{-2})_2(Phen)_2]$
118

Notes.
$GlyH_{-x}$ is glycolate anion;
$LacH_{-x}$ is lactate anion;
$MalH_{-x}$ is malate anion;
$CitH_{-x}$ is citrate anion;
$TarH_{-x}$ is tartarate anion;
$MucH_{-x}$ is mucate anion;
$SalH_{-x}$ is salicylate anion;
Phen is 1,10-phenanthroline;
Bipy is 2,2'-bipyridine In one aspect of the present invention, there is provided a composition comprising a cement admixture comprising at least one metal complex represented by the formula $M_a[N_b(HCA)_c]$, wherein: M is a metal selected from the group consisting of lithium, sodium, potassium, magnesium, calcium, strontium, barium and combinations thereof; N is a metal selected from the group consisting of aluminum, iron, bismuth and combinations thereof: HCA is a hydroxycarboxylic acid selected from the group consisting of glyoxylic acid hydrate, glycolic acid, lactic acid, 2-hydroxybutyric acid and combinations thereof; a is an integer with a value of 1 to 100; b is an integer with a value of 1 to 10; and c is an integer with a value of 1 to 100, wherein the composition is capable of improving properties of a hydraulic cement.

In one embodiment, M is selected from the group consisting of lithium, sodium, potassium and combinations thereof; and HCA is selected from the group consisting of glyoxylic acid hydrate, glycolic acid, lactic acid and combinations thereof.

In another embodiment, M is selected from the group consisting of sodium, potassium and combinations thereof; N is selected from the group consisting of aluminum, bismuth and combinations thereof; HCA is lactic acid; a is an integer with a value of 1 to 50; b is an integer with a value of 1 to 5; and c is an integer with a value of 1 to 50.

In a further embodiment, M is sodium; N is aluminum; a is an integer with a value of 1 to 30; b is an integer with a value of 1 to 3; and c is an integer with a value of 1 to 30.

In another aspect of the present invention, there is provided a composition comprising a cement admixture comprising at least one metal complex represented by the formula $M_a[N_b(HCA)_c]$, wherein: M is a metal selected from the group consisting of lithium, sodium, potassium, magnesium, calcium, strontium, barium, and combinations thereof; N is a metal selected from the group consisting of aluminum, iron, bismuth and combinations thereof; HCA is a hydroxycarboxylic acid selected from the group consisting of malic acid, tartronic acid, dihydroxymalonic acid and combinations thereof; a is an integer with a value of 1 to 100; b is an integer with a value of 1 to 10; and c is an integer with a value of 1 to 50, wherein the composition is capable of improving properties of a hydraulic cement.

In one embodiment, M is selected from the group consisting of lithium, sodium, potassium and combinations thereof; and HCA is selected from the group consisting of malic acid, tartronic acid and combinations thereof.

In another embodiment, M is selected from the group consisting of sodium, potassium and combinations thereof; N is selected from the group consisting of aluminum, bismuth and combinations thereof; a is an integer with a value of 1 to 80; b is an integer with a value of 1 to 5; and c is an integer with a value of 1 to 40.

In a further embodiment, M is sodium; N is aluminum; a is an integer with a value of 1 to 40; b is an integer with a value of 1 to 3; and c is an integer with a value of 1 to 30.

In a further aspect of the present invention, there is provided a composition comprising a cement admixture comprising at least one metal complex represented by the formula $M_a[N_b(HCA)_c]$, wherein: M is a metal selected from the group consisting of lithium, sodium, potassium, magnesium, calcium, strontium, barium and combinations thereof; N is a metal selected from the group consisting of aluminum, iron, bismuth and combinations thereof; HCA is a hydroxycarboxylic acid selected from the group consisting of citric acid, isocitric acid, hydroxycitric acid and combinations thereof; a is an integer with a value of 1 to 100; b is an integer with a value of 1 to 10; and c is an integer with a value of 1 to 40, wherein the composition is capable of improving properties of a hydraulic cement.

In one embodiment, M is selected from the group consisting of lithium, sodium, potassium and combinations thereof; and HCA is selected from the group consisting of citric acid, isocitric acid and combinations thereof.

In another embodiment, M is selected from the group consisting of sodium, potassium and combinations thereof: N is selected from the group consisting of aluminum, bismuth and combinations thereof; a is an integer with a value of 1 to 50; b is an integer with a value of 1 to 5; and c is an integer with a value of 1 to 40.

In a further embodiment, M is sodium; N is aluminum; a is an integer with a value of 1 to 30; b is an integer with a value of 1 to 3; and c is an integer with a value of 1 to 30.

The aspects and embodiments of the invention described above have the ability to improve the properties of hardness and compressive strength of a hydraulic cement.

Examples of hydraulic cements that may be improved with the aspects and embodiments of the present invention described above include, without limitation, coal fly ash, coal bottom ash, coal boiler slag, steel slag, Portland cement, Portland-type cements, and combinations thereof.

The admixtures of the present invention can be prepared by a variety of methods, including but not limited to:

(i) The reaction of a group IIA, IIIA, IVA, VA, IB, IIB, IIIB, IVB, VB, VIIB, VIIB and/or VIIIB metal, and/or metal oxide, hydroxide, carbonate and/or basic carbonate with one or more hydroxycarboxylic acid-derived ligands, as exemplified by but not limited to:
 (a) $2Al+2Cit \rightarrow 2[Al(CitH_{-3})]+3H_2 \uparrow$;
 (b) $Al_2O_3+4Mal \rightarrow 2[Al(MalH_{-2})(MalH_{-1})]+3H_2O$;
 (c) $2Al(OH)_3+3Cit \rightarrow [Al_2(CitH_{-2})_3]+6H_2O$;
 (d) $Fe^{II}CO_3+Cit \rightarrow [Fe^{II}(CitH_{-2})]+CO_2 \uparrow +H_2O$; and
 (e) $(BiO)_2CO_3+2Mal \rightarrow 2[Bi(MalH_{-3})]+CO_2 \uparrow +3H_2O$.

(ii) The reaction of a group IA and/or IIA metal oxide, hydroxide, carbonate, basic carbonate and/or hydrogencarbonate, with a group IIA, IIIA, IVA, VA, IB, IIB, IIIB, IVB, VB, VIIB, VIIB and/or VIIIB metal oxide, and one or more hydroxycarboxylic acid-derived ligands, as exemplified by but not limited to:
 (a) $MgO+MoO_3+2Lac \rightarrow Mg[MoO_2(LacH_{-2})_2]+2H_2O$;
 (b) $KOH+Nb_2O_5+2Mal \rightarrow K[Nb_2O_2(OH)(MalH_{-3})_2]+3H_2O$;
 (c) $Ca(OH)_2+B_2O_3+4Mal \rightarrow Ca[B(MalH_{-2})_2]_2+5H_2O$;
 (d) 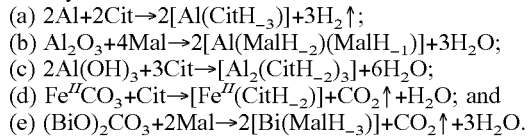 $4NaOH+2Ca(OH)_2+Al_2O_3+4Tar \rightarrow 2CaNa_2[Al(TarH_{-3})(TarH_{-4})]+11H_2O$;
 (e) $Li_2CO_3+2Nb_2O_5+6Mal \rightarrow 2Li[Nb_2O(MalH_{-3})_3]+CO_2 \uparrow +9H_2O$; and
 (f) 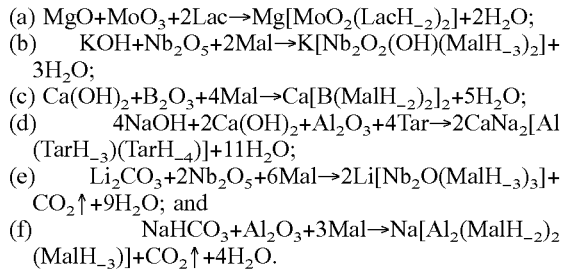 $NaHCO_3+Al_2O_3+3Mal \rightarrow Na[Al_2(MalH_{-2})_2(MalH_{-3})]+CO_2 \uparrow +4H_2O$.

(iii) The reaction of a group IA and/or IIA metal oxide, hydroxide, carbonate, basic carbonate and/or hydrogencarbonate, with a group IIA, IIIA, IVA, VA, IB, IIB, IIIB, IVB, VB, VIB, VIIB and/or VIIIB metal hydroxide, and one or more hydroxycarboxylic acid-derived ligands, as exemplified by but not limited to:
 (a) $BaO+2Fe^{III}(OH)_3+Mal \rightarrow Ba[Fe^{III}_2(MalH_{-4})_2]+7H_2O$;
 (b) $Mg(OH)_2+2B(OH)_3+4Cit \rightarrow Zn[B(CitH_{-2})_2]_2+8H_2O$;
 (c) $4NaOH+2Zr(OH)_4+6Lac \rightarrow Na_4[Zr_2(LacH_{-2})_6]+10H_2O$;
 (d) 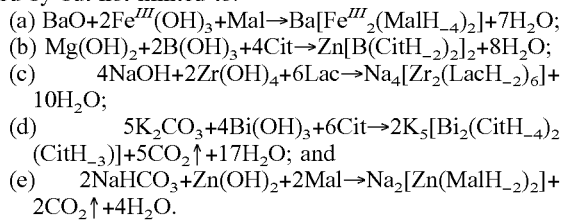 $5K_2CO_3+4Bi(OH)_3+6Cit \rightarrow 2K_5[Bi_2(CitH_{-4})_2(CitH_{-3})]+5CO_2 \uparrow +17H_2O$; and
 (e) $2NaHCO_3+Zn(OH)_2+2Mal \rightarrow Na_2[Zn(MalH_{-2})_2]+2CO_2 \uparrow +4H_2O$.

(iv) The reaction of a group IA and/or IIA metal oxide, hydroxide, carbonate, basic carbonate and/or hydrogencarbonate, with a group IIA, IIIA, IVA, VA, IB, IIB, IIIB, IVB, VB, VIB, VIIB and/or VIIIB metal carbonate and/or basic carbonate, and one or more hydroxycarboxylic acid-derived ligands, as exemplified by but not limited to:
 (a) 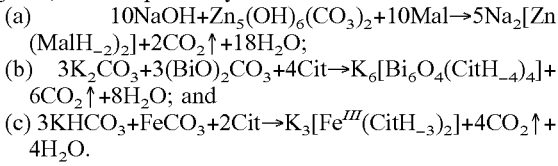 $10NaOH+Zn_5(OH)_6(CO_3)_2+10Mal \rightarrow 5Na_2[Zn(MalH_{-2})_2]+2CO_2 \uparrow +18H_2O$;
 (b) $3K_2CO_3+3(BiO)_2CO_3+4Cit \rightarrow K_6[Bi_6O_4(CitH_{-4})_4]+6CO_2 \uparrow +8H_2O$; and
 (c) $3KHCO_3+FeCO_3+2Cit \rightarrow K_3[Fe^{III}(CitH_{-3})_2]+4CO_2 \uparrow +4H_2O$.

(v) The reaction of a metal oxometallate of a group IA and/or IIA metal with a group IIA, IIIA, IVA, VA, IB, IIB, IIIB, IVB, VB, VIB, VIIB and/or VIIIB metal, and one or more hydroxycarboxylic acid-derived ligands, with or without the presence of a group IA and/or IIA metal hydroxide, carbonate, basic carbonate and/or hydrogencarbonate, and with or without the presence of a group IIA, IIIA, IVA, VA, IB, IIB, IIIB, IVB, VB, VIIB, VIIB and/or VIIIB metal oxide, hydroxide, carbonate and/or basic carbonate, as exemplified by but not limited to:
 (a) $Na_2Al_2O_4+4Gly \rightarrow 2Na[Al(GlyH_{-2})_2]+4H_2O$;
 (b) 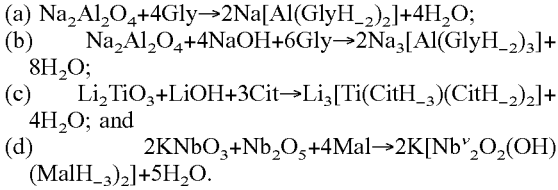 $Na_2Al_2O_4+4NaOH+6Gly \rightarrow 2Na_3[Al(GlyH_{-2})_3]+8H_2O$;
 (c) $Li_2TiO_3+LiOH+3Cit \rightarrow Li_3[Ti(CitH_{-3})(CitH_{-2})_2]+4H_2O$; and
 (d) $2KNbO_3+Nb_2O_5+4Mal \rightarrow 2K[Nb^V_2O_2(OH)(MalH_{-3})_2]+5H_2O$.

(vi) The reaction of a salt of a group IA and/or IIA metal with one or more hydroxycarboxylic acid-derived ligands, with a group IIA, IIIA, IVA, VA, IB, IIB, IIIB, IVB, VB, VIB, VIIB and/or VIIIB metal, and/or metal oxide, hydroxide, carbonate and/or basic carbonate, with or without the presence of one or more hydroxycarboxylic acid-derived ligands, as exemplified by but not limited to:
 (a) $4Na_2(TarH_{-2})+2Al \rightarrow 2Na_4[Al(TarH_{-3})(TarH_{-4})]+3H_2 \uparrow$;
 (b) $2NH_4(LacH_{-1})+TiO_2+Lac \rightarrow (NH_4)_2[Ti(LacH_{-2})_3]+2H_2O$;
 (c) 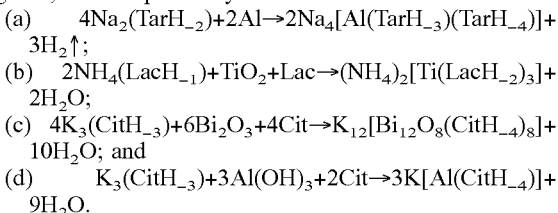 $4K_3(CitH_{-3})+6Bi_2O_3+4Cit \rightarrow K_{12}[Bi_{12}O_8(CitH_{-4})_8]+10H_2O$; and
 (d) $K_3(CitH_{-3})+3Al(OH)_3+2Cit \rightarrow 3K[Al(CitH_{-4})]+9H_2O$.

(vii) The reaction of a group IA and/or IIA metal oxide, hydroxide, carbonate, basic carbonate and/or hydrogencarbonate, with the salt of a group IIA, IIIA, IVA, VA, IB, IIB, IIIB, IVB, VB, VIIB, VIIB and/or VIIIB metal with a group IIIA, IVA, VA, VIA and/or VIIA nonmetal, and one or more hydroxycarboxylic acid-derived ligands, with or without the presence of a group IIA, IIIA, IVA, VA, IB, IIB, IIIB, IVB, VB, VIB, VIIB and/or VIIIB metal oxide, hydroxide, carbonate and/or basic carbonate, as exemplified by but not limited to:
 (a) 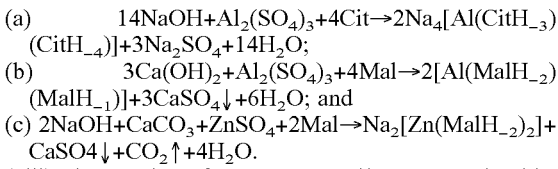 $14NaOH+Al_2(SO_4)_3+4Cit \rightarrow 2Na_4[Al(CitH_{-3})(CitH_{-4})]+3Na_2SO_4+14H_2O$;
 (b) $3Ca(OH)_2+Al_2(SO_4)_3+4Mal \rightarrow 2[Al(MalH_{-2})(MalH_{-1})]+3CaSO_4 \downarrow +6H_2O$; and
 (c) $2NaOH+CaCO_3+ZnSO_4+2Mal \rightarrow Na_2[Zn(MalH_{-2})_2]+CaSO_4 \downarrow +CO_2 \uparrow +4H_2O$.

(viii) The reaction of a group IA and/or IIA metal oxide, hydroxide, carbonate, basic carbonate and/or hydrogencarbonate, and/or a salt of a group IA and/or IIA metal with one or more hydroxycarboxylic acid-derived ligands, with an ore/mineral and/or mining byproduct and/or industrial byproduct containing a group IIA, IIIA, IVA, VA, IB, IIB, IIIB, IVB, VB, VIIB, VIIB and/or VIIIB metal, with or without one or more hydroxycarboxylic acid-derived ligands, as exemplified by but not limited to:

(a) $6Na(MalH_{-1})+3Al_2SiO_5$ (Kyanite)$+2Mal \rightarrow 2Na_3[Al_3(MalH_{-3})_4]+3SiO_2\downarrow+9H_2O$;

(b) $4Na_2(CitH_{-2})+Al_2Si_2O_5(OH)_4$ (Kaolin)$\rightarrow 2Na_4[Al(CitH_{-3})(CitH_{-4})]+2SiO_2\downarrow+5H_2O$; and (c) $2K(CitH_{-1})+2K_2(CitH_{-2})+3Bi_2S_3$ (Bismuthinite)$+7O_2 \rightarrow K_6[Bi_6O_4(CitH_{-4})_4]+9S\downarrow+5H_2O$.

Reactions may be conducted using crude, partially-purified or substantially pure hydroxycarboxylic acid-derived ligand feedstocks. Crude and partially-purified feedstocks for hydroxycarboxylic acid-derived ligands are exemplified by, but not limited to:

(i) Crude, filtered, concentrated, crystallized and/or extracted fermentation broths containing hydroxycarboxylic acids such as glycolic, lactic, malic, citric, citramalic and/or tartaric acid. The fermentation production of hydroxycarboxylic acids is described in the publications, Berovic et al., *Citric Acid Production,* 2007 Annu. Rev. Biotechnol. 13: 303-343; Hofvendahl et al., *Factors affecting the fermentative lactic acid production from renewable resources,* 2007 Enzyme Microb. Technol. 26: 87-107; John et al., *Fermentative production of lactic acid from biomass: An overview on process developments and future perspectives,* 2007: Appl. Microbiol. Biotechnol. 74: 524-534; and Aristidou et al., *Metabolic engineering applications to renewable resource utilization,* 2000 Curr. Opin. Biotechnol. 11: 187-199);

(ii) Crude, filtered, concentrated, crystallized and/or extracted fruit juices and fermented fruit juices containing hydroxycarboxylic acids such as glycolic, lactic, malic, citric, citramalic and/or tartaric acid;

(iii) Crude, filtered, concentrated, crystallized and/or extracted reaction mixtures resulting from the catalytic and/or non-catalytic aerobic and/or non-aerobic oxidation of monosaccharides, oligosaccharides, polysaccharides, fats, oils, resins, extractives, biomass components, and/or biomass. These oxidation reactions are described by Collinson et al., *The catalytic oxidation of biomass to new materials focusing on starch, cellulose and lignin,* 2010 Coord. Chem. Rev. 254: 1854-1870; and Aouf et al., *Low Catalyst loadings for the production of carboxylic acid from polysaccharides and hydrogen peroxide,* 2010 Chem. Sus. Chem. 3: 1200-1203); and (iv) Crude, filtered, concentrated, crystallized and/or extracted reaction mixtures resulting from the catalytic and/or non-catalytic interconversion of hydroxycarboxylic acids and their derivatives such as esters, thioesters, amides, N-substituted amides, imides, N-acylhydrazines and hydroxamic acids, as exemplified by, but not limited to the partial esterification and/or partial amidation of hydroxypolycarboxylic acids with aliphatic alcohols and/or aliphatic amines respectively; and the partial hydrolysis and/or partial aminolysis of polyalkyl hydroxypolycarboxylates to form the corresponding partial esters or ester amides.

Reactions may be conducted in solution or in suspension, in a variety of solvents, including but not limited to water, a mixture of water and an organic solvent exemplified by but not limited to methanol, ethanol, propan-1-ol, propan-2-ol (isopropanol), ethane-1,2-diol (ethylene glycol), propane-1,2,3-triol (glycerol). 2-ethoxyethanol (diethylene glycol), and 2-(2'-ethoxyethoxy)ethanol (triethylene glycol), or a water-free organic solvent exemplified by but not limited to methanol, ethanol, propan-1-ol, propan-2-ol (isopropanol), ethane-1,2-diol (ethylene glycol), propane-1,2,3-triol (glycerol), 2-ethoxyethanol (diethylene glycol), and 2-(2'-ethoxyethoxy)ethanol (triethylene glycol). When a mixture of water and organic solvent is used, the water content may range from 5% to 95% v/v, preferably 15% to 85% v/v, and more preferably 25% to 75% v/v.

When a solvent is used, the substrates and/or product(s) may be soluble or insoluble to varying degrees, and the reaction system may vary from homogeneous to heterogeneous. Furthermore, the nature of the reaction mixture may change during the course of the reaction, as exemplified by but not limited to the dissolution of initially insoluble or partially soluble reactants, and/or the transient precipitation/crystallization and subsequent dissolution of reaction intermediate(s) and/or the precipitation/crystallization of product(s).

When a solvent is used, the net concentration of the reactants is 5-80% w/w, and preferably 10-60% w/w, and more preferably 20-40% w/w.

Reactions may be conducted in the absence of solvent, or in the presence of a small amount (<20% w/w) of a solvent/adjuvant. Reactions may be performed by blending, grinding or milling a mixture of the reactants, with or without the addition of the solvent/adjuvant. The solvent/adjuvant is exemplified by but not limited to water, methanol, ethanol, propan-1-ol, propan-2-ol (isopropanol), ethane-1,2-diol (ethylene glycol), propane-1,2,3-triol (glycerol), 2-ethoxyethanol (diethylene glycol), and 2-(2'-ethoxyethoxy)ethanol (triethylene glycol).

Reactions may be conducted such that water and/or organic solvents are partially or fully removed by evaporation/distillation during the course of the reaction, in order to obtain a soluble concentrate of the product, a slurry of the product, a paste of the product, or a substantially or completely dry solid or semi-solid product.

Reactions may be conducted such that evolved gases, as exemplified by carbon dioxide and hydrogen, are partially or fully removed by sparging with a gas such as air, nitrogen or helium, or by the application of a vacuum of 0.01-0.98 bar.

Reactions may be conducted with sparging with a gas such as air or oxygen, when oxidizing conditions are desired—for example when the oxidation of a sulfide-containing reactant to elemental sulfur is desired. Alternatively, sparging with nitrogen or helium may be used when suppression of oxidation is desired—for example when complexes of iron(II) are being prepared and prevention of oxidation to iron(III) is needed.

Reactions may be conducted at ambient temperature, or at temperatures of 243-473 K, and preferably 273-423 K, and more preferably 293-373 K.

Reactions may be conducted at ambient pressure, or at pressures of 0.1-20 bar, and preferably 0.5-10 bar, and more preferably 1-5 bar.

Reactions may be conducted in non-pressurized or pressurized batch, semi-continuous or continuous glass or metal reactors, exemplified by but not limited to stirred tank reactors, packed bed reactors, fluidized bed reactors, bead mills, jet mills, homogenizers, colloid mills, ball mills, rotor-stator mixers, pug mills, and screw extruders.

The admixtures of the present invention may be prepared to contain one or more complexes as described above by Formula 1. The admixtures may be used as prepared, or may be further processed, as exemplified by but not limited to:

(i) Clarification/filtration of suspensions to furnish the admixtures as solutions with product concentrations of 10-80% w/w, and preferably 15-70% w/w, and more preferably 20-60% w/w. Clarification/filtration may be accomplished by various methods, including but not limited to plate filtration, fabric filtration, tubular filtration, leaf filtration, filter pressing, centrifugal filtration and centrifugation.

(ii) Concentration of solutions or suspensions to furnish the admixtures as soluble or suspension concentrates, or slurries, with product concentrations of 20-90% w/w, and preferably 30-80% w/w, and more preferably 40-70% w/w. The removal of solvent may be accomplished by various methods, including but not limited to rotary evaporation, rising film evaporation, circulation evaporation, falling film evaporation, fluidized bed evaporation, plate evaporation, spiral tube evaporation, and reverse osmosis. Furthermore, concentration may be combined with solvent exchange.

(iii) Crystallization of solutions or suspensions to furnish the admixtures as crystalline or semi-crystalline products. These crystalline products may be relatively pure and contain predominantly one complex, or may be semi-pure and contain a mixture of distinct complexes. Furthermore, the crystalline products may be anhydrous or may be hydrated/solvated. Crystallization may be accomplished by accomplished various methods, including but not limited to cooling and/or evaporative methods, and using such equipment as stirred tank crystallizers and fluidized bed crystallizers. Crystallization may be accomplished by heating solutions or suspensions up to 293-373 K, and preferably to 303-363 K, and more preferably to 313-353 K, and concentrating the solution or suspension such that the product concentration is 20-90% w/w, and preferably 30-80% w/w, and more preferably 40-70% w/w. This may be followed by cooling to 263-313 K, and preferably to 273-303 K, and more preferably to 278-228 K. This may be further combined with seeding with appropriate seed crystals, comprised of the desired complex, or of an isomorphous crystalline compound. This may be further combined with the addition of an anti-solvent, including but not limited to methanol, ethanol, propan-1-ol, propan-2-ol (isopropanol), ethane-1,2-diol (ethylene glycol), propane-1,2,3-triol (glycerol), 2-ethoxyethanol (diethylene glycol), and 2-(2'-ethoxyethoxy)ethanol (triethylene glycol). The crystalline suspension may be used as is, with or without solvent exchange. Alternatively, the crystalline product may be separated by sedimentation/decantation, centrifugation and/or filtration. The separated crystalline product may be partially or fully dried to furnish an anhydrous or hydrated/solvated solid crystalline or semi-crystalline product. Drying may be accomplished by various methods, including but not limited to plate drying, drum drying, rotary louvre drying, rotary steam tube drying, and fluidized bed drying.

(iv) Concentration of solutions or suspensions, followed by granulation and/or extrusion and/or partial or complete drying, to furnish the admixtures as powders, flakes, granules or pellets. The products may be amorphous, semi-crystalline or crystalline, and may be anhydrous or hydrated/solvated. Drying may be accomplished by various methods, including but not limited to plate drying, drum drying, rotary louvre drying, rotary steam tube drying, fluidized bed drying and spray drying. Drying may be integrated with flaking, granulation, extrusion and/or powdering.

(v) Adsorption of solutions, suspensions or slurries onto solid carriers, followed by granulation and/or extrusion and/or partial or complete drying, to furnish the admixtures as solid-supported powders, flakes, granules or pellets, with product concentrations of 10-90% w/w, and preferably 20-80% w/w, and more preferably 30-70% w/w. The carrier is exemplified by, but not limited to:

(a) a biomass product such as wood flour, wood sawdust, peat, coconut coir and coconut shell powder;
(b) a rock or mineral product such as kaolin, calcined kaolin, china clay, perlite, expanded perlite, exfoliated vermiculite, bauxite, calcined bauxite, red mud, brucite, clay, montmorillonite clay, smectite clay, illite clay, chlorite clay, bentonite clay, halloysite clay, imogolite clay, diatomaceous earth, volcanic ash, tuff, chalk, limestone and gypsum; and
(c) a combustion product such as rice hull ash, sugarcane bagasse ash and fly ash.

The product concentration in the solution, suspension or slurry is 10-90% w/w, and preferably 15-80% w/w, and more preferably 20-70% w/w. Adsorption may be accomplished by various methods, including but not limited to drum coating and fluidized bed coating. Drying may be accomplished by various methods, including but not limited to plate drying, drum drying, rotary louvre drying, and fluidized bed drying.

The admixtures of the present invention, prepared as described above, may be employed as admixtures for hydraulic cements in a number of ways, as exemplified by, but not limited to:

(i) Addition of admixtures, as solutions, suspensions, slurries or solids, during any stage of the preparation of the cement paste, mortar or concrete, and as typified by the addition of admixtures to the mixing water; and (ii) Blending of admixtures as solids with dry cements or cement components (OPC and/or SCMs) and/or aggregates to form premixes that may be stored as desired, and made into a cement paste, mortar or concrete when needed.

The admixtures of the present invention, prepared as described above, may be employed at dosages of 0.1-20% w/w (active solids with respect to the cement), and preferably 0.15-10% w/w, and more preferably 0.2-5% w/w.

The admixtures of the present invention, prepared as described above, may be combined together to form blended admixtures.

The admixtures of the present invention, prepared as described above, may be combined with conventional chemical admixtures as exemplified by, but not limited to water-reducers, superplasticizers, viscosity control agents, set accelerators, set retarders, rebar corrosion inhibiting agents, waterproofing agents, and air entraining agents.

The above examples are indicative of preformed complexes of metals with hydroxycarboxylic acid derivatives that are prepared as solutions, suspensions, slurries or solids, and are then subsequently used as admixtures for cement compositions. Alternatively, the same complexes may be formed in-situ in cement compositions by combining in the dry state, the individual precursors used to form the complexes, or combinations of the precursors, with the cement, mortar, grout or concrete components.

For example, in the case of the complex $[Al(CitH_{-3})]$, aluminum(III) hydroxide $(Al(OH)_3)$ and anhydrous citric acid (Cit) may be used as precursors. The required molar ratio (1:1 mol ratio of $Al(OH)_3$ and Cit) of these may be blended with fly ash C to produce a dry fly ash C—$Al(OH)_3$-Cit blend, which may be stored as required until used. When this blend is mixed with water, the precursors react to form the indicated complex in-situ, and this then exerts its effect(s) as a chemical admixture on the desired fly ash C cement.

Similarly, in the case of the complex $Na_3[Al(GlyH_{-2})_3]$, sodium carbonate $(Na_2CO_3)$ and aluminum(III) glycolate $(Al(Gly)_3)$ may be used as precursors. The required molar ratio (3:2 mol ratio of $Na_2CO_3$ and $Al(Gly)_3$) of these may be blended with OPC and fly ash F respectively, and the obtained OPC—$Na_2CO_3$ and fly ash F—$Al(Gly)_3$ blends stored separately as a two-component cement, or combined to form a OPC-fly ash-$Na_2CO_3$—$Al(Gly)_3$ blended cement. As before, the addition of water, to a mixture of the separate OPC—Na$_2$CO$_3$ and fly ash F—Al(Gly)$_3$ products, or to the OPC-fly ash F—Na$_2$CO$_3$—Al(Gly)$_3$ mixture, results in the formation of the desired complex in-situ, and this exerts its action on the desired OPC-fly ash F blended cement.

EXAMPLES

Materials

Chemicals used in the following Examples were obtained from Sigma-Aldrich Corporation, St. Louis, Mo., USA, American Elements, Los Angeles, Calif., USA, and Reade Advanced Materials, Reno, Nev., USA. The following chemicals were: sodium hydroxide (NaOH, 99%, pellets); potassium hydroxide (KOH, 99%, pellets); lithium hydroxide (LiOH, 99%, powder); aluminum(III) hydroxide (Al(OH)$_3$, 99%, 18% water, powder); magnesium hydroxide (Mg(OH)$_2$, 99%, powder); calcium hydroxide (Ca(OH)$_2$, 97%, powder); iron(III) hydroxide (Fe(OH)$_3$, 98%, powder); aluminum(III) oxide (Al$_2$O$_3$, 99%, powder); bismuth(III) oxide (Bi$_2$O$_2$, 99%, powder); indium(III) oxide (In$_2$O$_3$, 99%, powder); gallium(III) oxide (Ga$_2$O$_3$, 99%, powder); zinc(II) oxide (ZnO, 99%, powder); zirconium(IV) hydroxide (Zr(OH)$_4$, 99%, powder); lanthanum(III) oxide (La$_2$O$_3$, 99%, powder); yttrium(III) oxide (Y$_2$O$_3$, 99%, powder); molybdenum(VI) oxide (MoO$_3$, 99%, powder); tungsten (VI) oxide (WO$_3$, 99%, powder); sodium carbonate (Na$_2$CO$_3$, 99%, powder); magnesium carbonate (MgCO$_3$, 99%, powder); calcium carbonate (CaCO$_3$, 99%, powder); aluminum(III) chloride hexahydrate (AlCl$_3$.6W, 98%, powder); dialuminum(III) chloride pentahydroxide (Al$_2$Cl(OH)$_5$, 95%, 50% w/w aqueous); aluminum(III) sulfate hexadecahydrate (Al$_2$(SO$_4$)$_3$.16W, 95%, powder); sodium aluminate(III) (Na$_{15}$Al$_{11}$O$_{24}$, 98%, powder); acetic acid (C$_2$H$_4$O$_2$, 99%, liquid); glycolic acid (C$_2$H$_4$O$_3$, 99%, 70% w/w aqueous liquid); DL-lactic acid (C$_3$H$_6$O$_3$, 99%, 90% w/w aqueous liquid); DL-malic acid (C$_4$H$_6$O$_5$, 99%, powder); citric acid (C$_6$H$_8$O$_7$, 99%, powder); tartaric acid (C$_4$H$_6$O$_6$, 99%, powder); DL-2-hydroxybutyric acid (C$_4$H$_8$O$_3$, 97%, liquid); DL-3-hydroxybutyric acid (C$_4$H$_8$O$_3$, 98%, liquid); DL-citramalic acid (C$_5$H$_8$O$_5$, 99%, powder); mucic acid (C$_6$H$_{10}$O$_8$, 99%, powder); caffeic acid (C$_9$H$_8$O$_4$, 98%, powder); chlorogenic acid (C$_{16}$H$_{18}$O$_9$, 95%, powder); 2,3-dihydroxybenzoic acid (C$_7$H$_6$O$_4$, 99%, powder); boric acid (H$_3$BO$_3$, 99%, powder); phosphoric acid (H$_3$PO$_4$, 99%, 85% w/w aqueous liquid).

SikaSet NC and SikaSet HE accelerating, water-reducing and superplasticizing admixtures, were obtained from Sika Corporation, Lyndhurst, N.J., USA. Pozzutec 20+ accelerating and water-reducing admixture was obtained from BASF Corporation, Florham Park, N.J., USA.

Type II OPC was obtained from Lehigh Southwest Cement Company, San Ramon, Calif., USA. Fly ash C and fly ash F were obtained from Boral Material Technologies, San Antonio, Tex., USA. Concrete sand was obtained from Graniterock, San Jose, Calif., USA. Limestone powder was obtained from Greymont Inc., Salt Lake City, Utah, USA. Basic oxygen furnace and electric arc furnace slags were obtained from Ecocem, Dublin, Ireland. Seawater brucite fines were obtained from the Moss Landing Business Park, Moss Landing, Calif., USA.

Methods:

Laboratory-scale (typically 4 or 8 g) admixture preparations were carried out using Radleys carousel reaction stations, fitted with 40 mL glass reaction vials, and reflux heads.

The performances of the admixtures with hydraulic cement compositions were assessed by forming and testing 3:1:1 (w/w) OPC-fly ash F-sand and 3:2 (w/w) fly ash C-sand mortars. Mortars were prepared in 0.5 or 1.0 kg batches. Cement components (OPC and fly ash F, or fly ash C alone) and sand were blended together at 139 rpm for 2 minutes, using a Gilson planetary mixer. Agitation was increased to 285 rpm, and a mixture of water and admixture added, and mixing continued for 2 minutes. Mixing was stopped, the sides of the mixing bowl scraped down, and mixing continued for 2 minutes.

Set time measurements were performed on fresh mortars using an ACME needle penetrometer. Mortar specimens were placed in 2×4 inch polypropylene cylinders, and measurements were performed at 292-294 K, 30-40% relative humidity.

Hardness measurements were performed on 2 inch mortar cubes with a Leica microhardness tester fitted with a Vickers pyramidal diamond head, loaded at 10, 50 and 100 N. Measurements were performed at 292-294 K, and 30-40% relative humidity. Mortars were cast in polypropylene cube molds, and cured at 292-294 K, 40-60% relative humidity, for 1 day.

Compressive strength tests were performed on 2 inch mortar cubes using an Instron instrument. Measurements were performed at 292-294 K, and 30-40% relative humidity. Mortars were cast in polypropylene cube molds, and cured at 292-294 K, 40-60% relative humidity, for 1 day, then at 292-294 K, 30-40% relative humidity, thereafter.

Linear shrinkage measurements were made on single or duplicate 4×12" mortar bars, cast using 316 SS molds, cured at 292-294 K, 40-60% relative humidity, for 1, demolded and cured at 292-294 K, 40-60% relative humidity, for 1 day, then demolded and cured at 292-294 K, 40-60% relative humidity, thereafter.

Water permeability determinations were made using a Taywood instrument. Mortars were cast as 1×12" bars, using 316 SS moulds, cured at 50% H, 295 K, 0-1 d, then demolded, cured at 292-294 K, and 40-60% RH, for 28 days, then sawn and cored with diamond tools to furnish 1" thick disks. Specimens were de-aerated under 20 mbar vacuum for 20 hours, then water-saturated under 2 bar water pressure 2 hours, and measurements performed at water pressures of 5 and 10 bar, at 292-294 K.

Freeze-thaw resistance was evaluated as per ASTM C-666, wet method, using an Olson instrument. Mortars were cast as 3×12" bars, using 316 SS molds, cured at 292-294 K, 40-60% relative humidity, for 1 day, then demolded and cured at 292-294 K, 40-60% relative humidity, thereafter.

Preparations:

The following examples illustrate the preparation of the aforementioned admixtures for use with hydraulic cement compositions.

In the following examples, the nominal formulas for the admixtures are provided, which are indicative only of the molar ratios of the reactants used in the preparations. As such, the formulas do not indicate the actual complexes present, but rather the overall chemical compositions. Furthermore, the admixtures are expected to contain mixtures of such complexes as described above, and as exemplified in Table 8.

For comparative purposes, cement compositions prepared with the admixtures of the present invention were compared with control compositions prepared with water alone, and with the commercial accelerating admixtures, SikaSet NC, SikaSet HE and Pozzutec 20+.

Admixtures C1-C11 were prepared as 40% w/w aqueous solutions or suspensions, using the □-hydroxycarboxylic acid, glycolic acid (Gly) as the ligand. Admixture C1 is sodium glycolate ($Na_1(Gly)_1$), admixture C2 is an aluminum glycolate complex ($Al_1(Gly)_3$), and admixtures 3-11 are sodium glycolatoaluminate(III) complexes ($Na_xAl_y(Gly)_z$, where x is between 1 and 5, y is between 1 and 2, and z is between 1 and 6). The formulation and preparation of the admixtures is detailed in Table 9, with representative examples (admixtures C1, C2 and C3-C11) provided below as Examples 1-3. The testing of the admixtures for OPC-fly ash F-sand and fly ash C-sand mortars is detailed in Tables 10 and 11 respectively. Mortars prepared with sodium glycolatoaluminate(III) admixtures achieved substantially greater hardness and compressive strength than those prepared with water, sodium glycolate, or the commercial SikaSet or Pozzutec admixtures.

The results show that glycolatoaluminate(III) complexes are useful as admixtures for hydraulic cement compositions, and that they improve setting, hardness and compressive strength.

Example 1

Admixture C1. Sodium Glycolate: $Na_1(Gly)_1$

Sodium hydroxide (2.78 g) was dissolved with stirring (340 rpm) in water (9.6 g) maintained at 293 K, glycolic acid (7.57 g) added over 1 minute, and stirring continued at 293 K for 22 hours. A clear solution was obtained, and this was diluted to 6% w/w solids for testing.

Example 2

Admixture C2. Aluminum(III) Glycolate: $Al_1(Gly)_3$

Aluminum(III) hydroxide (2.51 g) was suspended with stirring (340 rpm) in water (8.9 g) maintained at 343 K, glycolic acid (8.60 g) added over 1 minute, and stirring continued at 343 K for 70 hours. A white suspension was obtained, and this was diluted to 6% w/w solids for testing.

Example 3

Admixture C3. Sodium Glycolatoaluminate(III): $Na_1Al_1(Gly)_1$

Sodium hydroxide (1.19 g) was dissolved with stirring (340 rpm) in water (9.9 g) maintained at 293 K, glycolic acid (3.23 g) added over 2 minutes, and stirring continued for 15 minutes. Aluminum(III) hydroxide (5.65 g) was then added, the temperature raised to 343 K, and stirring continued for 70 hours. A white suspension was obtained, and this was diluted to 6% w/w solids for testing.

Admixtures C4-C11 were similarly prepared using the method of Example 3.

TABLE 9

Preparation and Properties of Admixtures C1-C11

| Admixtures | | Reactants (Mass in g) | | | | Reaction Product | |
|---|---|---|---|---|---|---|---|
| # | Mol Composition | NaOH | Al(OH)$_3$ | Gly | Water | pH | Appearance |
| C1 | $Na_1(Gly)_1$ | 2.78 | — | 7.57 | 9.6 | 11.8 | Clear Solution |
| C2 | $Al_1(Gly)_3$ | — | 2.51 | 8.60 | 8.9 | 3.2 | White Suspension |
| C3 | $Na_1Al_1(Gly)_1$ | 1.19 | 5.65 | 3.23 | 9.9 | 8.8 | White Suspension |
| C4 | $Na_2Al_2(Gly)_3$ | 1.39 | 3.31 | 5.68 | 9.6 | 8.1 | White Suspension |
| C5 | $Na_3Al_2(Gly)_3$ | 1.92 | 3.05 | 5.23 | 9.8 | 10.7 | White Suspension |
| C6 | $Na_1Al_1(Gly)_2$ | 1.20 | 2.84 | 6.50 | 9.5 | 8.5 | White Suspension |
| C7 | $Na_3Al_2(Gly)_4$ | 1.67 | 2.65 | 6.05 | 9.6 | 11.1 | White Suspension |
| C8 | $Na_2Al_1(Gly)_3$ | 1.67 | 1.99 | 6.82 | 9.5 | 8.0 | White Suspension |
| C9 | $Na_3Al_1(Gly)_4$ | 1.93 | 1.53 | 6.99 | 9.5 | 7.8 | White Suspension |
| C10 | $Na_4Al_1(Gly)_4$ | 2.38 | 1.42 | 6.48 | 9.7 | 8.1 | White Suspension |
| C11 | $Na_5Al_1(Gly)_6$ | 2.20 | 1.05 | 7.18 | 9.6 | 8.2 | White Suspension |

Notes.
Reaction conditions are detailed in Examples 1-3;
NaOH is sodium hydroxide;
Al(OH)$_3$ is aluminum(III) hydroxide;
Gly is glycolic acid;
W is water.

TABLE 10

1:1:3 (w/w) OPC-Fly Ash F-Sand Mortars made with Admixtures C1-C11

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 dayP20 |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C1 | 0.41 | 6.0 | 2.46 | 205 | 63 | 10.2 | 29.3 |
| C2 | 0.41 | 6.0 | 2.46 | 165 | 78 | 13.6 | 30.5 |
| C3 | 0.41 | 6.0 | 2.46 | 95 | 128 | 19.1 | 44.6 |
| C4 | 0.41 | 6.0 | 2.46 | 90 | 121 | 18.8 | 43.2 |
| C5 | 0.41 | 6.0 | 2.46 | 70 | 123 | 19.6 | 44.7 |
| C6 | 0.41 | 6.0 | 2.46 | 70 | 138 | 20.3 | 45.9 |

TABLE 10-continued

1:1:3 (w/w) OPC-Fly Ash F-Sand Mortars made with Admixtures C1-C11

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day P20 |
|---|---|---|---|---|---|---|---|
| C7  | 0.41 | 6.0 | 2.46 | 65 | 151 | 21.5 | 43.8 |
| C8  | 0.41 | 6.0 | 2.46 | 75 | 130 | 18.1 | 40.9 |
| C9  | 0.41 | 6.0 | 2.46 | 58 | 137 | 19.2 | 38.5 |
| C10 | 0.41 | 6.0 | 2.46 | 43 | 119 | 17.8 | 36.4 |
| C11 | 0.41 | 6.0 | 2.46 | 36 | 123 | 17.3 | 37.0 |

Notes:
W/C is the water-to-cement ratio;
Hardness is the Vickers indentation hardness;
SNC is SikaSet NC;
SHE is SikaSet HE;
P20 is Pozzutec 20+.

TABLE 11

2:3 (w/w) Fly Ash C-Sand Mortars made with Admixtures C1-C11

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C1  | 0.22 | 6.0 | 1.32 | 13 | 123 | 18.4 | 40.9 |
| C2  | 0.22 | 6.0 | 1.32 | 46 | 107 | 15.0 | 35.2 |
| C3  | 0.22 | 6.0 | 1.32 | 25 | 178 | 25.3 | 52.5 |
| C4  | 0.22 | 6.0 | 1.32 | 23 | 188 | 26.7 | 54.7 |
| C5  | 0.22 | 6.0 | 1.32 | 22 | 184 | 26.1 | 53.2 |
| C6  | 0.22 | 6.0 | 1.32 | 28 | 179 | 25.3 | 53.3 |
| C7  | 0.22 | 6.0 | 1.32 | 28 | 193 | 27.7 | 57.0 |
| C8  | 0.22 | 6.0 | 1.32 | 32 | 201 | 28.6 | 59.2 |
| C9  | 0.22 | 6.0 | 1.32 | 28 | 190 | 26.1 | 56.9 |
| C10 | 0.22 | 6.0 | 1.32 | 34 | 181 | 24.8 | 53.5 |
| C11 | 0.22 | 6.0 | 1.32 | 27 | 186 | 26.1 | 55.1 |

Notes:
W/C is the water-to-cement ratio;
Hardness is the Vickers indentation hardness;
SNC is SikaSet NC;
SHE is SikaSet HE;
P20 is Pozzutec 20+.

Admixtures C12-C20 were prepared as 40% w/w aqueous solutions or suspensions, using the α-hydroxycarboxylic acid, lactic acid (Lac) as the ligand. Admixture C12 is sodium lactate ($Na_1(Lac)_1$), admixture C13 is an aluminum lactate complex ($Al_1(Lac)_3$), and admixtures C14-C20 are sodium lactatoaluminate(III) complexes ($Na_xAl_y(Lac)_z$, where x is between 1 and 5, y is between 1 and 2, and z is between 1 and 6). The formulation and preparation of the admixtures is detailed in Table 12, with representative examples (admixtures C12, C13 and C14-C20) provided below as Examples 4-6. The testing of the admixtures for OPC-fly ash F-sand and fly ash C-sand mortars is detailed in Tables 13 and 14 respectively. Mortars prepared with sodium lactatoaluminate(III) admixtures achieved substantially greater hardness and compressive strength than those prepared with water, sodium lactate, or the commercial SikaSet or Pozzutec admixtures.

The results show that lactatoaluminate(III) complexes are useful as admixtures for hydraulic cement compositions, and that they improve setting, hardness and compressive strength.

Example 4

Admixture C12. Sodium Lactate: $Na_1(Lac)_1$

Sodium hydroxide (2.48 g) was dissolved with stirring (340 rpm) in water (11.3 g) maintained at 293 K, lactic acid (6.22 g) added over 1 minute, and stirring continued at 293 K for 22 hours. A clear solution was obtained, and this was diluted to 6% w/w solids for testing.

Example 5

Admixture C13. Aluminum(III) Lactate: $Al_1(LAC)_3$

Aluminum(III) hydroxide (2.21 g) was suspended with stirring (340 rpm) in water (10.8 g) maintained at 343 K, lactic acid (6.97 g) added over 1 minute, and stirring continued at 343 K for 70 hours. A white suspension was obtained, and this was diluted to 6% w/w solids for testing.

Example 6

Admixture C14. Sodium Lactatoaluminate(III): $Na_1Al_1(Lac)_1$

Sodium hydroxide (1.55 g) was dissolved with stirring (340 rpm) in water (10.9 g) maintained at 293 K, lactic acid (3.89 g) added over 2 minutes, and stirring continued for 15 minutes. Aluminum(III) hydroxide (3.69 g) was then added, the temperature raised to 343 K, and stirring continued for 70 hours. A white suspension was obtained, and this was diluted to 6% w/w solids for testing.

Admixtures C15-C20 were similarly prepared using the method of Example 6.

TABLE 12

Preparation and Properties of Admixtures C12-C20

| Admixture | | Reactants (Mass in g) | | | | Reaction Product | |
|---|---|---|---|---|---|---|---|
| # | Mol Composition | NaOH | Al(OH)$_3$ | Lac | Water | pH | Appearance |
| C12 | Na$_1$(Lac)$_1$ | 2.48 | — | 6.22 | 11.3 | 12.4 | Clear Solution |
| C13 | Al$_1$(Lac)$_3$ | — | 2.21 | 6.97 | 10.8 | 3.5 | White Suspension |
| C14 | Na$_1$Al$_1$(Lac)$_1$ | 1.55 | 3.69 | 3.89 | 10.9 | 9.0 | White Suspension |
| C15 | Na$_1$Al$_1$(Lac)$_2$ | 1.08 | 2.58 | 5.43 | 10.9 | 8.6 | Cloudy Solution |
| C16 | Na$_2$Al$_1$(Lac)$_3$ | 1.51 | 1.79 | 5.67 | 11.0 | 8.9 | Cloudy Solution |
| C17 | Na$_2$Al$_2$(Lac)$_3$ | 1.28 | 3.04 | 4.79 | 10.9 | 7.8 | Cloudy Solution |
| C18 | Na$_3$Al$_2$(Lac)$_3$ | 1.78 | 2.81 | 4.44 | 11.0 | 10.4 | Cloudy Solution |
| C19 | Na$_3$Al$_2$(Lac)$_4$ | 1.52 | 2.42 | 5.08 | 11.0 | 9.2 | White Suspension |
| C20 | Na$_5$Al$_2$(Lac)$_6$ | 1.80 | 1.71 | 5.41 | 11.1 | 9.1 | White Suspension |

Notes.
Reaction conditions are detailed in Examples 1-3;
NaOH is sodium hydroxide;
Al(OH)$_3$ is aluminum(III) hydroxide;
Lac is lactic acid;
W is water.

TABLE 13

1:1:3 (w/w) OPC-Fly Ash F-Sand Mortars made with Admixtures C12-C20

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C12 | 0.41 | 6.0 | 2.46 | 185 | 65 | 11.8 | 28.6 |
| C13 | 0.41 | 6.0 | 2.46 | 135 | 69 | 10.2 | 28.8 |
| C14 | 0.41 | 6.0 | 2.46 | 80 | 132 | 19.3 | 47.4 |
| C15 | 0.41 | 6.0 | 2.46 | 75 | 136 | 21.4 | 53.1 |
| C16 | 0.41 | 6.0 | 2.46 | 65 | 137 | 23.7 | 55.8 |
| C17 | 0.41 | 6.0 | 2.46 | 85 | 155 | 21.3 | 56.5 |
| C18 | 0.41 | 6.0 | 2.46 | 57 | 162 | 26.5 | 53.9 |
| C19 | 0.41 | 6.0 | 2.46 | 52 | 154 | 21.4 | 49.8 |
| C20 | 0.41 | 6.0 | 2.46 | 47 | 138 | 18.1 | 47.2 |

Notes:
W/C is the water-to-cement ratio;
Hardness is the Vickers indentation hardness;
SNC is SikaSet NC;
SHE is SikaSet HE;
P20 is Pozzutec 20+.

TABLE 14

2:3 (w/w) Fly Ash C-Sand Mortars made with Admixtures C12-C20

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.7 | 16.8 |
| SHE | 0.23 | — | 0.5 | 42 | 63 | 8.9 | 23.5 |
| P20 | 0.24 | — | 0.5 | 33 | 71 | 9.5 | 26.0 |

TABLE 14-continued

2:3 (w/w) Fly Ash C-Sand Mortars made with Admixtures C12-C20

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| C12 | 0.22 | 6.0 | 1.32 | 15 | 128 | 18.3 | 42.2 |
| C13 | 0.22 | 6.0 | 1.32 | 53 | 107 | 14.6 | 29.4 |
| C14 | 0.22 | 6.0 | 1.32 | 24 | 183 | 25.2 | 55.1 |
| C15 | 0.22 | 6.0 | 1.32 | 26 | 196 | 26.7 | 58.1 |
| C16 | 0.22 | 6.0 | 1.32 | 30 | 206 | 29.3 | 58.7 |
| C17 | 0.22 | 6.0 | 1.32 | 22 | 205 | 29.8 | 57.7 |
| C18 | 0.22 | 6.0 | 1.32 | 21 | 191 | 29.8 | 61.1 |
| C19 | 0.22 | 6.0 | 1.32 | 24 | 181 | 25.4 | 57.0 |
| C20 | 0.22 | 6.0 | 1.37 | 27 | 188 | 28.3 | 56.3 |

Notes:
W/C is the water-to-cement ratio;
Hardness is the Vickers indentation hardness;
SNC is SikaSet NC;
SHE is SikaSet HE;
P20 is Pozzutec 20+.

Admixtures C21-C27 were prepared as 40% w/w aqueous solutions or suspensions, using the α-hydroxydicarboxylic acid, malic acid (Mal) as the ligand. Admixture C21 is sodium malate ($Na_2(Mal)_1$), admixture C22 is an aluminum malate complex ($Al_2(Mal)_3$), and admixtures C23-C27 are sodium malatoaluminate(III) complexes ($Na_xAl_y(Mal)_z$, where x is between 1 and 4, y is between 1 and 2, and z is between 1 and 3). The formulation and preparation of the admixtures is detailed in Table 15, with representative examples (admixtures C21, C22 and C23) provided below as Examples 7-9. The testing of the admixtures for OPC-fly ash F-sand and fly ash C-sand mortars is detailed in Tables 16 and 17 respectively. Mortars prepared with sodium malatoaluminate(III) admixtures achieved substantially greater hardness and compressive strength than those prepared with water, sodium malate, or the commercial SikaSet or Pozzutec admixtures.

The results show that malatoaluminate(II) complexes are useful as admixtures for hydraulic cement compositions, and that they improve setting, hardness and compressive strength.

Example 7

Admixture C21. Sodium Malate: $Na_2(Mal)_1$

Sodium hydroxide (3.01 g) was dissolved with stirring (340 rpm) in water (11.9 g) maintained at 293 K, lactic acid (5.06 g) added over 1 minute, and stirring continued at 293 K for 22 hours. A clear solution was obtained, and this was diluted to 6% w/w solids for testing.

Example 8

Admixture C22. Aluminum(III) Malate: $Al_2(Mal)_3$

Aluminum(III) hydroxide (2.75 g) was suspended with stirring (340 rpm) in water (11.4 g) maintained at 343 K, malic acid (5.82 g) added over 1 minute, and stirring continued at 343 K for 70 hours. A white suspension was obtained, and this was diluted to 6% w/w solids for testing.

Example 9

Admixture C23. Sodium Malatoaluminate(III): $Na_1Al_1(Mal)_1$

Sodium hydroxide (1.28 g) was dissolved with stirring (340 rpm) in water (11.4 g) maintained at 293 K, malic acid (4.30 g) added over 2 minutes, and stirring continued for 15 minutes. Aluminum(III) hydroxide (3.05 g) was then added, the temperature raised to 343 K, and stirring continued for 70 hours. A clear solution was obtained, and this was diluted to 6% w/w solids for testing.

Admixtures C24-C27 were similarly prepared using the method of Example 9.

TABLE 15

Preparation and Properties of Admixtures C21-C27

| Admixture | | Reactants (Mass in g) | | | | Reaction Product | |
|---|---|---|---|---|---|---|---|
| # | Mol Composition | NaOH | $Al(OH)_3$ | Mal | Water | pH | Appearance |
| C21 | $Na_2(Mal)_1$ | 3.02 | — | 5.06 | 11.9 | 12.8 | Clear Solution |
| C22 | $Al_2(Mal)_3$ | — | 2.75 | 5.82 | 11.4 | 3.4 | White Suspension |
| C23 | $Na_1Al_1(Mal)_1$ | 1.28 | 3.05 | 4.30 | 11.4 | 7.2 | Clear Solution |
| C24 | $Na_2Al_1(Mal)_1$ | 2.21 | 2.63 | 3.71 | 11.4 | 10.9 | Cloudy Solution |
| C25 | $Na_2Al_2(Mal)_1$ | 1.75 | 4.15 | 2.93 | 11.2 | 8.4 | White Suspension |

TABLE 15-continued

Preparation and Properties of Admixtures C21-C27

| Admixture | | Reactants (Mass in g) | | | | Reaction Product | |
|---|---|---|---|---|---|---|---|
| # | Mol Composition | NaOH | Al(OH)$_3$ | Mal | Water | pH | Appearance |
| C26 | Na$_3$Al$_2$(Mal)$_2$ | 1.78 | 2.82 | 3.98 | 11.4 | 8.6 | White Suspension |
| C27 | Na$_4$Al$_2$(Mal)$_3$ | 1.80 | 2.14 | 4.53 | 11.5 | 9.1 | White Suspension |

Notes.
Reaction conditions are detailed in Examples 1-3;
NaOH is sodium hydroxide;
Al(OH)$_3$ is aluminum(III) hydroxide;
MalH is malic acid;
W is water.

TABLE 16

1:1:3 (w/w) OPC-Fly Ash F-Sand Mortars made with Admixtures C21-C27

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C21 | 0.41 | 6.0 | 2.46 | 160 | 68 | 11.7 | 33.0 |
| C22 | 0.41 | 6.0 | 2.46 | 150 | 64 | 9.6 | 26.1 |
| C23 | 0.41 | 6.0 | 2.46 | 95 | 151 | 19.8 | 53.4 |
| C24 | 0.41 | 6.0 | 2.46 | 80 | 143 | 16.2 | 51.4 |
| C25 | 0.41 | 6.0 | 2.46 | 80 | 136 | 15.8 | 47.6 |
| C26 | 0.41 | 6.0 | 2.46 | 65 | 138 | 17.7 | 50.8 |
| C27 | 0.41 | 6.0 | 2.46 | 51 | 140 | 17.2 | 43.2 |

Notes:
W/C is the water-to-cement ratio;
Hardness is the Vickers indentation hardness;
SNC is SikaSet NC;
SHE is SikaSet HE;
P20 is Pozzutec 20+.

TABLE 17

2:3 (w/w) Fly Ash C-Sand Mortars made with Admixtures C21-C27

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C21 | 0.22 | 6.0 | 1.32 | 16 | 135 | 19.4 | 43.2 |
| C22 | 0.22 | 6.0 | 1.32 | 105 | 149 | 19.6 | 42.6 |
| C23 | 0.22 | 6.0 | 1.32 | 28 | 198 | 29.2 | 61.7 |
| C24 | 0.22 | 6.0 | 1.32 | 16 | 175 | 24.1 | 53.8 |
| C25 | 0.22 | 6.0 | 1.32 | 34 | 164 | 24.0 | 50.4 |
| C26 | 0.22 | 6.0 | 1.32 | 28 | 181 | 26.8 | 56.9 |
| C27 | 0.22 | 6.0 | 1.32 | 42 | 139 | 19.0 | 40.7 |

Notes:
W/C is the water-to-cement ratio;
Hardness is the Vickers indentation hardness;
SNC is SikaSet NC;
SHE is SikaSet HE;
P20 is Pozzutec 20+.

Admixtures C28-C37 were prepared as 40% w/w aqueous solutions or suspensions, using the α-hydroxytricarboxylic acid, citric acid (Cit) as the ligand. Admixture C28 is sodium citrate (Na$_3$(Cit)$_1$), admixtures C29 and C30 are aluminum citrate complexes (Al$_1$(Cit)$_1$ and Al$_4$(Cit)$_1$), and admixtures C31-C37 are sodium citratoaluminate(III) complexes (Na$_x$Al$_y$(Cit)$_1$, where x is between 1 and 3, and y is between 1 and 4). The formulation and preparation of the admixtures is detailed in Table 18, with representative examples (admixtures C28, C29 and C31) provided below as Examples 10-12. The testing of the admixtures for Portland cement-fly ash F-sand and fly ash C-sand mortars is detailed in Tables 19 and 20 respectively. Mortars prepared with sodium citratoaluminate(III) admixtures achieved substantially greater hardness and compressive strength than those prepared with water, sodium citrate, or the commercial SikaSet or Pozzutec admixtures.

The results show that citratoaluminate(III) complexes are useful as admixtures for hydraulic cement compositions, and that they improve setting, hardness and compressive strength.

Example 10

Admixture C28. Sodium Citrate: Na$_3$(Cit)$_1$

Sodium hydroxide (3.11 g) was dissolved with stirring (340 rpm) in water (11.9 g) maintained at 293 K, citric acid (4.97 g) added over 1 minute, and stirring continued at 293 K for 22 hours. A clear solution was obtained, and this was diluted to 6% w/w solids for testing.

Example 11

Admixture C29. Aluminum(III) Citrate: Al$_1$(Cit)$_1$

Aluminum(III) hydroxide (2.85 g) was suspended with stirring (340 rpm) in water (11.4 g) maintained at 343 K, citric acid (5.75 g) added over 1 minute, and stirring continued at 343 K for 70 hours. A clear solution was obtained, and this was diluted to 6% w/w solids for testing.

Admixture C30 was similarly prepared using the method of Example 11.

Example 12

Admixture C31. Sodium Citratoaluminate(III): Na$_1$Al$_1$(Cit)$_1$

Sodium hydroxide (1.04 g) was dissolved with stirring (340 rpm) in water (11.5 g) maintained at 293 K, citric acid (5.01 g) added over 2 minutes, and stirring continued for 15 minutes. Aluminum(III) hydroxide (2.48 g) was then added, the temperature raised to 343 K, and stirring continued for 70 hours. A clear solution was obtained, and this was diluted to 6% w/w solids for testing.

Admixtures C32-C37 were similarly prepared using the method of Example 12.

TABLE 18

Preparation and Properties of Admixtures C28-C37

| Admixture | | Reactants (Mass in g) | | | Reaction Product | |
|---|---|---|---|---|---|---|
| # | Mol Composition | NaOH | Al(OH)$_3$ | Cit | Water | pH | Appearance |
| C28 | Na$_3$(Cit)$_1$ | 3.11 | — | 4.97 | 11.9 | 9.5 | Clear Solution |
| C29 | Al$_1$(Cit)$_1$ | — | 2.85 | 5.75 | 11.4 | 2.2 | Clear Solution |
| C30 | Al$_4$(Cit)$_1$ | — | 6.10 | 3.08 | 10.8 | 6.0 | White Suspension |
| C31 | Na$_1$Al$_1$(Cit)$_1$ | 1.04 | 2.48 | 5.01 | 11.5 | 2.5 | Clear Solution |
| C32 | Na$_2$Al$_1$(Cit)$_1$ | 1.85 | 2.20 | 4.43 | 11.5 | 8.6 | Clear Solution |
| C33 | Na$_3$Al$_1$(Cit)$_1$ | 2.49 | 1.97 | 3.98 | 11.6 | 10.2 | Cloudy Gel |
| C34 | Na$_2$Al$_2$(Cit)$_1$ | 1.51 | 3.59 | 3.63 | 11.3 | 8.7 | White Suspension |
| C35 | Na$_3$Al$_2$(Cit)$_1$ | 2.07 | 3.28 | 3.32 | 11.3 | 10.0 | Cloudy Gel |
| C36 | Na$_1$Al$_4$(Cit)$_1$ | 0.59 | 5.65 | 2.85 | 10.9 | 6.8 | White Suspension |
| C37 | Na$_2$Al$_4$(Cit)$_1$ | 1.11 | 5.26 | 2.66 | 11.0 | 8.8 | White Suspension |

Notes:
Reaction conditions are detailed in Examples 10-12;
NaOH is sodium hydroxide;
Al(OH)$_3$ is aluminum(III) hydroxide;
Cit is citric acid;
W is water.

TABLE 19

1:1:3 (w/w) OPC-Fly Ash F-Sand Mortars made with Admixtures C28-C37

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C28 | 0.41 | 6.0 | 2.46 | 185 | 61 | 10.5 | 27.6 |
| C29 | 0.41 | 6.0 | 2.46 | 175 | 63 | 11.3 | 31.5 |
| C30 | 0.41 | 6.0 | 2.46 | 160 | 58 | 9.9 | 23.2 |
| C31 | 0.41 | 6.0 | 2.46 | 145 | 129 | 18.1 | 43.9 |
| C32 | 0.41 | 6.0 | 2.46 | 140 | 155 | 21.6 | 52.4 |
| C33 | 0.41 | 6.0 | 2.46 | 125 | 146 | 20.6 | 49.3 |
| C34 | 0.41 | 6.0 | 2.46 | 130 | 144 | 18.1 | 40.5 |
| C35 | 0.41 | 6.0 | 2.46 | 105 | 137 | 18.4 | 44.7 |
| C36 | 0.41 | 6.0 | 2.46 | 125 | 133 | 16.2 | 35.1 |
| C37 | 0.41 | 6.0 | 2.46 | 115 | 124 | 17.4 | 37.2 |

Notes:
W/C is the water-to-cement ratio;
Hardness is the Vickers indentation hardness;
SNC is SikaSet NC;
SHE is SikaSet HE;
P20 is Pozzutec 20+.

TABLE 20

2:3 (w/w) Fly Ash C-Sand Mortars made with Admixtures C28-C37

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C28 | 0.22 | 6.0 | 1.32 | 19 | 121 | 15.4 | 34.9 |
| C29 | 0.22 | 6.0 | 1.32 | 110 | 117 | 14.9 | 31.6 |
| C30 | 0.22 | 6.0 | 1.32 | 54 | 124 | 17.1 | 37.9 |
| C31 | 0.22 | 6.0 | 1.32 | 38 | 130 | 17.8 | 41.6 |
| C32 | 0.22 | 6.0 | 1.32 | 44 | 156 | 21.5 | 56.1 |
| C33 | 0.22 | 6.0 | 1.32 | 55 | 201 | 28.7 | 58.9 |
| C34 | 0.22 | 6.0 | 1.32 | 28 | 198 | 26.8 | 57.9 |
| C35 | 0.22 | 6.0 | 1.32 | 25 | 165 | 24.7 | 53.9 |
| C36 | 0.22 | 6.0 | 1.32 | 58 | 141 | 18.4 | 42.9 |
| C37 | 0.22 | 6.0 | 1.32 | 64 | 124 | 19.6 | 40.2 |

Notes:
W/C is the water-to-cement ratio;
Hardness is the Vickers indentation hardness;
SNC is SikaSet NC;
SHE is SikaSet HE;
P20 is Pozzutec 20+.

Admixtures C38-C52 were prepared as 40% w/w aqueous solutions or suspensions, using a variety of other hydroxycarboxylic acids, namely the α-hydroxycarboxylic acid, 2-hydroxybutyric acid (2HBt), the β-hydroxycarboxylic acid, 3-hydroxybutyric acid (3HBt), the α-hydroxydicarboxylic acid, citramalic acid (Cml), the α,α'-dihydroxydicarboxylic acid, tartaric acid (Tar), and the α,α',β,β'-tetrahydroxydicarboxylic acid, mucic acid (Muc).

Admixture C38 is sodium 2-hydroxybutyrate (Na$_1$(2HBt)$_1$), and admixtures C39 and C40 are sodium 2-hydroxybutyratoaluminate(III) complexes (Na$_1$Al$_1$(2HBt)$_x$, where x is 1 or 2). Admixture C41 is sodium 3-hydroxybutyrate (Na$_1$(3HBt)$_1$), and admixtures C42 and C43 are sodium 3-hydroxybutyratoaluminate(III) complexes (Na$_1$Al$_1$(2HBt)$_x$, where x is 1 or 2). Admixture C44 is sodium citramalate (Na$_2$(Cml)$_1$), and admixtures C45 and C46 are sodium citramalatoaluminate(III) complexes (Na$_x$Al$_1$(Cml)$_x$, where x is 1 or 2). Admixture C47 is sodium tartarate (Na$_2$(Tar)$_1$), and admixtures C48 and C49 are sodium tartaratoaluminate(III) complexes (Na$_x$Al$_y$(Tar)$_y$, where x is 1 or 3, and y is 1 or 2). Admixture C50 is sodium mucate (Na$_2$(Muc)$_1$), and admixtures C51 and C52 are sodium mucatoaluminate(III) complexes (Na$_x$Al$_y$(Muc)$_y$, where x is 1 or 3, and y is 1 or 2). The formulation and preparation of the admixtures is detailed in Table 21, with representative examples (admixtures C38 and C39) provided below as Examples 13 and 14. The testing of the admixtures for OPC-fly ash F-sand and fly ash C-sand mortars is detailed in Tables 22 and 23 respectively.

Mortars prepared with 2-hydroxybutyratoaluminate(III) admixtures achieved substantially greater hardness and compressive strength than those prepared with water, sodium 2-hydroxybutyrate, or the SikaSet or Pozzutec admixtures. A similar trend was seen with the 3-hydroxybutyrate admixtures. Also, mortars prepared with the 2-hydroxybutyratoaluminate(III) admixtures had significantly higher hardness and compressive strengths than those prepared with the corresponding 3-hydroxybutyratoaluminate (III) admixtures, perhaps due to the increased distance of the hydroxyl group from the carboxyl function.

Mortars prepared with the citramalatoaluminate(III) admixtures achieved substantially greater hardness and compressive strength than those prepared with water, sodium citramalate, or the commercial SikaSet or Pozzutec admixtures. Mortars prepared with the sodium tartaratoaluminate(III) admixtures achieved substantially greater hardness and compressive strength than those prepared with water or sodium tartarate, and performed similarly to those prepared with the SikaSet and Pozzutec admixtures. A similar trend was seen with the mucate admixtures. Mortars prepared with tartaratoaluminate(III) or mucatoaluminate (III) admixtures showed lower hardness and compressive strengths than those prepared with the other hydroxycarboxylate admixtures, perhaps due to the presence of multiple hydroxyl groups.

The results show that hydroxycarboxylatoaluminate(III) complexes derived from a variety of aliphatic α- and β-hydroxycarboxylic acids are useful as admixtures for hydraulic cement compositions, and that they improve setting, hardness and compressive strength.

Example 13

Admixture C38. Sodium 2-Hydroxybutyrate: $Na_1(2HBT)_1$

Sodium hydroxide (2.24 g) was dissolved with stirring (340 rpm) in water (11.8 g) maintained at 293 K, 2-hydroxybutyric acid (5.96 g) added over 1 minute, and stirring continued at 293 K for 22 hours. A clear solution was obtained, and this was diluted to 6% w/w solids for testing.

Admixtures C41, C44, C47 and C50 were similarly prepared using the method of Example 13, and employing 3-hydroxybutyric acid, citramalic acid, tartaric acid or mucic acid instead of 2-hydroxybutyric acid.

Example 14

Admixture C39. Sodium 2-Hydroxybutyratoaluminate(III): $Na_1Al_1(2HBUT)_1$

Sodium hydroxide (1.46 g) was dissolved with stirring (340 rpm) in water (11.2 g) maintained at 293 K, 2-hydroxybutyric acid (3.87 g) added over 2 minutes, and stirring continued for 15 minutes. Aluminum(III) hydroxide (3.46 g) was then added, the temperature raised to 343 K, and stirring continued for 70 hours. A cloudy solution was obtained, and this was diluted to 6% w/w solids for testing.

Admixtures C40, and C42, C43, C45, C46, C48, C49, C51 and C52 were similarly prepared using the method of Example 14, the latter admixtures employing 3-hydroxybutyric acid, citramalic acid, tartaric acid or mucic acid instead of 2-hydroxybutyric acid.

TABLE 21

Preparation and Properties of Admixtures C38-C52

| Admixture | | Reactants (Mass in g) | | | Reaction Product | |
| --- | --- | --- | --- | --- | --- | --- |
| # | Mol Composition | NaOH | Al(OH)$_3$ | Water | pH | Appearance |
| | | 2HBt | | | | |
| C38 | $Na_1(2HBt)_1$ | 2.24 | — | 5.96 | 11.8 | 12.5 Clear Solution |
| C39 | $Na_1Al_1(2HBt)_1$ | 1.46 | 3.46 | 3.87 | 11.2 | 9.2 Cloudy Solution |
| C40 | $Na_1Al_1(2HBt)_2$ | 0.99 | 2.36 | 5.26 | 11.4 | 8.8 Cloudy Solution |
| | | 3HBt | | | | |
| C41 | $Na_1(3HBt)_1$ | 2.24 | — | 5.90 | 11.9 | 12.3 Clear Solution |
| C42 | $Na_1Al_1(3HBt)_1$ | 1.46 | 3.46 | 3.83 | 11.3 | 9.0 Cloudy Solution |
| C43 | $Na_1Al_1(3HBt)_2$ | 0.99 | 2.36 | 5.21 | 11.4 | 8.3 Cloudy Solution |
| | | Cml | | | | |
| C44 | $Na_2(Cml)_1$ | 2.83 | — | 5.25 | 11.9 | 12.6 Clear Solution |
| C45 | $Na_1Al_1(Cml)_1$ | 1.21 | 2.89 | 4.50 | 11.4 | 7.6 Cloudy Solution |
| C46 | $Na_2Al_1(Cml)_2$ | 1.42 | 1.69 | 5.27 | 11.6 | 11.2 Cloudy Solution |
| | | Tar | | | | |
| C47 | $Na_2(Tar)_1$ | 2.81 | — | 5.27 | 11.9 | 12.7 Clear Solution |
| C48 | $Na_1Al_1(Tar)_1$ | 1.21 | 2.87 | 4.52 | 11.4 | 7.8 Cloudy Solution |
| C49 | $Na_3Al_2(Tar)_2$ | 1.68 | 2.67 | 4.21 | 11.4 | 7.2 Cloudy Solution |

TABLE 21-continued

Preparation and Properties of Admixtures C38-C52

| # | Admixture Mol Composition | Reactants (Mass in g) NaOH | Al(OH)$_3$ | Water | Reaction Product pH | Appearance |
|---|---|---|---|---|---|---|
| | | | Muc | | | |
| C50 | Na$_2$(Muc)$_1$ | 2.23 | — | 5.85 | 11.9 13.3 | White Suspension |
| C51 | Na$_1$Al$_1$(Muc)$_1$ | 0.99 | 2.34 | 5.17 | 11.5 5.4 | White Suspension |
| C52 | Na$_3$Al$_2$(Muc)$_2$ | 1.39 | 2.21 | 4.88 | 11.5 8.1 | White Suspension |

Notes:
Reaction conditions are detailed in Examples 13 and 14;
NaOH is sodium hydroxide;
Al(OH)$_3$ is aluminum(III) hydroxide;
2HBt is 2-hydroxybutyric acid;
3HBt is 3-hydroxybutyric acid;
Cml is citramalic acid;
Tar is tartaric acid;
Muc is mucic acid;
W is water.

TABLE 22

1:1:3 (w/w) OPC-Fly Ash F-Sand Mortars made with Admixtures C38-C52

| # | W/C (w/w) | [Admixture] (% w/w) In Stock | vs Cement | Set Time (min) | Hardness (MPa) 1 day | Compressive Strength (MPa) 1 day | 28 day |
|---|---|---|---|---|---|---|---|
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C38 | 0.41 | 6.0 | 2.46 | 155 | 59 | 9.7 | 22.8 |
| C39 | 0.41 | 6.0 | 2.46 | 70 | 124 | 18.5 | 41.2 |
| C40 | 0.41 | 6.0 | 2.46 | 55 | 129 | 20.3 | 43.7 |
| C41 | 0.41 | 6.0 | 2.46 | 180 | 53 | 9.4 | 20.9 |
| C42 | 0.41 | 6.0 | 2.46 | 85 | 121 | 17.3 | 37.5 |
| C43 | 0.41 | 6.0 | 2.46 | 70 | 117 | 17.8 | 35.8 |
| C44 | 0.41 | 6.0 | 2.46 | 145 | 65 | 10.8 | 23.5 |
| C45 | 0.41 | 6.0 | 2.46 | 80 | 147 | 18.0 | 39.9 |
| C46 | 0.41 | 6.0 | 2.46 | 57 | 141 | 17.3 | 37.3 |
| C47 | 0.41 | 6.0 | 2.46 | 260 | 37 | 7.1 | 13.2 |
| C48 | 0.41 | 6.0 | 2.46 | 230 | 92 | 15.3 | 27.8 |
| C49 | 0.41 | 6.0 | 2.46 | 215 | 88 | 14.5 | 29.6 |
| C50 | 0.41 | 6.0 | 2.46 | 210 | 34 | 6.3 | 11.4 |
| C51 | 0.41 | 6.0 | 2.46 | 190 | 82 | 13.4 | 29.1 |
| C52 | 0.41 | 6.0 | 2.46 | 145 | 88 | 14.1 | 32.7 |

Notes:
W/C is the water-to-cement ratio;
Hardness is the Vickers indentation hardness;
SNC is SikaSet NC;
SHE is SikaSet HE;
P20 is Pozzutec 20+.

TABLE 23

2:3 (w/w) Fly Ash C-Sand Mortars made with Admixtures C38-C52

| # | W/C (w/w) | [Admixture] (% w/w) In Stock | vs Cement | Set Time (min) | Hardness (MPa) 1 day | Compressive Strength (MPa) 1 day | 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C38 | 0.22 | 6.0 | 1.32 | 21 | 117 | 18.8 | 38.4 |
| C39 | 0.22 | 6.0 | 1.32 | 27 | 175 | 26.2 | 53.1 |
| C40 | 0.22 | 6.0 | 1.32 | 24 | 182 | 28.0 | 55.6 |
| C41 | 0.22 | 6.0 | 1.32 | 29 | 109 | 17.2 | 33.2 |
| C42 | 0.22 | 6.0 | 1.32 | 31 | 163 | 24.7 | 50.9 |
| C43 | 0.22 | 6.0 | 1.32 | 26 | 165 | 24.1 | 47.4 |
| C44 | 0.22 | 6.0 | 1.32 | 13 | 133 | 18.6 | 37.1 |
| C45 | 0.22 | 6.0 | 1.32 | 24 | 152 | 23.7 | 50.2 |
| C46 | 0.22 | 6.0 | 1.32 | 22 | 156 | 24.5 | 53.7 |
| C47 | 0.22 | 6.0 | 1.32 | 21 | 76 | 10.3 | 23.8 |
| C48 | 0.22 | 6.0 | 1.32 | 17 | 102 | 16.0 | 30.4 |
| C49 | 0.22 | 6.0 | 1.32 | 15 | 110 | 16.8 | 32.7 |
| C50 | 0.22 | 6.0 | 1.32 | 57 | 70 | 9.7 | 21.9 |
| C51 | 0.22 | 6.0 | 1.32 | 80 | 97 | 14.5 | 29.4 |
| C52 | 0.22 | 6.0 | 1.32 | 70 | 123 | 16.5 | 31.6 |

Notes:
W/C is the water-to-cement ratio;
Hardness is the Vickers indentation hardness;
SNC is SikaSet NC;
SHE is SikaSet HE;
P20 is Pozzutec 20+.

Admixtures C53-C60 were prepared as 20% w/w aqueous solutions or suspensions, using a variety of cycloaliphatic and aromatic hydroxycarboxylic acids, namely the hydroxylated benzoic acid, 2,3-dihydroxybenzoic acid (Dhb), the hydroxylated cinnamic acid, caffeic acid (Caf), and the quinic acid-caffeic acid conjugate, chlorogenic acid (Chl).

Admixture C53 is sodium 2,3-dihydroxybenzoate (Na$_1$(Dhb)$_1$), and admixture C54 is the sodium 2,3-dihydroxybenzoatoaluminate(III) complex (Na$_1$Al$_1$(Dhb)$_2$). Admixture C55 is sodium caffeate (Na$_1$(Caf)$_1$), and admixtures C56 and C57 are sodium caffeatoaluminate(III) complexes (Na$_x$Al$_1$(Caf)$_y$, where x is 3 or 5, and y is 2 or 3). Admixture C58 is sodium chlorogenate (Na$_1$(Chl)$_1$), and admixtures C59 and C60 are sodium chlorogenatoaluminate(III) complexes (Na$_x$Al$_1$(Chl)$_y$, where x is 3 or 5, and y is 2 or 3). The formulation and preparation of the admixtures is detailed in Table 24, with representative examples (admixtures C53 and C54) provided below as Examples 16 and 17. The testing of the admixtures for OPC-fly ash F-sand and fly ash C-sand mortars is detailed in Tables 25 and 26 respectively.

Mortars prepared with 2,3-dihydroxybenzoatoaluminate (III) admixtures achieved substantially greater hardness and compressive strength than those prepared with water, sodium 2,3-dihydroxybenzoate, or the commercial SikaSet or Pozzutec admixtures. A similar trend was seen with the caffeatoaluminate(III) and chlorogenatoaluminate(III) admixtures.

These results show that a hydroxycarboxylatoaluminate (III) complexes formed from a variety of aromatic hydroxycarboxylic acids are useful as admixtures for hydraulic cement compositions, and that they improve setting, hardness and compressive strength.

Example 15

Admixture C53. Sodium 2,3-Dihydroxybenzoate: $Na_1(Dhb)_1$

Sodium hydroxide (0.83 g) was dissolved with stirring (340 rpm) in water (16.0 g) maintained at 293 K, 2,3-dihydroxybenzoic acid (3.21 g) added over 1 minute, and stirring continued at 293 K for 22 hours. A brown solution was obtained, and this was diluted to 6% w/w solids for testing.

Admixtures C55 and C58 were similarly prepared using the method of Example 15, and employing caffeic acid or chlorogenic acid instead of 2,3-dihydroxybenzoic acid.

Example 16

Admixture C54. Sodium 2,3-Dihydroxybenzoatoaluminate(III): $Na_2Al_1(Dhb)_2$

Sodium hydroxide (0.69 g) was dissolved with stirring (340 rpm) in water (15.8 g) maintained at 293 K, 2,3-dihydroxybenzoic acid (2.67 g) added over 2 minutes, and stirring continued for 15 minutes. Aluminum hydroxide(III) (0.82 g) was then added, the temperature raised to 343 K, and stirring continued for 70 hours. A brown solution was obtained, and this was diluted to 6% w/w solids for testing.

Admixtures C56, C57, C59 and C60 were similarly prepared using the method of Example 16, and employing caffeic acid or chlorogenic acid instead of 2,3-dihydroxybenzoic acid.

TABLE 24

Preparation and Properties of Admixtures C53-C60

| Admixture | | Reactants (Mass in g) | | | Reaction Products | |
| --- | --- | --- | --- | --- | --- | --- |
| # | Mol Composition | NaOH | Al(OH)$_3$ | Water | pH | Appearance |
| | | | Dhb | | | |
| C53 | Na$_1$(Dhb)$_1$ | 0.83 | — | 3.21 | 16.0 | 7.9 Brown Solution |
| C54 | Na$_2$Al$_1$(Dhb)$_2$ | 0.69 | 0.82 | 2.67 | 15.8 | 8.6 Brown Solution |
| | | | Caf | | | |
| C55 | Na$_1$(Caf)$_1$ | 0.73 | — | 3.34 | 15.9 | 12.2 Brown Solution |
| C56 | Na$_3$Al$_1$(Caf)$_2$ | 0.87 | 0.69 | 2.63 | 15.8 | 7.2 Brown Suspension |
| C57 | Na$_5$Al$_1$(Caf)$_3$ | 0.99 | 0.47 | 2.70 | 15.8 | 9.3 Brown Suspension |
| | | | Chl | | | |
| C58 | Na$_1$(Chl)$_1$ | 0.41 | — | 3.78 | 15.8 | 11.9 Yellow Solution |
| C59 | Na$_3$Al$_1$(Chl)$_2$ | 0.53 | 0.42 | 3.29 | 15.8 | 7.3 Yellow Suspension |
| C60 | Na$_5$Al$_1$(Chl)$_3$ | 0.60 | 0.29 | 3.34 | 15.8 | 9.0 Yellow Suspension |

Notes:
Reaction conditions are detailed in Examples 15 and 16;
NaOH is sodium hydroxide;
Al(OH)$_3$ is aluminum(III) hydroxide;
Dhb is 2,3-dihydroxybenzoic acid;
Caf is caffeic acid;
Chl is chlorogenic acid;
W is water.

TABLE 25

1:1:3 (w/w) OPC-Fly Ash F-Sand Mortars made with Admixtures C53-C60

| | W/C | [Admixture] (% w/w) | | Set Time | Hardness (MPa) | Compressive Strength (MPa) | |
| --- | --- | --- | --- | --- | --- | --- | --- |
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C53 | 0.41 | 6.0 | 2.46 | 155 | 62 | 9.6 | 22.5 |
| C54 | 0.41 | 6.0 | 2.46 | 90 | 123 | 17.9 | 36.2 |
| C55 | 0.41 | 6.0 | 2.46 | 210 | 62 | 9.8 | 22.7 |
| C56 | 0.41 | 6.0 | 2.46 | 150 | 152 | 18.4 | 38.5 |
| C57 | 0.41 | 6.0 | 2.46 | 125 | 157 | 18.7 | 39.4 |
| C58 | 0.41 | 6.0 | 2.46 | 190 | 57 | 9.6 | 22.1 |

TABLE 25-continued

1:1:3 (w/w) OPC-Fly Ash F-Sand Mortars made with Admixtures C53-C60

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| C59 | 0.41 | 6.0 | 2.46 | 165 | 144 | 17.8 | 34.9 |
| C60 | 0.41 | 6.0 | 2.46 | 140 | 153 | 18.8 | 39.2 |

Notes:
W/C is the water-to-cement ratio;
Hardness is the Vickers indentation hardness;
SNC is SikaSet NC;
SHE is SikaSet HE;
P20 is Pozzutec 20+.

TABLE 26

2:3 (w/w) Fly Ash C-Sand Mortars made with Admixtures C53-C60

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C53 | 0.22 | 6.0 | 1.32 | 22 | 127 | 18.3 | 39.4 |
| C54 | 0.22 | 6.0 | 1.32 | 18 | 155 | 22.9 | 46.0 |
| C55 | 0.22 | 6.0 | 1.32 | 46 | 118 | 18.0 | 35.6 |
| C56 | 0.22 | 6.0 | 1.32 | 33 | 151 | 23.9 | 46.1 |
| C57 | 0.22 | 6.0 | 1.32 | 31 | 153 | 24.3 | 48.7 |
| C58 | 0.22 | 6.0 | 1.32 | 65 | 109 | 16.3 | 35.6 |
| C59 | 0.22 | 6.0 | 1.32 | 47 | 147 | 21.7 | 44.5 |
| C60 | 0.22 | 6.0 | 1.32 | 32 | 138 | 20.8 | 42.0 |

Notes:
W/C is the water-to-cement ratio;
Hardness is the Vickers indentation hardness;
SNC is SikaSet NC;
SHE is SikaSet HE;
P20 is Pozzutec 20+.

Admixtures C61-C65 were prepared as 40% w/w aqueous solutions, based upon the sodium malatoaluminate(III) complex, $Na_1Al_1(Mal)_1$ (Admixture C23), but were prepared using aluminum compounds other than aluminum(III) hydroxide as precursors. Thus, aluminum(III) oxide, sodium aluminate(III), aluminum(III) chloride hexahydrate, dialuminum(III) chloride pentahydroxide, and aluminum(III) sulfate hexadecahydrate were used to prepare admixtures C61-C65 respectively. The formulation and preparation of the admixtures is detailed in Table 27, with representative examples (admixtures C61-C63) provided below as Examples 17-19. The testing of the admixtures for OPC-fly ash F-sand and fly ash C-sand mortars is detailed in Tables 28 and 29 respectively.

Mortars prepared with admixtures C61 and C62 behaved similarly to those prepared with admixture 23, while those prepared with admixtures C63-C65 were somewhat inferior in terms of hardness and compressive strength development. The latter result may be due to the presence of sodium chloride and sodium sulfate salts in admixtures C63-C65.

The results show that hydroxycarboxylatoaluminate(III) complexes prepared from a variety of aluminum-containing precursors are useful as admixtures for hydraulic cement compositions, and that they improve setting, hardness and compressive strength.

Example 17

Admixture C61. Sodium Malatoaluminate(III): $Na_1Al_1(Mal)_1$

Sodium hydroxide (1.44 g) was dissolved with stirring (340 rpm) in water (6.9 g) maintained at 293 K. The temperature was then raised to 363 K, aluminum(III) oxide (1.83 g) added, stirring continued at 363 K for 70 h, and the temperature decreased to 343 K. Malic acid (4.81 g) dissolved in water (5.0 g) was then added over 5 minutes, and stirring continued at 343 K for 70 h. A cloudy solution was obtained, and this was diluted to 6% w/w solids for testing.

Example 18

Admixture C62. Sodium Malatoaluminate(III): $Na_1Al_1(Mal)_1$

Sodium aluminate(III) (3.38 g) was dissolved with stirring (340 rpm) in water (6.9 g) maintained at 293 K, the temperature raised to 343 K, and stirring continued for 15 minutes. Malic acid (4.73 g) dissolved in water (5.0 g) was then added over 5 minutes, and stirring continued at 343 K for 70 hours. A cloudy solution was obtained, and this was diluted to 6% w/w solids for testing.

Example 19

Admixture C63. Sodium Malatoaluminate(III): $Na_1Al_1(Mal)_1$

Sodium hydroxide (3.03 g) was dissolved with stirring (340 rpm) in water (5.8 g) maintained at 293 K, malic acid (2.54 g) added over 2 minutes, and stirring continued at 293 K for 15 minutes, Aluminum(III) chloride hexahydrate (4.63 g) dissolved in water (4.0 g) hydroxide (0.82 g) was then added, the temperature raised to 343 K, and stirring continued for 70 hours. A cloudy solution was obtained, and this was diluted to 6% w/w solids for testing.

Admixtures C64 and C65 were similarly prepared using the method of Example 19, and employing dialuminum(III) chloride pentahydroxide or aluminum(III) sulfate hexadecahydrate instead of aluminum(III) chloride hexahydrate.

TABLE 27

Preparation and Properties of Admixtures C61-C65

| Admixture | | Reactants (Mass in g) | | | | Reaction Product | |
|---|---|---|---|---|---|---|---|
| # | Mol Composition | NaOH | $Al_2O_3$ | Mal | Water | pH | Appearance |
| 61 | $Na_1Al_1(Mal)_1$ | 1.44 | 1.83 | 4.81 | 11.9 | 7.4 | Cloudy Solution |

TABLE 27-continued

Preparation and Properties of Admixtures C61-C65

| Admixture | | Reactants (Mass in g) | | | | Reaction Product | |
|---|---|---|---|---|---|---|---|
| # | Mol Composition | NaOH | $Na_{15}Al_{11}O_{24}$ | Mal | Water | pH | Appearance |
| C62 | $Na_{27}Al_{22}(Mal)_{20}$ | — | 3.38 | 4.73 | 11.9 | 8.5 | Cloudy Solution |
| | | | $AlCl_3 \cdot 6W$ | | | | |
| C63 | $Na_1Al_1(Mal)_1$ | 3.03 | 4.63 | 2.54 | 9.8 | 7.4 | Cloudy Solution |
| | | | $Al_2Cl(OH)_5$ | | | | |
| C64 | $Na_1Al_1(Mal)_1$ | 2.15 | 4.88 | 3.60 | 9.4 | 7.8 | Cloudy Solution |
| | | | $Al_2(SO_4)_3 \cdot 16W$ | | | | |
| C65 | $Na_1Al_1(Mal)_1$ | 2.78 | 5.74 | 2.33 | 9.2 | 7.5 | Cloudy Solution |

Notes:
Reaction conditions are detailed in Examples 17-19;
NaOH is sodium hydroxide;
$Al_2O_3$ is aluminum(III) oxide;
$Na_{15}Al_{11}O_{24}$ is sodium aluminate(III);
$AlCl_3 \cdot 6W$ is aluminum(III) chloride hexahydrate;
$Al_2Cl(OH)_5$ is dialuminum(III) chloride pentahydroxide;
$Al_2(SO_4)_3 \cdot 16W$ is aluminum(III) sulfate hexadecahydrate;
Mal is malic acid;
W is water.

TABLE 28

1:1:3 (w/w) OPC-Fly Ash F-Sand Mortars made with Admixtures C61-C65

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C61 | 0.41 | 6.0 | 2.46 | 140 | 158 | 22.9 | 50.9 |
| C62 | 0.41 | 6.0 | 2.46 | 130 | 145 | 21.4 | 49.2 |
| C63 | 0.41 | 6.0 | 2.46 | 85 | 137 | 18.8 | 43.6 |
| C64 | 0.41 | 6.0 | 2.46 | 100 | 147 | 22.0 | 46.3 |
| C65 | 0.41 | 6.0 | 2.46 | 75 | 144 | 20.7 | 45.2 |

Notes:
W/C is the water-to-cement ratio;
Hardness is the Vickers indentation hardness;
SNC is SikaSet NC;
SHE is SikaSet HE;
P20 is Pozzutec 20+.

TABLE 29

2:3 (w/w) Fly Ash C-Sand Mortars made with Admixtures C61-C65

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C61 | 6.0 | 1.32 | 32 | 183 | 27.2 | 61.4 | 6.0 |
| C62 | 6.0 | 1.32 | 27 | 170 | 25.7 | 58.2 | 6.0 |
| C63 | 6.0 | 1.32 | 24 | 165 | 22.8 | 51.5 | 6.0 |
| C64 | 6.0 | 1.32 | 28 | 173 | 24.1 | 53.6 | 6.0 |
| C65 | 6.0 | 1.32 | 21 | 156 | 22.0 | 52.2 | 6.0 |

Notes:
W/C is the water-to-cement ratio;
Hardness is the Vickers indentation hardness;
SNC is SikaSet NC;
SHE is SikaSet HE;
P20 is Pozzutec 20+.

Admixtures C66-C78 were prepared as 40% w/w aqueous solutions or suspensions, using lithium instead of sodium, and the α-hydroxycarboxylic acids, glycolic acid, lactic acid, malic acid and citric acid as ligands. Admixture C66 is lithium glycolate ($Li_1(Gly)_1$), and admixtures C67 and C68 are lithium glycolatoaluminate(III) complexes ($Li_xAl_x(Gly)_y$, where x is 1 or 2, and y is 2 or 3). Admixture C69 is lithium lactate ($Li_1(Lac)_1$), and admixtures C70 and C71 are lithium lactatoaluminate(III) complexes ($Li_1Al_1(Lac)_x$, where x is 1 or 2). Admixture C72 is lithium malate ($Li_2(Mal)_1$), and admixtures C73-C75 are lithium malatoaluminate(III) complexes ($Li_xAl_y(Mal)_i$, where x is 1-3, and y is 1 or 2). Admixture C76 is lithium citrate ($Li_3(Cit)_1$), and admixtures C77 and C78 are lithium citratoaluminate(III) complexes ($Li_xAl_1(Cit)_y$, where x is 2 or 5, and y is 1 or 2). The formulation and preparation of the admixtures is detailed in Table 30, with representative examples (admixtures C66 and C67) provided below as Examples 20 and 21.

The testing of the admixtures for OPC-fly ash F-sand and fly ash C-sand mortars is detailed in Tables 31 and 32 respectively.

Admixtures C66-C78 behaved in a broadly similar manner to the corresponding sodium-containing admixtures (detailed in Tables 9-20), although they showed slower hardness and compressive strength development. Mortars prepared with the admixtures achieved substantially greater hardness and compressive strength than those prepared with water, lithium α-hydroxycarboxylate, or the commercial SikaSet or Pozzutec admixtures.

These results show that lithium α-hydroxycarboxylatoaluminate(III) complexes are useful as admixtures for hydraulic cement compositions, and that they improve setting, hardness and compressive strength.

Example 20

Admixture C66. Lithium Glycolate: $Li_1(Gly)_1$

Lithium hydroxide (1.94 g) was dissolved with stirring (340 rpm) in water (9.3 g) maintained at 293 K, glycolic acid (8.78 g) added over 1 minute, and stirring continued at 293 K for 22 hours. A clear solution was obtained, and this was diluted to 6% w/w solids for testing.

Admixtures C69, C72 and C76 were similarly prepared using the method of Example 20, and employing lactic acid, malic acid or citric acid instead of glycolic acid.

Example 21

Admixture C67. Lithium Glycolatoaluminate(III): $Li_1Al_1(Gly)_1$

Lithium hydroxide (1.09 g) was dissolved with stirring (340 rpm) in water (9.7 g) maintained at 293 K, glycolic acid (4.93 g) added over 2 minutes, and stirring continued for 15 minutes. Aluminum(III) hydroxide (4.32 g) was then added, the temperature raised to 343 K, and stirring continued for 70 hours. A white suspension was obtained, and this was diluted to 6% w/w solids for testing.

Admixtures C68, and C70, C71, C73-C75, C77 and C78 were similarly prepared using the method of Example 21, the latter admixtures employing lactic acid, malic acid or citric acid instead of glycolic acid.

TABLE 30

Preparation and Properties of Admixtures C66-C78

| Admixture | | Reactants (Mass in g) | | | Reaction Product | |
|---|---|---|---|---|---|---|
| # | Mol Composition | LiOH | $Al(OH)_3$ | Water | pH | Appearance |
| | | | Gly | | | |
| C66 | $Li_1(Gly)_1$ | 1.94 | — | 8.78 | 9.3 | 11.4 Clear Solution |
| C67 | $Li_1Al_1(Gly)_1$ | 1.09 | 4.32 | 4.93 | 9.7 | 8.2 White Suspension |
| C68 | $Li_2Al_2(Gly)_3$ | 0.90 | 3.56 | 6.10 | 9.5 | 8.0 White Suspension |
| | | | Lac | | | |
| C69 | $Li_1(Lac)_1$ | 1.70 | — | 7.09 | 11.2 | 12.1 Clear Solution |
| C70 | $Li_1Al_1(Lac)_1$ | 1.01 | 4.00 | 4.21 | 10.8 | 9.1 White Suspension |
| C71 | $Li_1Al_1(Lac)_2$ | 0.69 | 2.72 | 5.73 | 10.9 | 8.4 Cloudy Solution |
| | | | Mal | | | |
| C72 | $Li_2(Mal)_1$ | 2.13 | — | 5.95 | 11.9 | 12.4 Clear Solution |
| C73 | $Li_1Al_1(Mal)_1$ | 0.82 | 3.26 | 4.59 | 11.3 | 7.4 White Suspension |
| C74 | $Li_2Al_1(Mal)_1$ | 1.49 | 2.96 | 4.17 | 11.4 | 10.6 White Suspension |
| C75 | $Li_3Al_2(Mal)_1$ | 1.61 | 4.25 | 2.99 | 11.2 | 7.4 White Suspension |
| | | | Cit | | | |
| C76 | $Li_3(Cit)_1$ | 2.20 | — | 5.88 | 11.9 | 6.1 Clear Solution |
| C77 | $Li_2Al_1(Cit)_1$ | 1.22 | 2.42 | 4.88 | 11.5 | 7.2 Cloudy Gel |
| C78 | $Li_5Al_1(Cit)_2$ | 1.67 | 1.32 | 5.33 | 11.7 | 7.8 Cloudy Gel |

Notes:
Reaction conditions are detailed in Examples 20 and 21;
LiOH is lithium hydroxide;
$Al(OH)_3$ is aluminum(III) hydroxide;
Gly is glycolic acid;
Lac is lactic acid;
Mal is malic acid;
Cit is citric acid;
W is water.

TABLE 31

1:1:3 (w/w) OPC-Fly Ash F-Sand Mortars made with Admixtures C66-C78

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C66 | 0.41 | 6.0 | 2.46 | 220 | 51 | 8.8 | 20.7 |
| C67 | 0.41 | 6.0 | 2.46 | 125 | 85 | 13.7 | 34.8 |
| C68 | 0.41 | 6.0 | 2.46 | 140 | 81 | 12.8 | 31.5 |
| C69 | 0.41 | 6.0 | 2.46 | 235 | 56 | 9.3 | 18.5 |
| C70 | 0.41 | 6.0 | 2.46 | 110 | 112 | 16.4 | 36.9 |
| C71 | 0.41 | 6.0 | 2.46 | 85 | 123 | 18.1 | 40.3 |

TABLE 31-continued

1:1:3 (w/w) OPC-Fly Ash F-Sand Mortars made with Admixtures C66-C78

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| C72 | 0.41 | 6.0 | 2.46 | 230 | 53 | 9.9 | 20.3 |
| C73 | 0.41 | 6.0 | 2.46 | 90 | 116 | 17.2 | 39.1 |
| C74 | 0.41 | 6.0 | 2.46 | 95 | 124 | 19.5 | 43.8 |
| C75 | 0.41 | 6.0 | 2.46 | 110 | 108 | 18.0 | 38.3 |
| C76 | 0.41 | 6.0 | 0.80 | 190 | 49 | 8.1 | 18.4 |
| C77 | 0.41 | 6.0 | 0.80 | 95 | 119 | 19.8 | 37.8 |
| C78 | 0.41 | 6.0 | 0.80 | 115 | 107 | 17.2 | 34.4 |

Notes:
W/C is the water-to-cement ratio;
Hardness is the Vickers indentation hardness;
SNC is SikaSet NC;
SHE is SikaSet HE;
P20 is Pozzutec 20+.

TABLE 32

2:3 (w/w) Fly Ash C-Sand Mortars made with Admixtures C66-C78

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C66 | 0.22 | 6.0 | 1.32 | 25 | 128 | 16.8 | 33.8 |
| C67 | 0.22 | 6.0 | 1.32 | 25 | 157 | 23.2 | 57.3 |
| C68 | 0.22 | 6.0 | 1.32 | 23 | 173 | 23.5 | 55.3 |
| C69 | 0.22 | 6.0 | 1.32 | 15 | 130 | 18.3 | 42.3 |
| C70 | 0.22 | 6.0 | 1.32 | 24 | 176 | 25.2 | 55.1 |
| C71 | 0.22 | 6.0 | 1.32 | 26 | 192 | 26.7 | 58.1 |
| C72 | 0.22 | 6.0 | 1.32 | 14 | 120 | 17.5 | 36.6 |
| C73 | 0.22 | 6.0 | 1.32 | 22 | 188 | 25.9 | 53.9 |
| C74 | 0.22 | 6.0 | 1.32 | 18 | 172 | 24.2 | 47.7 |
| C75 | 0.22 | 6.0 | 1.32 | 18 | 149 | 22.9 | 43.5 |
| C76 | 0.22 | 6.0 | 0.80 | 15 | 124 | 17.6 | 38.9 |
| C77 | 0.22 | 6.0 | 0.80 | 31 | 153 | 22.0 | 49.2 |
| C78 | 0.22 | 6.0 | 0.80 | 28 | 173 | 22.8 | 53.4 |

Notes:
W/C is the water-to-cement ratio;
Hardness is the Vickers indentation hardness;
SNC is SikaSet NC;
SHE is SikaSet HE;
P20 is Pozzutec 20+.

Admixtures C79-C91 were prepared as 40% w/w aqueous solutions or suspensions, using potassium instead of sodium, and the α-hydroxycarboxylic acids, glycolic acid, lactic acid, malic acid and citric acid as ligands. Admixture C79 is potassium glycolate ($K_1(Gly)_1$), and admixtures C80 and C81 are potassium glycolatoaluminate(III) complexes ($K_xAl_x(Gly)_y$, where x is 1 or 2, and y is 2 or 3). Admixture C82 is potassium lactate ($K_1(Lac)_1$), and admixtures C83 and C84 are potassium lactatoaluminate(III) complexes ($K_1Al_1(Lac)_x$, where x is 1 or 2). Admixture C85 is potassium malate ($K_2(Mal)_1$), and admixtures C86-C88 are potassium malatoaluminate(III) complexes ($K_xAl_y(Mal)_i$, where x is 1-3, and y is 1 or 2). Admixture C89 is potassium citrate ($K_3(Cit)_1$), and admixtures C90 and C91 are potassium citratoaluminate(III) complexes ($K_xAl_1(Cit)_y$, where x is 2 or 5, and y is 1 or 2). The formulation and preparation of the admixtures is detailed in Table 33, with representative examples (admixtures C79 and C80) provided below as Examples 22 and 23. The testing of the admixtures for OPC-fly ash F-sand and fly ash C-sand mortars is detailed in Tables 34 and 35 respectively.

Admixtures C79-C91 behaved in a broadly similar manner to the corresponding sodium- and lithium-containing admixtures (detailed in Tables 9-20, and Tables 30-32 respectively), although they showed slower hardness and compressive strength development. Mortars prepared with the admixtures achieved substantially greater hardness and compressive strength than those prepared with water, potassium α-hydroxycarboxylate, or the commercial SikaSet or Pozzutec admixtures.

These results show that potassium α-hydroxycarboxylatoaluminate(III) complexes are useful as admixtures for hydraulic cement compositions, and that they improve setting, hardness and compressive strength.

Example 22

Admixture C79. Potassium Glycolate: $K_1(Gly)_1$

Potassium hydroxide (3.43 g) was dissolved with stirring (340 rpm) in water (9.9 g) maintained at 293 K, glycolic acid (6.65 g) added over 1 minute, and stirring continued at 293 K for 22 hours. A clear solution was obtained, and this was diluted to 6% w/w solids for testing.

Admixtures C82, C85 and C89 were similarly prepared using the method of Example 22, and employing lactic acid, malic acid or citric acid instead of glycolic acid.

Example 23

Admixture C80. Potassium Glycolatoaluminate(III): $K_1Al_1(Gly)_1$

Potassium hydroxide (2.15 g) was dissolved with stirring (340 rpm) in water (10.0 g) maintained at 293 K, glycolic acid (4.18 g) added over 2 minutes, and stirring continued for 15 minutes. Aluminum(III) hydroxide (3.66 g) was then added, the temperature raised to 343 K, and stirring continued for 70 hours. A white suspension was obtained, and this was diluted to 6% w/w solids for testing.

Admixtures C81, and C83, C84, C86-C88, C90 and C91 were similarly prepared using the method of Example 23, the latter admixtures employing lactic acid, malic acid or citric acid instead of glycolic acid.

TABLE 33

Preparation and Properties of Admixtures C79-C91

| Admixture # | Mol Composition | Reactants (Mass in g) KOH | Reactants (Mass in g) Al(OH)$_3$ | Reactants (Mass in g) Gly | Reactants (Mass in g) Water | Reaction Product pH | Reaction Product Appearance |
|---|---|---|---|---|---|---|---|
| C79 | $K_1(Gly)_1$ | 3.43 | — | 6.65 | 9.9 | 11.9 | Clear Solution |
| C80 | $K_1Al_1(Gly)_1$ | 2.15 | 3.66 | 4.18 | 10.0 | 8.6 | White Suspension |
| C81 | $K_2Al_2(Gly)_3$ | 1.82 | 3.10 | 5.31 | 9.8 | 8.4 | White Suspension |

TABLE 33-continued

Preparation and Properties of Admixtures C79-C91

| Admixture | | Reactants (Mass in g) | | | Reaction Product | |
|---|---|---|---|---|---|---|
| # | Mol Composition | KOH | Al(OH)$_3$ | Water | pH | Appearance |
| | | | Lac | | | |
| C82 | K$_1$(Lac)$_1$ | 3.10 | — | 5.54 | 11.4 | 12.7 Clear Solution |
| C83 | K$_1$Al$_1$(Lac)$_1$ | 2.02 | 3.43 | 3.61 | 10.9 | 9.4 White Suspension |
| C84 | K$_1$Al$_1$(Lac)$_2$ | 1.44 | 2.45 | 5.15 | 11.0 | 8.9 Cloudy Solution |
| | | | Mal | | | |
| C85 | K$_2$(Mal)$_1$ | 3.68 | — | 4.40 | 11.9 | 12.7 Clear Solution |
| C86 | K$_1$Al$_1$(Mal)$_1$ | 1.69 | 2.87 | 4.04 | 11.4 | 7.6 White Suspension |
| C87 | K$_2$Al$_1$(Mal)$_1$ | 2.79 | 2.37 | 3.34 | 11.5 | 11.2 Clear Solution |
| C88 | K$_3$Al$_2$(Mal)$_1$ | 2.96 | 3.36 | 2.37 | 11.3 | 8.9 White Suspension |
| | | | Cit | | | |
| C89 | K$_3$(Cit)$_1$ | 3.77 | — | 4.31 | 11.9 | 9.9 Clear Solution |
| C90 | K$_2$Al$_1$(Cit)$_1$ | 2.37 | 2.01 | 4.06 | 11.6 | 8.8 Clear Solution |
| C91 | K$_5$Al$_1$(Cit)$_2$ | 3.05 | 1.04 | 4.18 | 11.7 | 9.7 Clear Solution |

Notes:
Reaction conditions are detailed in Examples 22 and 23;
KOH is potassium hydroxide;
Al(OH)$_3$ is aluminum(III) hydroxide;
Gly is glycolic acid;
Lac is lactic acid;
Mal is malic acid;
Cit is citric acid;
W is water.

TABLE 34

1:1:3 (w/w) OPC-Fly Ash F-Sand Mortars made with Admixtures C79-C91

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C79 | 0.41 | 6.0 | 2.46 | 180 | 59 | 8.4 | 18.1 |
| C80 | 0.41 | 6.0 | 2.46 | 95 | 112 | 16.3 | 35.4 |
| C81 | 0.41 | 6.0 | 2.46 | 90 | 108 | 16.9 | 38.7 |
| C82 | 0.41 | 6.0 | 2.46 | 205 | 60 | 9.0 | 21.4 |
| C83 | 0.41 | 6.0 | 2.46 | 85 | 108 | 15.7 | 35.1 |
| C84 | 0.41 | 6.0 | 2.46 | 80 | 117 | 17.2 | 40.6 |
| C85 | 0.41 | 6.0 | 2.46 | 190 | 58 | 8.8 | 20.1 |
| C86 | 0.41 | 6.0 | 2.46 | 75 | 131 | 18.1 | 42.5 |
| C87 | 0.41 | 6.0 | 2.46 | 75 | 122 | 17.3 | 41.0 |
| C88 | 0.41 | 6.0 | 2.46 | 65 | 118 | 17.0 | 35.3 |
| C89 | 0.41 | 6.0 | 0.80 | 210 | 55 | 8.1 | 17.3 |
| C90 | 0.41 | 6.0 | 0.80 | 125 | 115 | 17.7 | 37.3 |
| C91 | 0.41 | 6.0 | 0.80 | 110 | 108 | 16.3 | 35.8 |

Notes:
W/C is the water-to-cement ratio;
Hardness is the Vickers indentation hardness;
SNC is SikaSet NC;
SHE is SikaSet HE;
P20 is Pozzutec 20+.

TABLE 35

2:3 (w/w) Fly Ash C-Sand Mortars made with Admixtures C79-C91

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C79 | 0.22 | 6.0 | 1.32 | 18 | 125 | 16.4 | 34.2 |
| C80 | 0.22 | 6.0 | 1.32 | 32 | 176 | 25.8 | 58.4 |
| C81 | 0.22 | 6.0 | 1.32 | 27 | 159 | 22.5 | 53.4 |
| C82 | 0.22 | 6.0 | 1.32 | 22 | 135 | 18.7 | 40.8 |
| C83 | 0.22 | 6.0 | 1.32 | 27 | 170 | 25.1 | 54.0 |
| C84 | 0.22 | 6.0 | 1.32 | 25 | 185 | 26.5 | 57.2 |
| C85 | 0.22 | 6.0 | 1.32 | 21 | 128 | 18.9 | 41.7 |
| C86 | 0.22 | 6.0 | 1.32 | 34 | 185 | 27.3 | 54.7 |
| C87 | 0.22 | 6.0 | 1.32 | 26 | 161 | 23.6 | 51.1 |
| C88 | 0.22 | 6.0 | 1.32 | 36 | 160 | 22.9 | 50.6 |
| C89 | 0.22 | 6.0 | 0.80 | 24 | 121 | 16.0 | 33.4 |
| C90 | 0.22 | 6.0 | 0.80 | 43 | 154 | 21.4 | 47.0 |
| C91 | 0.22 | 6.0 | 0.80 | 51 | 165 | 23.7 | 50.2 |

Notes:
W/C is the water-to-cement ratio;
Hardness is the Vickers indentation hardness;
SNC is SikaSet NC;
SHE is SikaSet HE;
P20 is Pozzutec 20+.

Admixtures C92-C99 were prepared as 20% w/w aqueous solutions or suspensions, using magnesium or calcium instead of sodium, and the α-hydroxycarboxylic acid, citric acid as the ligand. Admixture C92 is magnesium citrate (Mg$_3$(Cit)$_2$), and admixtures C93-C95 are magnesium citratoaluminate(III) complexes (Mg$_x$Al$_y$(Cit)$_y$, where x is 1, 2 or 3, and y is 1 or 2). Admixture C96 is calcium citrate (Ca$_3$(Cit)$_2$), and admixtures C97-C99 are calcium citratoaluminate(III) complexes (Ca$_x$Al$_y$(Cit)$_y$, where x is 1, 2 or 3, and y is 1 or 2). The formulation and preparation of the admixtures is detailed in Table 36, with representative examples (admixtures C92 and C93) provided below as Examples 24 and 25. The testing of the admixtures for OPC-fly ash F-sand and fly ash C-sand mortars is detailed in Tables 37 and 38 respectively.

Admixtures C92-C99 behaved in a somewhat similar manner to the corresponding sodium-, lithium- and potassium-containing admixtures (detailed in Tables 9-20, and Tables 30-35 respectively), although they showed increased set times and slower hardness and compressive strength development. However, mortars prepared with the admixtures C93-C95, and C97-C99, achieved substantially greater hardness and compressive strength than those prepared with water, calcium or magnesium citrates, or the commercial SikaSet or Pozzutec admixtures.

These results show that magnesium and calcium α-hydroxycarboxylatoaluminate(III) complexes are useful as admixtures for hydraulic cement compositions, and that they improve setting, hardness and compressive strength.

Example 24

Admixture C92. Magnesium Citrate: $Mg_3(Cit)_2$

Potassium hydroxide (3.43 g) was dissolved with stirring (340 rpm) in water (9.9 g) maintained at 293 K, glycolic acid (6.65 g) added over 1 minute, and stirring continued at 293 K for 22 hours. A clear solution was obtained, and this was diluted to 6% w/w solids for testing.

Admixture C95 was similarly prepared using the method of Example 24, and employing calcium hydroxide instead of magnesium hydroxide.

Example 25

Admixture C93. Magnesium Citratoaluminate(III): $Mg_1Al_2(Cit)_2$

Potassium hydroxide (2.15 g) was dissolved with stirring (340 rpm) in water (10.0 g) maintained at 293 K, glycolic acid (4.18 g) added over 2 minutes, and stirring continued for 15 minutes. Aluminum(III) hydroxide (3.66 g) was then added, the temperature raised to 343 K, and stirring continued for 70 hours. A white suspension was obtained, and this was diluted to 6% w/w solids for testing.

Admixtures C94, C95, and C97-C99 were similarly prepared using the method of Example 25, the latter admixtures employing calcium hydroxide instead of magnesium hydroxide.

TABLE 36

Preparation and Properties of Admixtures C92-C99

| Admixture # | Mol Composition | Reactants (Mass in grams) | | | | Reaction Products | |
|---|---|---|---|---|---|---|---|
| | | $Mg(OH)_2$ | $Al(OH)_3$ | Cit | Water | pH | Appearance |
| C92 | $Mg_3(Cit)_2$ | 1.26 | — | 2.78 | 16.0 | 6.1 | White Suspension |
| C93 | $Mg_1Al_2(Cit)_2$ | 0.39 | 1.28 | 2.59 | 15.7 | 3.6 | Clear Solution |
| C94 | $Mg_2Al_1(Cit)_1$ | 1.22 | 0.99 | 2.01 | 15.8 | 6.9 | Clear Solution |
| C95 | $Mg_3Al_2(Cit)_2$ | 0.99 | 1.07 | 2.17 | 15.8 | 8.1 | Clear Solution |
| | | $Ca(OH)_2$ | | | | | |
| C96 | $Ca_3(Cit)_2$ | 1.51 | — | 2.56 | 15.9 | 9.6 | White Suspension |
| C97 | $Ca_1Al_2(Cit)_2$ | 0.50 | 1.25 | 2.53 | 15.7 | 4.2 | White Suspension |
| C98 | $Ca_2Al_1(Cit)_1$ | 1.46 | 0.92 | 1.86 | 15.8 | 6.3 | White Suspension |
| C99 | $Ca_3Al_2(Cit)_2$ | 1.20 | 1.01 | 2.04 | 15.8 | 7.3 | White Suspension |

Notes:
Reaction conditions are detailed in Examples 24 and 25;
KOH is potassium hydroxide;
$Al(OH)_3$ is aluminum(III) hydroxide;
$Mg(OH)_2$ is magnesium hydroxide;
$Ca(OH)_2$ is calcium hydroxide;
Cit is citric acid;
W is water.

TABLE 37

1:1:3 (w/w) OPC-Fly Ash F-Sand Mortars made with Admixtures C92-C99

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C92 | 0.41 | 6.0 | 2.46 | 290 | 51 | 9.3 | 22.7 |
| C93 | 0.41 | 6.0 | 2.46 | 245 | 78 | 11.4 | 26.1 |
| C94 | 0.41 | 6.0 | 2.46 | 215 | 92 | 13.0 | 28.5 |
| C95 | 0.41 | 6.0 | 2.46 | 170 | 101 | 15.2 | 32.3 |
| C96 | 0.41 | 6.0 | 2.46 | 260 | 53 | 9.1 | 24.9 |
| C97 | 0.41 | 6.0 | 2.46 | 220 | 96 | 13.8 | 29.7 |
| C98 | 0.41 | 6.0 | 2.46 | 195 | 112 | 17.5 | 36.8 |
| C99 | 0.41 | 6.0 | 2.46 | 170 | 103 | 16.7 | 38.9 |

Notes:
W/C is the water-to-cement ratio;
Hardness is the Vickers indentation hardness;
SNC is SikaSet NC;
SHE is SikaSet HE;
P20 is Pozzutec 20+.

TABLE 38

2:3 (w/w) Fly Ash C-Sand Mortars made with Admixtures C92-C99

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C92 | 0.22 | 6.0 | 1.32 | 165 | 42 | 7.8 | 18.2 |
| C93 | 0.22 | 6.0 | 1.32 | 110 | 88 | 12.3 | 26.7 |
| C94 | 0.22 | 6.0 | 1.32 | 80 | 109 | 14.6 | 31.4 |
| C95 | 0.22 | 6.0 | 1.32 | 70 | 131 | 17.8 | 36.2 |
| C96 | 0.22 | 6.0 | 1.32 | 150 | 47 | 8.0 | 17.3 |
| C97 | 0.22 | 6.0 | 1.32 | 120 | 135 | 17.4 | 37.0 |
| C98 | 0.22 | 6.0 | 1.32 | 75 | 171 | 23.5 | 47.4 |
| C99 | 0.22 | 6.0 | 1.32 | 65 | 146 | 19.2 | 42.9 |

Notes:
W/C is the water-to-cement ratio;
Hardness is the Vickers indentation hardness;
SNC is SikaSet NC;
SHE is SikaSet HE;
P20 is Pozzutec 20+.

Admixtures C100-C106 were prepared as 40% w/w aqueous solutions, using acetic acid together with an α-hydroxycarboxylic acid, selected from malic acid or citric acid, or a combination of α-hydroxycarboxylic acids, selected from malic acid, citric acid and tartaric acid, as ligands. Admixture C100 is a sodium acetatomalatoaluminate(III) complex $(Na_2Al_1(Ac)_1(Mal)_1)$, and admixture C101 is a sodium acetatocitratoaluminate(III) complex $(Na_3Al_1(Ac)_1(Cit)_1)$. Admixture C102 is a sodium malatotartaratoaluminate(III) complex $(Na_4Al_2(Tar)_1(Mal)_1)$, and admixture C103 is a sodium citratotartaratoaluminate(III) complex $(Na_5Al_2(Tar)_1(Cit)_1)$. Admixtures C104-C106 are sodium citratomalatoaluminate(III) complexes $(Na_xAl_2(Cit)_1(Mal)_y$, where x is 3, 4 or 5, and y is 1 or 2). The formulation and preparation of the admixtures is detailed in Table 39, with a representative example (admixture C100) provided below as Example 26. The testing of the admixtures for OPC-fly ash F-sand and fly ash C-sand mortars is detailed in Tables 40 and 41 respectively.

Admixtures C100-C106 behaved in a similar manner to the malatoaluminate(III) and citratoaluminate(III) admixtures (detailed in Tables 15-20), with the inclusion of a second α-hydroxycarboxylic acid ligand or a carboxylic acid ligand resulting in a useful variation in the set time, and hardness and compressive strength development. In all cases, mortars prepared with the admixtures achieved substantially greater hardness and compressive strength than those prepared with water, or the commercial SikaSet or Pozzutec admixtures.

These results show that sodium α-hydroxycarboxylatoaluminate(III) complexes with a mixture of carboxylic acid and α-hydroxycarboxylic acid ligands, or a mixture of α-hydroxycarboxylic acid ligands, are useful as admixtures for hydraulic cement compositions, and that they improve setting, hardness and compressive strength.

Example 26

Admixture C100. Sodium Acetatomalatoaluminate (III): $Na_2Al_1(Ac)_1(Mal)_1$ Sodium hydroxide (1.84 g) was dissolved with stirring (340 rpm) in water (11.5 g) maintained at 293 K, acetic acid (1.38 g) and malic acid (3.08 g) added over 1 minute, and stirring continued for 15 minutes. Aluminum(III) hydroxide (2.18 g) was then added, the temperature raised to 343 K, and stirring continued for 70 hours. A cloudy solution was obtained, and this was diluted to 6% w/w solids for testing.

Admixtures C101-C106 were similarly prepared using the method of Example 26, and using the appropriate acid ligands.

TABLE 39

Preparation and Properties of Admixtures C100-C106

| Admixture # | Mol Composition | Reactants (Mass in grams) NaOH | Al(OH)$_3$ | Mal | Ac | Water | Reaction Product pH | Reaction Product Appearance |
|---|---|---|---|---|---|---|---|---|
| C100 | $Na_2Al_1(Ac)_1(Mal)_1$ | 1.84 | 2.18 | 3.08 Cit | 1.38 Ac | 11.5 | 7.2 | Cloudy Solution |
| C101 | $Na_3Al_1(Ac)_1(Cit)_1$ | 2.15 | 1.71 | 3.29 Mal | 1.09 Tar | 11.8 | 7.8 | Cloudy Solution |
| C102 | $Na_4Al_2(Tar)_1(Mal)_1$ | 2.15 | 2.56 | 1.69 Cit | 2.02 Tar | 11.6 | 8.1 | Cloudy Solution |
| C103 | $Na_5Al_2(Tar)_1(Cit)_1$ | 2.31 | 2.20 | 2.10 Cit | 1.74 Mal | 11.6 | 8.6 | Cloudy Solution |
| C104 | $Na_3Al_2(Cit)_1(Mal)_1$ | 1.61 | 2.55 | 2.41 | 1.80 | 11.6 | 7.3 | Cloudy Solution |
| C105 | $Na_4Al_2(CitA)_1(MalA)_2$ | 1.67 | 1.98 | 1.90 | 2.79 | 11.7 | 7.6 | Cloudy Solution |
| C106 | $Na_5Al_2(Cit)_1(Mal)_2$ | 1.98 | 1.88 | 1.81 | 2.65 | 11.7 | 8.3 | Cloudy Solution |

Notes:
Reaction conditions are detailed in Example 26;
NaOH is sodium hydroxide;
Al(OH)$_3$ is aluminum(III) hydroxide;
Ac is acetic acid;
Cit is citric acid;
Mal is malic acid;
Tar is tartaric acid;
W is water.

TABLE 40

1:1:3 (w/w) OPC-Fly Ash F-Sand Mortars made with Admixtures C100-C106

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C100 | 0.41 | 6.0 | 2.46 | 120 | 132 | 18.3 | 44.7 |
| C101 | 0.41 | 6.0 | 2.46 | 135 | 120 | 17.6 | 42.9 |
| C102 | 0.41 | 6.0 | 2.46 | 85 | 126 | 18.2 | 43.6 |
| C103 | 0.41 | 6.0 | 2.46 | 70 | 117 | 17.8 | 40.2 |
| C104 | 0.41 | 6.0 | 2.46 | 105 | 135 | 19.4 | 45.6 |
| C105 | 0.41 | 6.0 | 2.46 | 90 | 142 | 21.0 | 48.7 |
| C106 | 0.41 | 6.0 | 2.46 | 85 | 131 | 18.0 | 43.0 |

Notes:
W/C is the water-to-cement ratio;
Hardness is the Vickers indentation hardness;
SNC is SikaSet NC;
SHE is SikaSet HE;
P20 is Pozzutec 20+.

TABLE 41

2:3 (w/w) Fly Ash C-Sand Mortars made with Admixtures C100-C106

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C100 | 0.22 | 6.0 | 1.32 | 31 | 171 | 25.2 | 52.8 |
| C101 | 0.22 | 6.0 | 1.32 | 36 | 166 | 24.0 | 50.6 |
| C102 | 0.22 | 6.0 | 1.32 | 27 | 163 | 23.3 | 48.7 |
| C103 | 0.22 | 6.0 | 1.32 | 22 | 152 | 21.9 | 45.3 |
| C104 | 0.22 | 6.0 | 1.32 | 28 | 186 | 27.9 | 57.6 |
| C105 | 0.22 | 6.0 | 1.32 | 27 | 190 | 28.3 | 59.1 |
| C106 | 0.22 | 6.0 | 1.32 | 24 | 174 | 26.1 | 55.2 |

Notes:
W/C is the water-to-cement ratio;
Hardness is the Vickers indentation hardness;
SNC is SikaSet NC;
SHE is SikaSet HE;
P20 is Pozzutec 20+.

Admixtures C107-C123 were prepared as 40% w/w aqueous solutions, using the α-hydroxycarboxylic acids, malic acid or citric acid as the primary ligand, and borate ($BO_3^{3-}$), which forms complexes with α-hydroxyacids and participates in mineralization reactions, as a secondary ligand. Admixture C107-C110 are sodium boratomalatoaluminate (III) complexes ($Na_xAl_y(BO_3)_4(Mal)_z$, where x is 3 or 4, y is 2, 4 or 6, and z is 2 or 3), and admixture C110-C123 are sodium boratocitratoaluminate(III) complexes ($Na_wAl_x(BO_3)_y(Cit)_z$, where w is 2, 3, 4, 5 or 7, x is 1, 2, 3, 4 or 6, y is 2 or 6, and z is 1 or 2). The formulation and preparation of the admixtures is detailed in Table 42, with a representative example (admixture C107) provided below as Example 27. The testing of the admixtures for OPC-fly ash F-sand and fly ash C-sand mortars is detailed in Tables 43 and 44 respectively.

Admixtures C107-C123 behaved in a similar manner to the malatoaluminate(III) and citratoaluminate(III) admixtures (detailed in Tables 15-20), with the inclusion of borate as a secondary ligand resulting in useful variations in the set time, and hardness and compressive strength development. In all cases, mortars prepared with the admixtures achieved substantially greater hardness and compressive strength than those prepared with water, or the commercial SikaSet or Pozzutec admixtures.

These results show that sodium boratomalatoaluminate (III) and sodium boratocitratoaluminate(III) complexes are useful as admixtures for hydraulic cement compositions, and that they improve setting, hardness and compressive strength.

Example 27

Admixture C107. Sodium Boratomalatoaluminate (III): $Na_3Al_2(BO_3)_4(Mal)_2$

Malic acid (2.74 g) was dissolved with stirring (340 rpm) in water (6.6 g) maintained at 293 K, boric acid (2.52 g) added over 1 minute, the temperature raised to 343 K, and stirring continued for 20 hours. The temperature was lowered to 293 K, a solution of sodium hydroxide (1.23 g) in water (5.0 g) added, and stirring continued for 15 minutes. Aluminum(III) hydroxide (1.94 g) was then added, the temperature raised to 343 K, and stirring continued for 50 hours. A cloudy solution was obtained, and this was diluted to 6% w/w solids for testing.

Admixtures C108-C110, and C111-C123 were similarly prepared using the method of Example 27, the latter admixtures employing citric acid instead of malic acid.

TABLE 42

Preparation and Properties of Admixtures C107-C123

| Admixture # | Mol Composition | Reactants (Mass in grams) NaOH | Reactants (Mass in grams) Al(OH)$_3$ | Reactants (Mass in grams) H$_3$BO$_3$ | Reactants (Mass in grams) Water | Reaction Product pH | Reaction Product Appearance |
|---|---|---|---|---|---|---|---|
| | | | | Mal | | | |
| C107 | Na$_3$Al$_2$(BO$_3$)$_4$(Mal)$_2$ | 1.23 | 1.94 | 2.74 | 2.52 | 11.6 | 7.0 Cloudy Solution |
| C108 | Na$_3$Al$_4$(BO$_3$)$_4$(Mal)$_2$ | 1.02 | 3.25 | 2.11 | 2.11 | 11.5 | 7.3 Cloudy Gel |
| C109 | Na$_4$Al$_2$(BO$_3$)$_4$(Mal)$_3$ | 1.34 | 1.59 | 3.22 | 2.07 | 11.8 | 6.1 Clear Solution |
| C110 | Na$_4$Al$_6$(BO$_3$)$_4$(Mal)$_3$ | 1.01 | 3.61 | 2.33 | 1.56 | 11.5 | 6.7 White Suspension |
| | | | | Cit | | | |
| C111 | Na$_2$Al$_1$(BO$_3$)$_2$(Cit)$_1$ | 1.36 | 1.62 | 3.13 | 2.11 | 11.8 | 7.1 Clear Solution |
| C112 | Na$_3$Al$_1$(BO$_3$)$_2$(Cit)$_1$ | 1.89 | 1.50 | 2.90 | 1.94 | 11.8 | 8.6 Cloudy Solution |
| C113 | Na$_4$Al$_1$(BO$_3$)$_2$(Cit)$_1$ | 2.34 | 1.39 | 2.69 | 1.80 | 11.8 | 10.4 Cloudy Solution |
| C114 | Na$_3$Al$_2$(BO$_3$)$_2$(Cit)$_1$ | 1.64 | 2.60 | 2.46 | 1.69 | 11.6 | 8.9 Cloudy Solution |

TABLE 42-continued

Preparation and Properties of Admixtures C107-C123

| Admixture | | Reactants (Mass in grams) | | | | Reaction Product | |
|---|---|---|---|---|---|---|---|
| # | Mol Composition | NaOH | Al(OH)$_3$ | H$_3$BO$_3$ | Water | pH | Appearance |
| C115 | Na$_4$Al$_2$(BO$_3$)$_2$(Cit)$_1$ | 2.05 | 2.43 | 2.31 | 1.58 | 11.6 | 10.0 White Gel |
| C116 | Na$_3$Al$_2$(BO$_3$)$_2$(Cit)$_2$ | 1.24 | 1.96 | 3.76 | 1.27 | 11.8 | 6.5 Clear Solution |
| C117 | Na$_5$Al$_2$(BO$_3$)$_2$(Cit)$_2$ | 1.87 | 1.78 | 3.42 | 1.16 | 11.8 | 8.3 Clear Solution |
| C118 | Na$_3$Al$_3$(BO$_3$)$_2$(Cit)$_1$ | 1.45 | 3.44 | 2.13 | 1.49 | 11.5 | 8.9 Cloudy Solution |
| C119 | Na$_4$Al$_3$(BO$_3$)$_2$(Cit)$_1$ | 1.82 | 3.25 | 2.02 | 1.41 | 11.5 | 9.8 Cloudy Gel |
| C120 | Na$_5$Al$_4$(BO$_3$)$_2$(Cit)$_2$ | 1.58 | 3.01 | 2.82 | 0.98 | 11.6 | 8.8 Clear Solution |
| C121 | Na$_7$Al$_4$(BO$_3$)$_2$(Cit)$_2$ | 2.06 | 2.80 | 2.63 | 0.91 | 11.6 | 9.7 Cloudy Gel |
| C122 | Na$_7$Al$_6$(BO$_3$)$_6$(Cit)$_2$ | 1.51 | 3.07 | 1.91 | 1.99 | 11.5 | 9.1 Cloudy Solution |
| C123 | Na$_4$Al$_6$(BO$_3$)$_6$(Cit)$_1$ | 1.09 | 3.87 | 1.19 | 2.52 | 11.3 | 9.8 Cloudy Solution |

Notes:
Reaction conditions are detailed in Example 27;
NaOH is sodium hydroxide;
Al(OH)$_3$ is aluminum(III) hydroxide;
Cit is citric acid;
Mal is malic acid;
H$_3$BO$_3$ is boric acid;
W is water.

TABLE 43

1:1:3 (w/w) OPC-Fly Ash F-Sand Mortars made with Admixtures C107-C123

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C107 | 0.41 | 6.0 | 2.46 | 325 | 71 | 10.7 | 23.0 |
| C108 | 0.41 | 6.0 | 2.46 | 310 | 75 | 11.1 | 25.6 |
| C109 | 0.41 | 6.0 | 2.46 | 280 | 63 | 9.3 | 20.2 |
| C110 | 0.41 | 6.0 | 2.46 | 315 | 66 | 9.9 | 22.1 |
| C111 | 0.41 | 6.0 | 2.46 | 270 | 73 | 10.8 | 24.1 |
| C112 | 0.41 | 6.0 | 2.46 | 255 | 65 | 9.8 | 22.0 |
| C113 | 0.41 | 6.0 | 2.46 | 240 | 73 | 12.4 | 27.1 |
| C114 | 0.41 | 6.0 | 2.46 | 280 | 69 | 9.5 | 23.9 |
| C115 | 0.41 | 6.0 | 2.46 | 260 | 71 | 11.8 | 24.5 |
| C116 | 0.41 | 6.0 | 2.46 | 290 | 74 | 11.3 | 26.4 |
| C117 | 0.41 | 6.0 | 2.46 | 275 | 78 | 11.2 | 26.7 |
| C118 | 0.41 | 6.0 | 2.46 | 260 | 78 | 13.3 | 28.3 |
| C119 | 0.41 | 6.0 | 2.46 | 230 | 62 | 10.6 | 22.7 |
| C120 | 0.41 | 6.0 | 2.46 | 225 | 61 | 10.2 | 23.2 |
| C121 | 0.41 | 6.0 | 2.46 | 210 | 53 | 8.8 | 20.1 |
| C122 | 0.41 | 6.0 | 2.46 | 215 | 55 | 9.8 | 17.6 |
| C123 | 0.41 | 6.0 | 2.46 | 230 | 58 | 10.6 | 24.5 |

Notes:
W/C is the water-to-cement ratio;
Hardness is the Vickers indentation hardness;
SNC is SikaSet NC;
SHE is SikaSet HE;
P20 is Pozzutec 20+.

TABLE 44

2:3 (w/w) Fly Ash C-Sand Mortars made with Admixtures C107-C123

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C107 | 0.22 | 6.0 | 1.32 | 33 | 135 | 19.5 | 52.5 |
| C108 | 0.22 | 6.0 | 1.32 | 42 | 119 | 18.0 | 54.7 |
| C109 | 0.22 | 6.0 | 1.32 | 21 | 149 | 20.1 | 56.6 |
| C110 | 0.22 | 6.0 | 1.32 | 42 | 189 | 27.2 | 63.6 |
| C111 | 0.22 | 6.0 | 1.32 | 50 | 173 | 23.6 | 56.6 |
| C112 | 0.22 | 6.0 | 1.32 | 23 | 147 | 19.5 | 53.9 |
| C113 | 0.22 | 6.0 | 1.32 | 38 | 184 | 24.5 | 52.3 |
| C114 | 0.22 | 6.0 | 1.32 | 20 | 152 | 21.6 | 54.8 |
| C115 | 0.22 | 6.0 | 1.32 | 28 | 176 | 25.6 | 52.7 |
| C116 | 0.22 | 6.0 | 1.32 | 30 | 135 | 20.2 | 46.5 |
| C117 | 0.22 | 6.0 | 1.32 | 28 | 144 | 19.0 | 42.4 |
| C118 | 0.22 | 6.0 | 1.32 | 54 | 155 | 23.6 | 50.3 |
| C119 | 0.22 | 6.0 | 1.32 | 50 | 170 | 23.3 | 51.5 |
| C120 | 0.22 | 6.0 | 1.32 | 30 | 152 | 22.0 | 50.1 |
| C121 | 0.22 | 6.0 | 1.32 | 26 | 153 | 22.5 | 53.2 |
| C122 | 0.22 | 6.0 | 1.32 | 28 | 180 | 25.1 | 60.4 |
| C123 | 0.22 | 6.0 | 1.32 | 21 | 158 | 24.7 | 50.5 |

Notes:
W/C is the water-to-cement ratio;
Hardness is the Vickers indentation hardness;
SNC is SikaSet NC;
SHE is SikaSet HE;
P20 is Pozzutec 20+.

Admixtures C124-C132 were prepared as 40% w/w aqueous suspensions, using the α-hydroxycarboxylic acid, citric acid as the primary ligand, and phosphate (PO$_4^{3-}$) and carbonate (CO$_3^{2-}$), which participate in mineralization reactions, as secondary ligands. Admixtures C124-C126 are sodium phosphatocitratoaluminate(III) complexes (Na$_x$Al$_2$(PO$_4$)$_1$(Cit)$_1$, where x is 3, 4 or 5). Admixtures C127 and C128 are sodium carbonatocitratoaluminate(III) complexes (Na$_x$Al$_2$(CO$_3$)$_y$(Cit)$_1$, where x is 2 or 4, and y is 1 or 2). Admixture C129 is a calcium carbonatocitratoaluminate(III) complex (Ca$_1$Al$_2$(CO$_3$)$_1$(Cit)$_1$), and admixture C130 is a calcium sodium carbonatocitratoaluminate(III) complex (Na$_2$Ca$_1$Al$_2$(CO$_3$)$_2$(Cit)$_1$). Admixture C131 is a magnesium carbonatocitratoaluminate(III) complex (Mg$_1$Al$_2$(CO$_3$)$_1$(Cit)$_1$), and admixtures C132 is a magnesium sodium carbonatocitratoaluminate(III) complex (Na$_2$Mg$_1$Al$_2$(CO$_3$)$_2$(Cit)$_1$). The formulation and preparation of the admixtures is detailed in Table 45, with representative examples (admixtures C124, C127, C129 and C130) provided below as Examples 28-31. The testing of the admixtures for OPC-fly ash F-sand and fly ash C-sand mortars is detailed in Tables 46 and 47 respectively.

Admixtures C124-C131 behaved in a similar manner to the citratoaluminate(III) admixtures (detailed in Tables 18-20), with the inclusion of phosphate or carbonate as secondary ligands resulting in useful variations in the set time, and hardness and compressive strength development. In all cases, mortars prepared with the admixtures achieved substantially greater hardness and compressive strength than those prepared with water, or the commercial SikaSet or Pozzutec admixtures.

These results show that sodium, calcium, magnesium and mixed calcium-sodium and magnesium-sodium phosphatocitratoaluminate(III) and carbonatocitratoaluminate(III) complexes are useful as admixtures for hydraulic cement compositions, and that they improve setting, hardness and compressive strength.

Example 28

Admixture C124. Sodium Phosphatocitratoaluminate(III): $Na_3Al_2(PO_4)_1(Cit)_1$ Sodium hydroxide (1.71 g) was dissolved with stirring (340 rpm) in water (6.4 g) maintained at 293 K, phosphoric acid (1.65 g) added over 2 minutes, the temperature raised to 343 K, and stirring continued for 5 hours. A solution of citric acid (2.49 g) in water (5.0 g) was then added, and stirring continued for 15 minutes. Aluminum(III) hydroxide (2.72 g) was then added, and stirring continued for 50 hours. A white suspension was obtained, and this was diluted to 6% w/w solids for testing.

Admixtures C125-C126 were similarly prepared using the method of Example 28.

Example 29

Admixture C127. Sodium Carbonatocitratoaluminate(III): $Na_2Al_2(CO_3)_1(Cit)_1$ Citric acid (3.42 g) was dissolved with stirring (340 rpm) in water (6.3 g) maintained at 293 K, aluminum hydroxide (3.39 g) added over 1 minute, the temperature raised to 343 K, and stirring continued for 40 hours. A solution of sodium carbonate (1.89 g) in water (5.0 g) was then added, and stirring continued for 42 hours. A white suspension was obtained, and this was diluted to 6% w/w solids for testing.

Admixture C128 was similarly prepared using the method of Example 29.

Example 30

Admixture C129. Calcium Carbonatocitratoaluminate(III): $Ca_1Al_2(CO_3)_1(Cit)_1$ Citric acid (3.46 g) was dissolved with stirring (340 rpm) in water (11.3 g) maintained at 293 K, aluminum hydroxide (3.43 g) added over 1 minute, the temperature raised to 343 K, and stirring continued for 40 hours. Calcium carbonate (1.80 g) was then added, and stirring continued for 42 hours. A white suspension was obtained, and this was diluted to 6% w/w solids for testing.

Admixture C131 was similarly prepared using the method of Example 30, but using magnesium carbonate instead of calcium carbonate.

Example 31

Admixture C130. Calcium Sodium Carbonatocitratoaluminate(III): $NA_2CA_1AL_2(CO_3)_2(Cit)_1$ Citric acid (2.80 g) was dissolved with stirring (340 rpm) in water (6.6 g) maintained at 293 K, aluminum hydroxide (2.59 g) added over 1 minute, the temperature raised to 343 K, and stirring continued for 40 hours. Calcium carbonate (1.46 g) was then added, followed by a solution of sodium carbonate (1.55 g) in water (5.0 g), and stirring continued for 42 hours. A white suspension was obtained, and this was diluted to 6% w/w solids for testing.

Admixture C132 was similarly prepared using the method of Example 30, but using magnesium carbonate instead of calcium carbonate.

TABLE 45

Preparation and Properties of Admixtures C124-C132

| # | Admixture Mol Composition | NaOH | $Al(OH)_3$ | Cit | $H_3PO_4$ | Water | pH | Appearance |
|---|---|---|---|---|---|---|---|---|
| C124 | $Na_3Al_2(PO_4)_1(Cit)_1$ | 1.71 | 2.72 | 2.49 | 1.65 | 11.4 | 6.6 | White Suspension |
| C125 | $Na_4Al_2(PO_4)_1(Cit)_1$ | 2.13 | 2.54 | 2.34 | 1.54 | 11.5 | 8.7 | White Suspension |
| C126 | $Na_5Al_2(PO_4)_1(Cit)_1$ | 2.50 | 2.38 | 2.20 | 1.44 | 11.5 | 10.5 | White Suspension |
| | | $Na_2CO_3$ | | | | | | |
| C127 | $Na_2Al_2(CO_3)_1(Cit)_1$ | 1.89 | 3.39 | 3.42 | — | 11.3 | 10.3 | White Suspension |
| C128 | $Na_4Al_2(CO_3)_2(Cit)_1$ | 3.06 | 2.74 | 2.77 | — | 11.4 | 10.7 | White Suspension |
| | | $Na_2CO_3$ | | | $CaCO_3$ | | | |
| C129 | $Ca_1Al_2(CO_3)_1(Cit)_1$ | — | 3.43 | 3.46 | 1.80 | 11.3 | 6.3 | White Suspension |
| C130 | $Na_2Ca_1Al_2(CO_3)_2(Cit)_1$ | 1.55 | 2.59 | 2.80 | 1.46 | 11.6 | 10.4 | White Suspension |

TABLE 45-continued

Preparation and Properties of Admixtures C124-C132

| Admixture | | Reactants (Mass in g) | | | | Reaction Product | |
|---|---|---|---|---|---|---|---|
| # | Mol Composition | Na₂CO₃ | Al(OH)₃ | Cit | MgCO₃ | Water | pH | Appearance |
| C131 | MgAl$_2$(CO$_3$)$_1$(Cit)$_1$ | — | 3.56 | 3.59 | 1.58 | 11.3 | 7.6 | White Suspension |
| C132 | Na$_2$Mg$_1$Al$_2$(CO$_3$)$_2$(Cit)$_1$ | 1.59 | 2.66 | 2.88 | 1.27 | 11.6 | 10.8 | White Suspension |

Notes:
Reaction conditions are detailed in Examples 28-31;
NaOH is sodium hydroxide;
Na$_2$CO$_3$ is sodium carbonate;
Al(OH)$_3$ is aluminum(III) hydroxide;
CaCO$_3$ is calcium carbonate;
MgCO$_3$ is magnesium carbonate;
Cit is citric acid;
H$_3$PO$_4$ is phosphoric acid;
W is water.

TABLE 46

1:1:3 (w/w) OPC-Fly Ash F-Sand Mortars made with Admixtures C124-C132

| # | W/C (w/w) | [Admixture] (% w/w) In Stock | [Admixture] (% w/w) vs Cement | Set Time (min) | Hardness (MPa) | Compressive Strength (MPa) 1 day | Compressive Strength (MPa) 28 day |
|---|---|---|---|---|---|---|---|
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C124 | 0.41 | 6.0 | 2.46 | 130 | 62 | 9.3 | 19.8 |
| C125 | 0.41 | 6.0 | 2.46 | 115 | 77 | 12.5 | 27.9 |
| C126 | 0.41 | 6.0 | 2.46 | 110 | 70 | 12.4 | 30.1 |
| C127 | 0.41 | 6.0 | 2.46 | 150 | 137 | 19.1 | 42.7 |
| C128 | 0.41 | 6.0 | 2.46 | 140 | 149 | 21.3 | 45.8 |
| C129 | 0.41 | 6.0 | 2.46 | 120 | 142 | 20.1 | 43.5 |
| C130 | 0.41 | 6.0 | 2.46 | 135 | 153 | 22.8 | 47.4 |
| C131 | 0.41 | 6.0 | 2.46 | 115 | 138 | 20.2 | 44.6 |
| C132 | 0.41 | 6.0 | 2.46 | 90 | 162 | 25.5 | 51.6 |

Notes:
W/C is the water-to-cement ratio;
Hardness is the Vickers indentation hardness;
SNC is SikaSet NC;
SHE is SikaSet HE;
P20 is Pozzutec 20+.

TABLE 47

2:3 (w/w) Fly Ash C-Sand Mortars made with Admixtures C124-C132

| # | W/C (w/w) | [Admixture] (% w/w) In Stock | [Admixture] (% w/w) vs Cement | Set Time (min) | Hardness (MPa) | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C124 | 0.22 | 6.0 | 1.32 | 28 | 134 | 20.4 | 47.0 |
| C125 | 0.22 | 6.0 | 1.32 | 23 | 163 | 23.3 | 51.0 |
| C126 | 0.22 | 6.0 | 1.32 | 18 | 171 | 22.5 | 51.8 |
| C127 | 0.22 | 6.0 | 1.32 | 28 | 160 | 22.8 | 47.5 |
| C128 | 0.22 | 6.0 | 1.32 | 35 | 171 | 24.6 | 50.3 |
| C129 | 0.22 | 6.0 | 1.32 | 43 | 153 | 21.7 | 45.9 |
| C130 | 0.22 | 6.0 | 1.32 | 39 | 162 | 23.0 | 49.0 |
| C131 | 0.22 | 6.0 | 1.32 | 33 | 159 | 22.1 | 46.2 |
| C132 | 0.22 | 6.0 | 1.32 | 37 | 178 | 24.9 | 53.0 |

Notes:
W/C is the water-to-cement ratio;
Hardness is the Vickers indentation hardness;
SNC is SikaSet NC;
SHE is SikaSet HE;
P20 is Pozzutec 20+.

Admixtures C133-C151 were prepared as 40% w/w aqueous suspensions, using the α-hydroxycarboxylic acids, malic acid and citric acid as ligand, and bismuth(III) instead of aluminum(III) as the coordinating metal center. Admixtures C149-C151 also contained borate as a secondary ligand. Admixtures C133-C134 are bismuth(III) malate complexes (Bi$_2$(Mal)$_x$, where x is 1 or 3), and admixtures C135-C138 are sodium malatobismuthate(III) complexes (Na$_x$Bi$_1$(Mal)$_y$, where x is 1-3, and y is 1 or 2). Admixtures C139-C140 are bismuth(III) citrate complexes (Bi$_x$(Cit)$_1$, where x is 1 or 3), and admixtures C141-C148 are sodium citratobismuthate(III) complexes (Na$_x$Bi$_1$(Cit)$_y$, where x is 1-6, and y is 1 or 2). Admixtures C149-C151 are sodium boratocitratobismuthate(III) complexes (Na$_w$Bi$_x$(BO$_3$)$_y$Cit)$_z$, where w is 3-6, and x and y are 1 or 2, and z is 2 or 3). The formulation and preparation of the admixtures is detailed in Table 48, with representative examples (admixtures C133, C135, C149) provided below as Examples 32-34. The testing of the admixtures for OPC-fly ash F-sand and fly ash C-sand mortars is detailed in Tables 49 and 50 respectively.

Admixtures C133-C151 behaved in a similar manner to the malatoaluminate(III) and citratoaluminate(III) admixtures (detailed in Tables 15-20), except that the substitution of bismuth(III) for aluminum(III) resulted in substantial set retardation, especially with the fly ash C-sand mortars. In certain cases (admixtures C142, C145 and C148), no setting was observed for fly ash C-sand mortars within the observation period (7 days). In almost all cases, mortars prepared with the admixtures achieved substantially greater hardness and compressive strength than those prepared with water, or the commercial SikaSet or Pozzutec admixtures.

These results show that sodium malatobismuthate(III), citratobismuthate(III) and boratocitratobismuthate(III) complexes are useful as admixtures for hydraulic cement compositions, and that they improve setting, hardness and compressive strength.

Example 32

Admixture C133. Bismuth(III) Citrate: $Bi_1(Mal)_1$

Malic acid (1.81 g) was dissolved with stirring (340 rpm) in water (11.9 g) maintained at 293 K, bismuth(III) oxide (6.28 g) added over 2 minutes, the temperature raised to 343 K, and stirring continued for 70 hours. A yellow suspension was obtained, and this was diluted to 6% w/w solids for testing.

Admixtures C134, and C139-C140 were similarly prepared using the method of Example 32, the latter admixtures employing citric acid instead of malic acid.

Example 33

Admixture C135. Sodium Malatobismuthate(III): $Na_1Bi_1(Mal)_1$

Sodium hydroxide (0.79 g) was dissolved with stirring (340 rpm) in water (11.9 g) maintained at 293 K, malic acid (2.66 g) added over 1 minute, and stirring continued for 15 minutes. Bismuth(III) oxide (4.62 g) was then added, the temperature raised to 343 K, and stirring continued for 70 hours. A white suspension was obtained, and this was diluted to 6% w/w solids for testing.

Admixtures C136-C138, and C141-C148 were similarly prepared using the method of Example 33, the latter admixtures employing citric acid instead of malic acid.

Example 34

Admixture C149. Sodium Boratocitratobismuthate (III): $Na_3Bi_1(BO_3)_2(Cit)_2$

Citric acid (3.57 g) was dissolved with stirring (340 rpm) in water (6.0 g) maintained at 293 K, boric acid (1.16 g) added over 1 minute, the temperature raised to 343 K, and stirring continued for 20 hours. A solution of sodium hydroxide (1.13 g) in water (6.0 g) was then added, followed by bismuth(III) oxide (2.19 g) and stirring continued for 70 hours. A white suspension was obtained, and this was diluted to 6% w/w solids for testing.

Admixtures C150 and C151 were similarly prepared using the method of Example 34.

TABLE 48

Preparation and Properties of Admixtures C133-C151

| Admixture | | Reactants (Mass in g) | | | | Reaction Product | |
|---|---|---|---|---|---|---|---|
| # | Mol Composition | NaOH | $Bi_2O_3$ | | Water | pH | Appearance |
| | | | | Mal | | | |
| C133 | $Bi_2(Mal)_1$ | — | 6.28 | 1.81 | 11.9 | — | 6.3 Yellow Suspension |
| C134 | $Bi_2(Mal)_3$ | — | 4.34 | 3.74 | 11.9 | — | 3.1 White Suspension |
| C135 | $Na_1Bi_1(Mal)_1$ | 0.79 | 4.62 | 2.66 | 11.9 | — | 8.1 White Suspension |
| C136 | $Na_2Bi_1(Mal)_1$ | 1.45 | 4.21 | 2.42 | 11.9 | — | 10.9 White Suspension |
| C137 | $Na_2Bi_1(Mal)_2$ | 1.11 | 3.24 | 3.73 | 11.9 | — | 7.2 White Suspension |
| C138 | $Na_3Bi_1(Mal)_2$ | 1.56 | 3.03 | 3.49 | 11.9 | — | 9.6 White Suspension |
| | | | | Cit | | | |
| C139 | $Bi_3(Cit)_1$ | — | 6.34 | 1.74 | 11.9 | — | 5.1 Yellow Suspension |
| C140 | $Bi_1(Cit)_1$ | — | 4.43 | 3.65 | 11.9 | — | 4.4 White Suspension |
| C141 | $Na_1Bi_1(Cit)_1$ | 0.69 | 4.05 | 3.34 | 11.9 | — | 6.6 White Suspension |
| C142 | $Na_2Bi_1(Cit)_1$ | 1.28 | 3.73 | 3.07 | 11.9 | — | 7.9 White Suspension |
| C143 | $Na_3Bi_1(Cit)_1$ | 1.78 | 3.45 | 2.85 | 11.9 | — | 12.3 Yellow Suspension |
| C144 | $Na_3Bi_1(Cit)_2$ | 1.32 | 2.55 | 4.21 | 11.9 | — | 5.5 White Suspension |
| C145 | $Na_4Bi_1(Cit)_2$ | 0.49 | 2.86 | 4.72 | 11.9 | — | 5.9 White Suspension |
| C146 | $Na_5Bi_1(Cit)_2$ | 0.49 | 2.86 | 4.72 | 11.9 | — | 7.9 White Suspension |
| C147 | $Na_6Bi_1(Cit)_2$ | 0.49 | 2.86 | 4.72 | 11.9 | — | 12.7 Yellow Suspension |
| C148 | $Na_3Bi_3(Cit)_2$ | 0.81 | 4.69 | 2.58 | 11.9 | — | 7.5 White Suspension |
| | | | | | | $H_3BO_3$ | |
| C149 | $Na_3Bi_1(BO_3)_2(Cit)_2$ | 1.13 | 2.19 | 3.57 | 12.0 | 1.16 | 4.8 White Suspension |
| C150 | $Na_4Bi_2(BO_3)_2(Cit)_2$ | 1.14 | 3.32 | 2.71 | 11.9 | 0.88 | 7.2 White Suspension |
| C151 | $Na_6Bi_2(BO_3)_1(Cit)_3$ | 1.44 | 2.80 | 3.43 | 12.0 | 0.37 | 7.4 White Suspension |

Notes:
Reaction conditions are detailed in Examples 32-34;
NaOH is sodium hydroxide;
$Bi_2O_3$ is bismuth(III) oxide;
Mal is malic acid;
Cit is citric acid;
$H_3BO_3$ is boric acid;
W is water.

TABLE 49

1:1:3 (w/w) OPC-Fly Ash F-Sand Mortars made with Admixtures C133-C151

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C133 | 0.41 | 6.0 | 2.46 | 380 | 43 | 6.4 | 13.6 |
| C134 | 0.41 | 6.0 | 2.46 | 440 | 47 | 7.9 | 19.1 |
| C135 | 0.41 | 6.0 | 2.46 | 420 | 71 | 11.2 | 23.6 |
| C136 | 0.41 | 6.0 | 2.46 | 415 | 71 | 12.9 | 28.9 |
| C137 | 0.41 | 6.0 | 2.46 | 8 h | 73 | 12.5 | 29.5 |
| C138 | 0.41 | 6.0 | 2.46 | 430 | 85 | 13.0 | 30.7 |
| C139 | 0.41 | 6.0 | 2.46 | 315 | 40 | 5.9 | 12.6 |
| C140 | 0.41 | 6.0 | 2.46 | 8 h | 44 | 6.3 | 14.4 |
| C141 | 0.41 | 6.0 | 2.46 | 335 | 93 | 14.3 | 32.6 |
| C142 | 0.41 | 6.0 | 2.46 | 12 h | 88 | 12.4 | 28.9 |
| C143 | 0.41 | 6.0 | 2.46 | 415 | 92 | 13.2 | 32.5 |
| C144 | 0.41 | 6.0 | 2.46 | 12 h | 91 | 13.8 | 32.7 |
| C145 | 0.41 | 6.0 | 2.46 | 15 h | 94 | 14.9 | 32.1 |
| C146 | 0.41 | 6.0 | 2.46 | 8 h | 107 | 15.8 | 36.8 |
| C147 | 0.41 | 6.0 | 2.46 | 375 | 111 | 16.7 | 37.1 |
| C148 | 0.41 | 6.0 | 2.46 | 18 h | 93 | 13.5 | 29.4 |
| C149 | 0.41 | 6.0 | 2.46 | 13 h | 112 | 16.9 | 39.0 |
| C150 | 0.41 | 6.0 | 2.46 | 9 h | 108 | 18.1 | 40.3 |
| C151 | 0.41 | 6.0 | 2.46 | 8 h | 96 | 15.2 | 37.1 |

Notes:
W/C is the water-to-cement ratio;
Hardness is the Vickers indentation hardness;
SNC is SikaSet NC;
SHE is SikaSet HE;
P20 is Pozzutec 20+.

TABLE 50

2:3 (w/w) Fly Ash C-Sand Mortars made with Admixtures C133-C151

| # | W/C (w/w) | [Admixture] (% w/w) in Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C133 | 0.22 | 6.0 | 1.32 | 105 | 108 | 16.7 | 29.9 |
| C134 | 0.22 | 6.0 | 1.32 | 130 | 96 | 14.5 | 26.9 |
| C135 | 0.22 | 6.0 | 1.32 | 115 | 102 | 16.2 | 33.5 |
| C136 | 0.22 | 6.0 | 1.32 | 90 | 112 | 17.3 | 38.9 |
| C137 | 0.22 | 6.0 | 1.32 | 120 | 98 | 15.0 | 32.5 |
| C138 | 0.22 | 6.0 | 1.32 | 110 | 103 | 16.4 | 36.8 |
| C139 | 0.22 | 6.0 | 1.32 | 47 | 105 | 15.6 | 28.8 |
| C140 | 0.22 | 6.0 | 1.32 | 135 | 99 | 14.4 | 27.8 |
| C141 | 0.22 | 6.0 | 1.32 | 90 | 186 | 24.5 | 47.9 |
| C142 | 0.22 | 6.0 | 1.32 | No Set | <2 | ND | ND |
| C143 | 0.22 | 6.0 | 1.32 | 80 | 161 | 24.7 | 50.1 |
| C144 | 0.22 | 6.0 | 1.32 | 60 h | 178 | 26.4 | 53.9 |
| C145 | 0.22 | 6.0 | 1.32 | No Set | <2 | ND | ND |
| C146 | 0.22 | 6.0 | 1.32 | 70 h | 195 | 25.5 | 51.9 |
| C147 | 0.22 | 6.0 | 1.32 | 80 | 181 | 25.6 | 52.6 |
| C148 | 0.22 | 6.0 | 1.32 | No Set | <2 | ND | ND |
| C149 | 0.22 | 6.0 | 1.32 | 44 h | 176 | 25.4 | 53.1 |
| C150 | 0.22 | 6.0 | 1.32 | 20 h | 170 | 24.7 | 53.2 |
| C151 | 0.22 | 6.0 | 1.32 | 29 h | 171 | 24.4 | 50.1 |

Notes:
W/C is the water-to-cement ratio;
Hardness is the Vickers indentation hardness;
SNC is SikaSet NC;
SHE is SikaSet HE;
P20 is Pozzutec 20+.

Admixtures C152-C160 were prepared as 40% w/w aqueous suspensions, using the α-hydroxycarboxylic acids, malic acid and citric acid as ligand, and both aluminum(III) and bismuth(III) as coordinating metal centers. Admixtures C152-C154 are sodium malatoaluminate(III)bismuthate(III) complexes ($Na_xAl_4Bi_1(Mal)_y$, where x is 5, 10 or 15, and y is 5 or 10). Admixtures C155-C160 are sodium citratoaluminate(III)bismuthate(III) complexes ($Na_xAl_4Bi_1(Cit)_y$, where x is 8, 10, 15, 20 or 30, and y is 5 or 10). The formulation and preparation of the admixtures is detailed in Table 51, with a representative example (admixture C152) provided below as Example 35. The testing of the admixtures for OPC-fly ash F-sand and fly ash C-sand mortars is detailed in Tables 52 and 53 respectively.

Admixtures C152-C160 behaved in an intermediate manner to the malatoaluminate(III) and citratoaluminate(III) admixtures (detailed in Tables 8-20) and the malatobismuthate(III) and citratobismuthate(III) admixtures (detailed in Tables 48-50), with the inclusion of bismuth(III) resulting in significant set retardation, especially with the fly ash C-sand mortars. In all cases, mortars prepared with the admixtures achieved substantially greater hardness and compressive strength than those prepared with water or the commercial SikaSet or Pozzutec admixtures.

These results show that sodium malatoaluminate(III)bismuthate(III) and citratoaluminate(III)bismuthate(III) complexes are useful as admixtures for hydraulic cement compositions, and that they improve setting, hardness and compressive strength.

Example 35

Admixture C152. Sodium Malatoaluminate(III)Bismuthate(III): $Na_5Al_4Bi_1(Mal)_5$ Sodium hydroxide (1.14 g) was dissolved with stirring (340 rpm) in water (11.5 g) maintained at 293 K, malic acid (3.83 g) added over 1 minute, and stirring continued for 15 minutes. Aluminum(III) hydroxide (2.17 g), was then added over 1 min, followed by bismuth(III) oxide (1.33 g), the temperature raised to 343 K, and stirring continued for 70 hours. A white suspension was obtained, and this was diluted to 6% w/w solids for testing.

Admixtures C153 and C154, and C155-C160 were similarly prepared using the method of Example 35, the latter admixtures employing citric acid instead of malic acid.

TABLE 51

Preparation and Properties of Admixtures C152-C160

| Admixture | | Reactants (Mass in g) | | | | Reaction Product | |
|---|---|---|---|---|---|---|---|
| # | Mol Composition | NaOH | Al(OH)$_3$ | Bi$_2$O$_3$ | Water | pH | Appearance |
| | | | | Mal | | | |
| C152 | Na$_5$Al$_4$Bi$_1$(Mal)$_5$ | 1.14 | 2.17 | 1.33 | 3.83 | 11.5 | 7.3 White Suspension |
| C153 | Na$_{10}$Al$_4$Bi$_1$(Mal)$_{10}$ | 1.41 | 1.34 | 0.82 | 4.74 | 11.7 | 4.8 White Suspension |
| C154 | Na$_{15}$Al$_4$Bi$_1$(Mal)$_{10}$ | 1.95 | 1.24 | 0.76 | 4.36 | 11.7 | 7.9 White Suspension |
| | | | | Cit | | | |
| C155 | Na$_5$Al$_4$Bi$_1$(Cit)$_5$ | 0.95 | 1.80 | 1.10 | 4.55 | 11.6 | 2.9 White Suspension |
| C156 | Na$_8$Al$_4$Bi$_1$(Cit)$_5$ | 1.42 | 1.68 | 1.03 | 4.25 | 11.6 | 6.9 White Suspension |
| C157 | Na$_{10}$Al$_4$Bi$_1$(Cit)$_5$ | 1.70 | 1.61 | 0.99 | 4.07 | 11.6 | 8.6 White Suspension |
| C158 | Na$_{15}$Al$_4$Bi$_1$(Cit)$_5$ | 2.30 | 1.46 | 0.89 | 3.69 | 11.7 | 11.3 White Suspension |
| C159 | Na$_{20}$Al$_4$Bi$_1$(Cit)$_{10}$ | 1.98 | 0.94 | 0.58 | 4.75 | 11.7 | 6.1 White Suspension |
| C160 | Na$_{30}$Al$_4$Bi$_1$(Cit)$_{10}$ | 2.65 | 0.84 | 0.51 | 4.23 | 11.8 | 11.3 Yellow Suspension |

Notes:
Reaction conditions are detailed in Example 35;
NaOH is sodium hydroxide;
Al(OH)$_3$ is aluminum(III) hydroxide;
Bi$_2$O$_3$ is bismuth(III) oxide;
Mal is malic acid;
Cit is citric acid;
W is water.

TABLE 52

1:1:3 (w/w) OPC-Fly Ash F-Sand Mortars made with Admixtures C152-C160

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C152 | 0.41 | 6.0 | 2.46 | 350 | 122 | 16.7 | 35.9 |
| C153 | 0.41 | 6.0 | 2.46 | 370 | 136 | 17.4 | 40.7 |
| C154 | 0.41 | 6.0 | 2.46 | 325 | 126 | 17.2 | 44.6 |
| C155 | 0.41 | 6.0 | 2.46 | 305 | 103 | 17.2 | 39.0 |
| C156 | 0.41 | 6.0 | 2.46 | 310 | 118 | 19.1 | 40.2 |
| C157 | 0.41 | 6.0 | 2.46 | 285 | 123 | 20.6 | 43.6 |
| C158 | 0.41 | 6.0 | 2.46 | 270 | 117 | 20.3 | 46.5 |
| C159 | 0.41 | 6.0 | 2.46 | 360 | 125 | 22.5 | 43.7 |
| C160 | 0.41 | 6.0 | 2.46 | 330 | 112 | 22.9 | 44.5 |

Notes:
W/C is the water-to-cement ratio;
Hardness is the Vickers indentation hardness;
SNC is SikaSet NC;
SHE is SikaSet HE;
P20 is Pozzutec 20+.

TABLE 53

2:3 (w/w) Fly Ash C-Sand Mortars made with Admixtures C152-C160

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C152 | 0.22 | 6.0 | 1.32 | 65 | 171 | 24.7 | 54.2 |
| C153 | 0.22 | 6.0 | 1.32 | 70 | 195 | 28.5 | 56.3 |
| C154 | 0.22 | 6.0 | 1.32 | 85 | 189 | 28.9 | 55.7 |
| C155 | 0.22 | 6.0 | 1.32 | 53 | 194 | 26.6 | 50.9 |
| C156 | 0.22 | 6.0 | 1.32 | 62 | 189 | 26.9 | 53.3 |
| C157 | 0.22 | 6.0 | 1.32 | 75 | 197 | 28.9 | 56.7 |
| C158 | 0.22 | 6.0 | 1.32 | 75 | 166 | 24.9 | 53.8 |
| C159 | 0.22 | 6.0 | 1.32 | 115 | 216 | 29.4 | 57.1 |
| C160 | 0.22 | 6.0 | 1.32 | 90 | 185 | 25.9 | 53.4 |

Notes:
W/C is the water-to-cement ratio;
Hardness is the Vickers indentation hardness;
SNC is SikaSet NC;
SHE is SikaSet HE;
P20 is Pozzutec 20+.

Admixtures C161-C184 were prepared as 20 or 40% w/w aqueous solutions or suspensions, using the α-hydroxycarboxylic acids, malic acid and citric acid as ligands, and a variety of metals, namely magnesium(II), calcium(II), indium(III), gallium(III), iron(III), zinc(II), zirconium(IV), lanthanum(III), yttrium(III), molybdenum(VI) and tungsten (VI), as coordinating metal centers instead of aluminum(III). Admixture C161 is sodium magnesium citrate complex (Na$_2$Mg$_1$(Cit)$_1$). Admixture C162 is sodium calcium citrate complex (Na$_2$Ca$_1$(Cit)$_1$). Admixtures C163 and C164 are sodium malatoindate(III) complexes (Na$_1$In$_1$(Mal)$_1$ and Na$_3$In$_1$(Mal)$_2$). Admixtures C165 and C166 are sodium malatogallate(III) complexes (Na$_1$Ga$_1$(Mal)$_1$ and Na$_3$Ga$_1$(Mal)$_2$). Admixtures C167 and C168 are sodium malatoferrate(III) complexes (Na$_1$Fe(III)$_1$(Mal)$_1$ and Na$_2$Fe(III)$_1$(Mal)$_1$). Admixtures C169 and C170 are sodium malatozincate(II) complexes (Na$_1$Zn$_1$(Mal)$_1$ and Na$_3$Zn$_1$(Mal)$_2$). Admixtures C171 and C172 are sodium malatozirconate(IV) complexes (Na$_2$Zr$_1$(Mal)$_1$ and Na$_3$Zr$_1$(Mal)$_2$).

Admixtures C173 and C174 are sodium malatolanthanate(III) complexes ($Na_1La_1(Mal)_1$ and $Na_3La_1(Mal)_2$). Admixtures C175 and C176 are sodium malatoyttrate(III) complexes ($Na_1Y_1(Mal)_1$ and $Na_3Y_1(Mal)_2$). Admixtures C177-C180 are sodium citratomolybdate(VI) complexes ($Na_xMo_y(Mal)_z$, where x is 3, 4, 5 or 7, y is 1 or 2, and z is 1 or 2). Admixtures C181-C184 are sodium citratotungstate(VI) complexes ($Na_xW_1(Mal)_z$, where x is 3, 4, 6 or 7, and y is 1 or 2). The formulation and preparation of the admixtures is detailed in Table 54, with a representative example (admixture C161) provided below as Example 36. The testing of the admixtures for OPC-fly ash F-sand and fly ash C-sand mortars is detailed in Tables 55 and 56 respectively.

Admixtures C161-C184 behaved in a similar manner to the malatoaluminate(III) and citratoaluminate(III) admixtures (detailed in Tables 15-20), with the substitution of aluminum(III) by magnesium(II), calcium(II), indium(III), gallium(III), iron(III), zinc(II), zirconium(IV), lanthanum(III), yttrium(III), molybdenum(VI) and tungsten(VI), resulting in reduced hardness and compressive strength development. In all cases, mortars prepared with the admixtures achieved substantially greater hardness and compressive strength than those prepared with water or the commercial SikaSet or Pozzutec admixtures.

These results show that sodium magnesium citrate, sodium calcium citrate, sodium malatoindate(III), sodium malatogallate(III), malatoferrate(III), sodium malatozincate(II), malatozirconate(IV), sodium malatolanthanate(III), malatoyttrate(III), sodium citratomolybdate(VI) and sodium citratotungstate(VI) complexes are useful as admixtures for hydraulic cement compositions, and that they improve setting, hardness and compressive strength.

Example 36

Admixture C161. Sodium Magnesium Citrate Complex: $Na_2Mg_1(Cit)_1$

Sodium hydroxide (0.98 g) was dissolved with stirring (340 rpm) in water (16.0 g) maintained at 293 K, citric acid (2.35 g) added over 1 minute, and stirring continued for 15 minutes. Magnesium hydroxide (0.71 g), was then added over 1 min, the temperature raised to 343 K, and stirring continued for 70 hours. A cloudy solution was obtained, and this was diluted to 6% w/w solids for testing.

Admixtures C160-C184 were similarly prepared using the method of Example 36, with calcium(hydroxide, indium(III) oxide, gallium(III) oxide, iron(III) hydroxide, zinc(II) oxide, zirconium(IV) hydroxide, lanthanum(III) oxide, yttrium(III) oxide, molybdenum(VI) oxide and tungsten(VI) oxide used in place of magnesium hydroxide, and citric acid used in place of malic acid, where indicated.

TABLE 54

Preparation and Properties of Admixtures C161-C184

| | Admixture | Reactants (Mass in grams) | | | | Reaction Products | |
| --- | --- | --- | --- | --- | --- | --- | --- |
| # | Mol Composition | NaOH | | | Water | pH | Appearance |
| | | | $Mg(OH)_2$ | Cit | | | |
| C161 | $Na_2Mg_1(Cit)_1$ | 0.98 | 0.71 | 2.35 | 16.0 | 9.8 | Cloudy Solution |
| | | | $Ca(OH)_2$ | Cit | | | |
| C162 | $Na_2Ca_1(Cit)_1$ | 0.93 | 0.88 | 2.24 | 15.9 | 10.2 | White Suspension |
| | | | $In_2O_3$ | Mal | | | |
| C163 | $Na_1In_1(Mal)_1$ | 1.03 | 3.58 | 3.46 | 11.9 | 7.2 | Cloudy Solution |
| C164 | $Na_3In_1(Mal)_2$ | 1.84 | 2.13 | 4.11 | 11.9 | 8.8 | Cloudy Solution |
| | | | $Ga_2O_3$ | Mal | | | |
| C165 | $Na_1Ga_1(Mal)_1$ | 1.21 | 2.83 | 4.05 | 11.9 | 7.8 | Cloudy Solution |
| C166 | $Na_3Ga_1(Mal)_2$ | 2.01 | 1.57 | 4.50 | 11.9 | 9.2 | Cloudy Solution |
| | | | $Fe(OH)_3$ | Mal | | | |
| C167 | $Na_1Fe(III)_1(Mal)_1$ | 1.15 | 3.11 | 3.86 | 11.9 | 9.8 | Brown Solution |
| C168 | $Na_2Fe(III)_1(Mal)_1$ | 2.01 | 2.72 | 3.38 | 11.9 | 8.1 | Brown Suspension |
| | | | ZnO | Mal | | | |
| C169 | $Na_1Zn_1(Mal)_1$ | 1.27 | 2.57 | 4.24 | 11.9 | 7.0 | White Suspension |
| C170 | $Na_3Zn_1(Mal)_2$ | 2.06 | 1.40 | 4.62 | 11.9 | 8.1 | White Suspension |
| | | | $Zr(OH)_4$ | Mal | | | |
| C171 | $Na_2Zr_1(Mal)_1$ | 1.73 | 3.45 | 2.90 | 11.9 | 11.5 | White Suspension |
| C172 | $Na_3Zr_1(Mal)_2$ | 1.77 | 2.35 | 3.96 | 11.9 | 4.8 | White Suspension |
| | | | $La_2O_3$ | Mal | | | |
| C173 | $Na_1La_1(Mal)_1$ | 0.96 | 3.91 | 3.22 | 11.9 | 7.3 | White Suspension |
| C174 | $Na_3La_1(Mal)_2$ | 1.76 | 2.39 | 3.93 | 11.9 | 8.8 | White Suspension |
| | | | $Y_2O_3$ | Mal | | | |
| C175 | $Na_1Y_1(Mal)_1$ | 1.13 | 3.18 | 3.78 | 11.9 | 7.5 | White Suspension |
| C176 | $Na_3Y_1(Mal)_2$ | 1.94 | 1.82 | 4.33 | 11.9 | 9.1 | White Suspension |
| | | | $MoO_3$ | Cit | | | |
| C177 | $Na_4Mo_2(Cit)_1$ | 2.02 | 3.63 | 2.43 | 11.9 | 5.7 | Clear Solution |
| C178 | $Na_5Mo_2(Cit)_1$ | 2.38 | 3.42 | 2.28 | 11.9 | 6.6 | Clear Solution |

TABLE 54-continued

Preparation and Properties of Admixtures C161-C184

| Admixture | | Reactants (Mass in grams) | | | Reaction Products | |
|---|---|---|---|---|---|---|
| # | Mol Composition | NaOH | | Water | pH | Appearance |
| C179 | Na$_3$Mo$_1$(Cit)$_1$ | 2.13 | 2.55 | 3.40 | 11.9 | 5.9 Clear Solution |
| C180 | Na$_7$Mo$_2$(Cit)$_2$ | 2.38 | 2.44 | 3.26 | 11.9 | 6.9 Clear Solution |
| | | | WO$_3$ | Cit | | |
| C181 | Na$_3$W$_1$(Cit)$_1$ | 1.78 | 3.44 | 2.85 | 11.9 | 6.4 Clear Solution |
| C182 | Na$_4$W$_1$(Cit)$_1$ | 2.21 | 3.21 | 2.66 | 11.9 | 12.8 Clear Solution |
| C183 | Na$_6$W$_1$(Cit)$_2$ | 2.27 | 2.19 | 3.63 | 11.9 | 6.7 Clear Solution |
| C184 | Na$_7$W$_1$(Cit)$_2$ | 2.53 | 2.09 | 3.47 | 11.9 | 7.5 Clear Solution |

Notes:
Reaction conditions are detailed in Example 36;
Mg(OH)$_2$ is magnesium hydroxide;
Ca(OH)$_2$ is calcium hydroxide;
In$_2$O$_3$ is indium(III) oxide;
Ga$_2$O$_3$ is gallium(III) oxide;
Fe(OH)$_3$ is iron(III) hydroxide;
ZnO is zinc(II) oxide;
Zr(OH)$_4$ is zirconium(IV) hydroxide;
La$_2$O$_3$ is lanthanum(III) oxide;
Y$_2$O$_3$ is yttrium(III) oxide;
MoO$_3$ is molybdenum(VI) oxide;
WO$_3$ is tungsten(VI) oxide;
Mal is malic acid;
Cit is citric acid;
W is water.

TABLE 55

1:1:3 (w/w) OPC-Fly Ash F-Sand Mortars made with Admixtures C161-C184

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C161 | 0.41 | 6.0 | 2.46 | 160 | 84 | 12.7 | 27.9 |
| C162 | 0.41 | 6.0 | 2.46 | 135 | 90 | 13.5 | 27.8 |
| C163 | 0.41 | 6.0 | 2.46 | 115 | 131 | 20.9 | 43.0 |
| C164 | 0.41 | 6.0 | 2.46 | 105 | 126 | 18.8 | 39.7 |
| C165 | 0.41 | 6.0 | 2.46 | 120 | 123 | 18.1 | 36.4 |
| C166 | 0.41 | 6.0 | 2.46 | 95 | 125 | 19.2 | 38.0 |
| C167 | 0.41 | 6.0 | 2.46 | 110 | 147 | 21.7 | 50.8 |
| C168 | 0.41 | 6.0 | 2.46 | 80 | 156 | 22.9 | 53.6 |
| C169 | 0.41 | 6.0 | 2.46 | 210 | 116 | 15.1 | 29.3 |
| C170 | 0.41 | 6.0 | 2.46 | 190 | 121 | 17.0 | 34.5 |
| C171 | 0.41 | 6.0 | 2.46 | 180 | 92 | 15.5 | 31.6 |
| C172 | 0.41 | 6.0 | 2.46 | 150 | 107 | 15.8 | 33.8 |
| C173 | 0.41 | 6.0 | 2.46 | 125 | 116 | 17.2 | 39.4 |
| C174 | 0.41 | 6.0 | 2.46 | 90 | 122 | 19.1 | 42.5 |
| C175 | 0.41 | 6.0 | 2.46 | 110 | 128 | 19.3 | 43.7 |
| C176 | 0.41 | 6.0 | 2.46 | 85 | 126 | 19.7 | 44.2 |
| C177 | 0.41 | 6.0 | 2.46 | 310 | 121 | 20.8 | 40.6 |
| C178 | 0.41 | 6.0 | 2.46 | 280 | 126 | 22.5 | 43.5 |
| C179 | 0.41 | 6.0 | 2.46 | 255 | 112 | 17.3 | 36.7 |
| C180 | 0.41 | 6.0 | 2.46 | 230 | 125 | 19.7 | 38.3 |
| C181 | 0.41 | 6.0 | 2.46 | 295 | 108 | 17.3 | 32.9 |
| C182 | 0.41 | 6.0 | 2.46 | 290 | 121 | 21.8 | 42.6 |
| C183 | 0.41 | 6.0 | 2.46 | 250 | 124 | 22.4 | 46.9 |
| C184 | 0.41 | 6.0 | 2.46 | 230 | 123 | 21.5 | 43.5 |

Notes:
W/C is the water-to-cement ratio;
Hardness is the Vickers indentation hardness;
SNC is SikaSet NC;
SHE is SikaSet HE;
P20 is Pozzutec 20+.

TABLE 56

2:3 (w/w) Fly Ash C-Sand Mortars made with Admixtures C161-C184

| | W/C | [Admixture] (% w/w) | | Set Time | Hardness (MPa) | Compressive Strength (MPa) | |
|---|---|---|---|---|---|---|---|
| # | (w/w) | In Stock | vs Cement | (min) | 1 day | 1 day | 28 day |
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C161 | 0.22 | 6.0 | 1.32 | 52 | 92 | 13.4 | 29.0 |
| C162 | 0.22 | 6.0 | 1.32 | 40 | 88 | 12.8 | 27.6 |
| C163 | 0.22 | 6.0 | 1.32 | 32 | 141 | 23.6 | 51.2 |
| C164 | 0.22 | 6.0 | 1.32 | 27 | 136 | 20.8 | 48.5 |
| C165 | 0.22 | 6.0 | 1.32 | 37 | 133 | 21.5 | 50.3 |
| C166 | 0.22 | 6.0 | 1.32 | 33 | 125 | 18.3 | 46.7 |
| C167 | 0.22 | 6.0 | 1.32 | 35 | 171 | 26.0 | 54.1 |
| C168 | 0.22 | 6.0 | 1.32 | 29 | 180 | 27.3 | 55.6 |
| C169 | 0.22 | 6.0 | 1.32 | 28 | 104 | 16.7 | 35.2 |
| C170 | 0.22 | 6.0 | 1.32 | 22 | 111 | 17.4 | 37.5 |
| C171 | 0.22 | 6.0 | 1.32 | 33 | 112 | 17.4 | 36.5 |
| C172 | 0.22 | 6.0 | 1.32 | 29 | 123 | 18.5 | 40.1 |
| C173 | 0.22 | 6.0 | 1.32 | 38 | 141 | 21.3 | 47.5 |
| C174 | 0.22 | 6.0 | 1.32 | 29 | 134 | 19.6 | 45.3 |
| C175 | 0.22 | 6.0 | 1.32 | 26 | 153 | 22.8 | 49.6 |
| C176 | 0.22 | 6.0 | 1.32 | 22 | 145 | 20.3 | 47.8 |
| C177 | 0.22 | 6.0 | 1.32 | 56 | 109 | 16.5 | 39.2 |
| C178 | 0.22 | 6.0 | 1.32 | 51 | 118 | 18.3 | 41.8 |
| C179 | 0.22 | 6.0 | 1.32 | 49 | 135 | 20.9 | 42.0 |
| C180 | 0.22 | 6.0 | 1.32 | 38 | 126 | 17.5 | 37.6 |
| C181 | 0.22 | 6.0 | 1.32 | 65 | 134 | 19.3 | 38.2 |
| C182 | 0.22 | 6.0 | 1.32 | 85 | 162 | 24.6 | 49.4 |
| C183 | 0.22 | 6.0 | 1.32 | 65 | 141 | 20.8 | 44.6 |
| C184 | 0.22 | 6.0 | 1.32 | 60 | 129 | 19.3 | 42.0 |

Notes:
W/C is the water-to-cement ratio;
Hardness is the Vickers indentation hardness;
SNC is SikaSet NC;
SHE is SikaSet HE;
P20 is Pozzutec 20+.

In Examples 37-40, the scale-up of representative admixtures (C185-C188) is described, using aluminum(III)

hydroxide as precursor (Examples 37 and 38, admixtures C185 and C186), and sodium aluminate(III) as precursor (Examples 39 and 40, admixtures C187 and C188). Admixture C185 is a sodium lactatoaluminate(III) complex ($Na_3Al_2(Lac)_4$) prepared as a 50% w/w aqueous solution, and admixture C186 is a sodium citratoaluminate(III) complex ($Na_2Al_1(Cit)_1$) prepared as a 50% w/w aqueous solution. Admixture C187 is a sodium citratoaluminate(III) complex ($Na_{33}Al_{24}(Cit)_{16}$) isolated as a solid, and admixture C188 is a sodium lactatoaluminate(III) complex ($Na_{37}Al_{25}(Lac)_{50}$) adsorbed onto diatomaceous earth. The formulation and preparation of the admixtures is detailed in Examples 37-40, and the testing of the admixtures for OPC-fly ash F-sand and fly ash C-sand mortars is detailed in Tables 57 and 58 respectively.

Admixtures C185-C188 behaved in a very similar manner to the lactatoaluminate(III) and citratoaluminate(II) admixtures (detailed in Tables 12-14 and 18-20). In all cases, mortars prepared with the admixtures achieved substantially greater hardness and compressive strength than those prepared with water, or the SikaSet or Pozzutec admixtures.

These results show that the syntheses of sodium α-hydroxycarboxylatoaluminate(III) complexes can be readily scaled up for industrial use, and the admixtures obtained as aqueous solutions, solids and adsorbates, for use as admixtures in the present invention.

Example 37

Admixture C185. Sodium Lactatoaluminate(III): $Na_3Al_2(Lac)_4$

A 30 Buchi minipilot jacketed glass reactor (fitted with an overhead stirrer, double coil reflux condenser, solid and liquid addition ports, drain valve, a circulating heater, and a circulating cooler) was charged with water (10.638 kg), and stirring (280-300 rpm) initiated. Sodium hydroxide (2.324 kg) was then added over a period of 1 hour, while maintaining the temperature below 343 K, and stirring continued for 1 h, to give a clear solution. The temperature was adjusted to 293 K and lactic acid (7.754 kg) added over a period of 1 hour, while maintaining the temperature below 343 K, and stirring continued for 1 hour. Aluminum(III) hydroxide (3.648 kg) was then added over a period of 15 minutes, the temperature raised to 353 K and stirring continued for a further 70 h, to give a cloudy solution (24.31 kg) with a pH of 8.9. A 100 mL sample of the solution was diluted to 6% w/w solids for testing.

Example 38

Admixture C186. Sodium Citratoaluminate(III): $Na_2Al_1(Cit)_1$

A 30 Buchi minipilot jacketed glass reactor was set up as in Example 37, charged with water (7.806 kg), and stirring (290-310 rpm) initiated. Sodium hydroxide (1.916 kg) was then added over a period of 1 hour, while maintaining the temperature below 343 K, and stirring continued for 1 h, to give a clear solution. The temperature was adjusted to 293 K and citric acid (4.600 kg) added over a period of 1 hour, while maintaining the temperature below 343 K, and stirring continued for 1 hour. Aluminum(III) hydroxide (2.278 kg) was then added over a period of 15 minutes, the temperature raised to 353 K and stirring continued for a further 70 h, to give a cloudy solution (16.52 kg) with a pH of 8.8. A 100 mL sample of the solution was diluted to 6% w/w solids for testing.

Example 39

Admixture C187. Sodium Citratoaluminate(III): $Na_{33}Al_{24}(Cit)_{16}$

A 30 Buchi minipilot jacketed glass reactor was set up as in Example 37, charged with water (3.319 kg), and stirring (310 rpm) initiated. Sodium aluminate(III) (2.281 kg) was then added over a period of 1 hour, while maintaining the temperature below 343 K, and stirring continued for 2 h, to give a cloudy solution. The temperature was adjusted to 293 K, and a solution of citric acid (3.029 kg) in water (4.439 kg) added over a period of 4 hours, while maintaining the temperature below 323 K, and stirring continued for 2 hours. The temperature was then raised to 353 K and stirring continued for a further 70 h, to give a white suspension. The pH of the solution was then adjusted to 9.5 with 50% w/w sodium hydroxide (0.380 kg), heating stopped, and the mixture stirred for a further 20 h, to give a white suspension (13.27 kg). The suspension was then dried using a Simon drum dryer and flaker, with a drum temperature of 343 K, and suspension feed rate of 3.17 kg per hour, to give the dry product as white flakes (6.31 kg). The product was dissolved in water at 6% w/w solids for testing.

Example 40

Admixture C188. Sodium Lactatoaluminate(III)-Celite: $NA_{37}Al_{25}(LAC)_{50}$ on Celite A 15 Buchi minipilot jacketed glass reactor was set up as in Example 37, charged with water (1.925 kg), and stirring (310 rpm) initiated. Sodium aluminate(III) (1.312 kg) was then added over a period of 1 hour, while maintaining the temperature below 343 K, and stirring continued for 2 h, to give a cloudy solution. The temperature was adjusted to 293 K, and a mixture of lactic acid (2.743 kg) and water (1.478 kg) added over a period of 3 hours, while maintaining the temperature below 323 K, and stirring continued for 2 hours. The temperature was then raised to 353 K and stirring continued for a further 70 h, to give a cloudy solution. The pH of the solution was then adjusted to 9.5 with 50% w/w sodium hydroxide (0.217 kg), heating stopped, and the mixture stirred for a further 20 h, to give a cloudy solution (6.97 kg). The solution was then adsorbed onto diatomaceous earth (3.526 kg) using a Munson MX drum mixer, with a spray rate of 22.6 kg per hour, and a batching time of 20 minutes, then dried using a Simon drum dryer, with a drum temperature of 333 K, to give the diatomaceous earth-supported product as white granules (7.23 kg). This was then milled to below 200 mesh using a Munson SK attrition mill (granules fed at 9.4 kg per h, and batch completed in 1.3 h) to give the product as a white powder. The product was dispersed in water at 6% w/w (active) solids for testing.

TABLE 57

1:1:3 (w/w) OPC-Fly Ash F-Sand Mortars made with Admixtures C185-C188

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.46 | — | — | 190 | 48 | 7.8 | 18.9 |
| SNC | 0.42 | — | 0.5 | 160 | 52 | 8.1 | 22.9 |
| SHE | 0.41 | — | 0.5 | 125 | 81 | 13.6 | 28.7 |
| P20 | 0.42 | — | 0.5 | 110 | 93 | 14.0 | 32.4 |
| C185 | 0.41 | 6.0 | 2.46 | 70 | 147 | 22.9 | 55.6 |
| C186 | 0.41 | 6.0 | 2.46 | 120 | 143 | 20.3 | 50.8 |
| C187 | 0.41 | 6.0 | 2.46 | 90 | 154 | 23.5 | 55.1 |
| C188 | 0.41 | 6.0 | 2.46 | 57 | 138 | 20.6 | 49.2 |

Notes:
W/C is the water-to-cement ratio;
Hardness is the Vickers indentation hardness;
SNC is SikaSet NC;
SHE is SikaSet HE;
P20 is Pozzutec 20+.

TABLE 58

2:3 (w/w) Fly Ash C-Sand Mortars made with Admixtures C185-C188

| # | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| Water | 0.27 | — | — | 26 | 31 | 4.1 | 14.3 |
| SNC | 0.25 | — | 0.5 | 37 | 44 | 5.2 | 16.8 |
| SHE | 0.23 | — | 0.5 | 42 | 63 | 8.9 | 23.5 |
| P20 | 0.24 | — | 0.5 | 33 | 71 | 9.5 | 26.0 |
| C185 | 0.22 | 6.0 | 1.32 | 22 | 193 | 27.4 | 60.2 |
| C186 | 0.22 | 6.0 | 1.32 | 41 | 151 | 22.8 | 54.9 |
| C187 | 0.22 | 6.0 | 1.32 | 32 | 188 | 28.3 | 57.4 |
| C188 | 0.22 | 6.0 | 1.32 | 24 | 158 | 21.5 | 52.4 |

Notes:
W/C is the water-to-cement ratio;
Hardness is the Vickers indentation hardness;
SNC is SikaSet NC;
SHE is SikaSet HE;
P20 is Pozzutec 20+.

In Examples 43-51 (Table 59), the sodium citratoaluminate(I) complex $(Na_{33}Al_{24}(Cit)_{16}$, admixture C187) was tested as admixture with mortars made with a variety of other hydraulic cements, namely pure OPC (Example 43), fly ash F-fly ash C (Examples 44 and 45), basic oxygen furnace steel slag (Example 46), basic oxygen furnace steel slag-electric arc furnace steel slag (Example 47), OPC-electric arc furnace steel slag (Example 48), OPC-limestone powder (Examples 49 and 50) and OPC-seawater brucite fines (Examples 51 and 52). Mortars made with admixture C187 typically displayed faster sets and greater hardness and compressive strength as compared to mortars prepared with water alone.

These results show that the admixtures of the present invention, as exemplified by the sodium citratoaluminate(III) complex C187, can be used with pure OPC, blended OPCs and non-OPCs, to gain improvements in setting, hardness and compressive strength.

TABLE 59

Hydraulic Cement-Sand Mortars made with Admixture C186

| Admixture | W/C (w/w) | [Admixture] (% w/w) In Stock | [Admixture] (% w/w) vs Cement | Set Time (min) | Hardness (MPa) 1 day | Compressive Strength (MPa) 1 day | Compressive Strength (MPa) 28 day |
|---|---|---|---|---|---|---|---|
| EXAMPLE 43. 2:3 (w/w) OPC-Sand Mortar | | | | | | | |
| Water | 0.47 | — | — | 190 | 103 | 14.3 | 45.7 |
| C187 | 0.41 | 6.0 | 2.46 | 110 | 147 | 22.8 | 55.3 |
| EXAMPLE 44. 1:1:3 (w/w) Fly Ash F-Fly Ash C-Sand Mortar | | | | | | | |
| Water | 0.31 | — | — | 140 | 26 | 3.5 | 12.7 |
| C187 | 0.26 | 6.0 | 1.56 | 47 | 133 | 17.6 | 53.7 |
| EXAMPLE 45. 3:1:6 (w/w) Fly Ash F-Fly Ash C-Sand Mortar | | | | | | | |
| Water | 0.33 | — | — | 215 | 22 | 3.1 | 10.4 |
| C187 | 0.28 | 6.0 | 1.68 | 120 | 117 | 15.2 | 46.8 |
| EXAMPLE 46. 2:3 (w/w) Basic Oxygen Furnace Slag-Sand Mortar | | | | | | | |
| Water | 0.27 | — | — | 9 | 71 | 9.7 | 22.5 |
| C186 | 0.25 | 6.0 | 1.50 | 14 | 107 | 14.1 | 34.8 |
| EXAMPLE 47. 1:1:3 (w/w) Basic Oxygen Furnace Slag-Electric Arc Furnace Slag-Sand Mortar | | | | | | | |
| Water | 0.35 | — | — | 12 | 54 | 7.8 | 18.6 |
| C187 | 0.32 | 6.0 | 1.92 | 15 | 96 | 13.2 | 28.4 |
| EXAMPLE 48. 1:1:3 (w/w) OPC-Electric Arc Furnace Slag-Sand Mortar | | | | | | | |
| Water | 0.28 | — | — | 17 | 56 | 8.4 | 19.3 |
| C187 | 0.27 | 6.0 | 1.62 | 23 | 88 | 11.6 | 30.6 |
| EXAMPLE 49. 1:1:3 (w/w) OPC-Limestone Powder-Sand Mortar | | | | | | | |
| Water | 0.43 | — | — | 255 | 51 | 7.3 | 20.6 |
| C187 | 0.42 | 6.0 | 2.52 | 220 | 92 | 13.1 | 32.9 |
| EXAMPLE 50. 1:3:6 (w/w) OPC-Limestone Powder-Sand Mortar | | | | | | | |
| Water | 0.44 | — | — | 375 | 33 | 5.2 | 16.4 |
| C187 | 0.42 | 6.0 | 2.52 | 255 | 76 | 10.8 | 28.7 |
| EXAMPLE 51. 1:1:3 (w/w) OPC-Seawater Brucite Fines-Sand Mortar | | | | | | | |
| Water | 0.43 | — | — | 215 | 55 | 8.7 | 21.7 |
| C187 | 0.40 | 6.0 | 2.40 | 80 | 121 | 17.4 | 43.5 |
| EXAMPLE 52. 1:3:6 (w/w) OPC-Seawater Brucite Fines-Sand Mortar | | | | | | | |
| Water | 0.42 | — | — | 290 | 41 | 6.6 | 18.2 |
| C187 | 0.38 | 6.0 | 2.28 | 95 | 92 | 13.1 | 35.6 |

Notes:
W/C is the water-to-cement ratio;
Hardness is the Vickers indentation hardness.

In Examples 53-55, other hardened properties and the durability of mortars made w/o the citratoaluminate(III) complex, admixture C187, and w/o an air entrainer (Daravair 1000) was tested by examining linear shrinkage, water permeability and freeze-thaw resistance. 1:1:3 (w/w) OPC-fly ash F-sand mortars are detailed in Example 53, 2:3 (w/w) fly ash C-sand mortars in Example 54, and 1:1:3 (w/w) fly ash C-fly ash F-sand mortars in example 55. In all cases, the inclusion of admixture C187 resulted in a substantial decrease in linear shrinkage and water permeability, and a considerable enhancement in freeze-thaw durability. The improvements in shrinkage, permeability and freeze-thaw resistance were observed both in the absence and presence of Daravair. Furthermore, in the case of freeze-thaw resistance the protective effects of admixture C187 and Daravair appeared to be synergistic.

These results show that the admixtures of the present invention, as exemplified by the sodium citratoaluminate(III) complex C187, improve other hardened properties of cement compositions, such as linear shrinkage and water permeability, as well as durability measures such as freeze-thaw resistance.

TABLE 60

Hardened Properties and Durability of Mortars made w/o Admixture C187

| Admixture | W/C | [Admixture] (% w/w) (vs Cement) | [Daravair] (% w/w) (vs Cement) | Linear Shrinkage (%, 28 days) | Water Permeability (mDa, 28 days) | Freeze-Thaw Cycles | $P_C$ | DF |
|---|---|---|---|---|---|---|---|---|
| EXAMPLE 53. 1:1:3 (w/w) OPC-Fly Ash F-Sand Mortars | | | | | | | | |
| Water | 0.46 | — | — | −0.0452 | 0.0682 | 32 | 13 | 1.4 |
| C187 | 0.41 | 2.46 | — | −0.0216 | 0.0024 | 312 | 49 | 51 |
| Water | 0.47 | — | 0.015 | −0.0341 | 0.0378 | 304 | 96 | 97 |
| C187 | 0.42 | 2.52 | 0.015 | −0.0198 | 0.0044 | 304 | 99 | 100 |
| EXAMPLE 54. 2:3 (w/w) Fly Ash C-Sand Mortars | | | | | | | | |
| Water | 0.26 | — | — | −0.1246 | 0.0426 | 32 | 12 | 1.3 |
| C187 | 0.22 | 1.32 | — | −0.0120 | 0.0181 | 311 | 57 | 59 |
| Water | 0.27 | — | 0.015 | −0.1392 | 0.0384 | 76 | 64 | 16 |
| C187 | 0.23 | 1.38 | 0.015 | −0.0147 | 0.0209 | 312 | 98 | 102 |
| EXAMPLES 55. 1:1:3 (w/w) Fly Ash C-Fly Ash F-Sand Mortars | | | | | | | | |
| Water | 0.32 | — | — | −0.1782 | 0.0661 | 32 | 8 | 0.9 |
| C187 | 0.27 | 1.62 | — | −0.0287 | 0.0215 | 312 | 62 | 65 |
| Water | 0.33 | — | 0.015 | −0.2031 | 0.0492 | 81 | 53 | 14 |
| C187 | 0.27 | 1.62 | 0.015 | −0.0310 | 0.0183 | 312 | 98 | 102 |

Notes:
W/C is the water-to-cement ratio;
Cycles is cycles of freeze-thaw completed;
$P_C$ is the Relative Dynamic Modulus;
DF is the Durability Factor In addition to the above disclosed examples, the admixtures of the present invention may be used as admixtures for other hydraulic cements, including but not restricted to:
(i) Special Portland cements, such as high-alite, low-alite, and high-belite Portland cements;
(ii) Portland-type cements, such as alinite, fluoroalinite, sulfoalite, fluoroalite, alite-calcium fluoroaluminate, belite, sulfobelite, calcium sulfoferrite, calcium sulfoaluminate, calcium chloroaluminate, calcium fluoroaluminate, calcium ferroaluminate, calcium sulfoferroaluminate, belite-calcium sulfoaluminate, belite-calcium sulfoferrite, belite-calcium aluminoferrite, belite-calcium fluoroaluminate, and belite-calcium sulfoferroaluminate cements;
(iii) Non-calcium aluminate/silicate cements, such as magnesium silicate, magnesium aluminosilicate, barium silicate, strontium silicate, barium aluminate, and strontium aluminate;
(iv) Acid-base cements, such as magnesium phosphate, ammonium magnesium phosphate (struvite), magnesium potassium phosphate, aluminum phosphate, zinc phosphate, iron(II) phosphate, iron(III) phosphate, basic calcium phosphate (hydroxyapatite), magnesium oxychloride (Sorel), zinc oxychloride, magnesium carbonate, magnesium hydroxycarbonate, and glass-ionomer cements; and
(v) Polymer-modified cements and macro-defect-free (MDF) cements.

While the foregoing written description of the invention enables one of ordinary skill to make and use what is considered presently to be the best mode thereof, those of ordinary skill will understand and appreciate the existence of variations, modifications, combinations, and equivalents of the specific embodiments, methods, and examples herein. The invention should therefore not be limited by the above described embodiments, methods, and examples, but by all embodiments, variations, and methods within the scope and spirit of the claimed invention and its equivalents.

I claim:
1. A composition comprising:
a hydraulic cement or cementitious material; and
at least one metal complex represented by the formula $M_a[N_b(HCA)_c]$, wherein:
  M is a metal selected from the group consisting of lithium, sodium, potassium, magnesium, calcium, strontium, barium and combinations thereof;
  N is a metal selected from the group consisting of aluminum, iron, bismuth and combinations thereof;
  HCA is a hydroxycarboxylic acid selected from the group consisting of glyoxylic acid hydrate, glycolic acid, lactic acid, 2-hydroxybutyric acid and combinations thereof;
  a is an integer with a value of 1 to 100;
  b is an integer with a value of 1 to 10; and
  c is an integer with a value of 1 to 100.
2. The composition of claim 1, wherein:
M is selected from the group consisting of lithium, sodium, potassium and combinations thereof; and
HCA is selected from the group consisting of glyoxylic acid hydrate, glycolic acid, lactic acid and combinations thereof.
3. The composition of claim 2, wherein:
M is selected from the group consisting of sodium, potassium and combinations thereof;
N is selected from the group consisting of aluminum, bismuth and combinations thereof;
HCA is lactic acid;
a is an integer with a value of 1 to 50;
b is an integer with a value of 1 to 5; and
c is an integer with a value of 1 to 50.
4. The composition of claim 3, wherein:
M is sodium;
N is aluminum;
a is an integer with a value of 1 to 30;
b is an integer with a value of 1 to 3; and
c is an integer with a value of 1 to 30.

5. The composition of claim 1, wherein the hydraulic cement is Portland cement.

6. A composition comprising:
A hydraulic cement or cementitious material; and
at least one metal complex represented by the formula $M_a[N_b(HCA)_c]$, wherein:
M is a metal selected from the group consisting of lithium, sodium, potassium, magnesium, calcium, strontium, barium, and combinations thereof
N is a metal selected from the group consisting of aluminum, iron, bismuth and combinations thereof;
HCA is a hydroxycarboxylic acid selected from the group consisting of malic acid, tartronic acid, dihydroxymalonic acid and combinations thereof;
a is an integer with a value of 1 to 100;
b is an integer with a value of 1 to 10; and
c is an integer with a value of 1 to 50.

7. The composition of claim 6, wherein:
M is selected from the group consisting of lithium, sodium, potassium and combinations thereof; and
HCA is selected from the group consisting of malic acid, tartronic acid and combinations thereof.

8. The composition of claim 7, wherein:
M is selected from the group consisting of sodium, potassium and combinations thereof;
N is selected from the group consisting of aluminum, bismuth and combinations thereof;
a is an integer with a value of 1 to 80;
b is an integer with a value of 1 to 5; and
c is an integer with a value of 1 to 40.

9. The composition of claim 8, wherein:
M is sodium;
N is aluminum;
a is an integer with a value of 1 to 40;
b is an integer with a value of 1 to 3; and
c is an integer with a value of 1 to 30.

10. The composition of claim 6, wherein the hydraulic cement is Portland cement.

11. The composition of claim 1, wherein the cementitious material is selected from the group consisting of coal fly ash, coal bottom ash, coal boiler slag, steel slag, and combinations thereof.

12. The composition of claim 6, wherein the cementitious material is selected from the group consisting of coal fly ash, coal bottom ash, coal boiler slag, steel slag, and combinations thereof.

* * * * *